US012586930B2

(12) United States Patent
Ito

(10) Patent No.: US 12,586,930 B2
(45) Date of Patent: Mar. 24, 2026

(54) CONNECTOR

(71) Applicant: Panasonic Intellectual Property Management Co., Ltd., Osaka (JP)

(72) Inventor: Chikara Ito, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 350 days.

(21) Appl. No.: 18/572,660

(22) PCT Filed: Jun. 20, 2022

(86) PCT No.: PCT/JP2022/024597
§ 371 (c)(1),
(2) Date: Dec. 20, 2023

(87) PCT Pub. No.: WO2022/270479
PCT Pub. Date: Dec. 29, 2022

(65) Prior Publication Data

US 2024/0291173 A1 Aug. 29, 2024

(30) Foreign Application Priority Data

Jun. 25, 2021 (JP) ................................ 2021-105717

(51) Int. Cl.
*H01R 12/57* (2011.01)
*H01R 4/02* (2006.01)
(Continued)

(52) U.S. Cl.
CPC ............. *H01R 4/027* (2013.01); *H01R 12/57* (2013.01); *H01R 12/707* (2013.01); *H01R 12/716* (2013.01); *H01R 13/50* (2013.01)

(58) Field of Classification Search
None
See application file for complete search history.

(56) References Cited

U.S. PATENT DOCUMENTS 6,217,347 B1 4/2001 Schell et al.
7,367,837 B2 * 5/2008 Pabst .................. H01R 12/592 439/468

(Continued)

FOREIGN PATENT DOCUMENTS

JP 07-272803 A 10/1995
JP 2001-143798 A 5/2001

(Continued)

OTHER PUBLICATIONS

Extended European Search Report dated Sep. 20, 2024 issued in the corresponding European Patent Application No. 22828396.6.

(Continued)

*Primary Examiner* — Tho D Ta
(74) *Attorney, Agent, or Firm* — Rimon P.C.

(57) ABSTRACT

A connector has a housing having a bottom wall; and a plurality of terminals. A lower side surface of the bottom wall in the top-bottom axis has a first region and a second region divided into two by a center of gravity plane including a center of gravity. The first region has a facing region that faces the connecting member when the connecting parts of the plurality of terminals is mounted on the connecting member, and the second region is a non-facing region that does not face the connecting member. The second region has a back surface positioned at the upper side in the top-bottom axis with respect to an imaginary plane including the mounting surface of the connecting part; and a protrusion part protruding downward from the back surface in the top-bottom axis.

9 Claims, 33 Drawing Sheets

(51) Int. Cl.

| | |
|---|---|
| ***H01R 12/70*** | (2011.01) |
| ***H01R 12/71*** | (2011.01) |
| ***H01R 13/50*** | (2006.01) |

(56) References Cited

U.S. PATENT DOCUMENTS

| | | | | |
|---|---|---|---|---|
| 2010/0190373 | A1* | 7/2010 | Yeh | H01R 12/774 439/499 |
| 2017/0324179 | A1 | 11/2017 | Ito et al. | |
| 2019/0334286 | A1 | 10/2019 | Ito | |
| 2019/0334287 | A1 | 10/2019 | Ito | |
| 2020/0169037 | A1 | 5/2020 | Ito | |
| 2022/0200200 | A1 | 6/2022 | Ito | |

FOREIGN PATENT DOCUMENTS

| | | | | | |
|---|---|---|---|---|---|
| JP | 2004-192983 | A | | 7/2004 | |
| JP | 2016-110994 | A | | 6/2016 | |
| JP | 2020-087709 | A | | 6/2020 | |
| KR | 20120015274 | A | * | 2/2012 | H01R 12/592 |
| WO | WO-2019188738 | A1 | * | 10/2019 | H01R 13/506 |
| WO | 2020/241118 | A1 | | 12/2020 | |

OTHER PUBLICATIONS

International Search Report dated Sep. 6, 2022 issued in International Patent Application No. PCT/JP2022/024597, with English translation.

* cited by examiner (a)

(b)

(a)

(b)

(a)

(b)

(a)

(b)

(a)

(b)

(a)

(b)

(c)

(d)

(a)

(b)

(a)

(b)

CONNECTOR

CROSS-REFERENCE OF RELATED APPLICATIONS

This application is the U.S. National Phase under 35 U.S.C. § 371 of International Patent Application No. PCT/JP2022/024597, filed on Jun. 20, 2022, which in turn claims the benefit of Japanese Patent Application No. 2021-105717, filed on Jun. 25, 2021 the entire disclosures of which Applications are incorporated by reference herein.

TECHNICAL FIELD

The present disclosure relates to a connector.

BACKGROUND ART

There has heretofore been known a connector including a housing and a terminal held by the housing and mounted on a connecting member such as a cable, as described in Patent Literature 1.

In Patent Literature 1, the connector mounted on a connecting member is fitted into an opponent connector to achieve conduction between a terminal of the connector and a terminal of the opponent connector. In this event, a housing of the connector mounted on the connecting member and one end side (a side facing to the opponent connector) of the connecting member are inserted and fitted into an opponent housing included in the opponent connector.

Thus, in Patent Literature 1, when the connector is being fitted into the opponent connector, not only the connector housing but also the connecting member is inserted into the opponent housing.

CITATION LIST

Patent Literature

Patent Literature 1: Japanese Unexamined Patent Application Publication No. 2016-110994

SUMMARY OF INVENTION

Technical Problem

By the way, in general, mounting the connector on the connecting member is carried out by fixing the terminals to the connecting member by soldering or the like in a state where the connector is placed on a reflow carrier after placing the connecting member on the reflow carrier.

In this event, in order to securely fix the terminals to the connecting member, it is preferable to prevent the connector placed on the reflow carrier from wobbling.

There is also a connector set in which the height of the connector set can be reduced by preventing the connecting member from being inserted into the opponent housing when the connector is being fitted into the opponent connector.

However, with such a configuration, the portion of the connector that is mounted on the connecting member is biased to one side with respect to a center of gravity of the connector. Therefore, when the connector is placed on an existing reflow carrier, the connector may be tilted, and the terminals may not be properly fixed to the connecting member.

In order to solve this kind of problem, it is conceivable to process the reflow carrier so that the connector placed on the reflow carrier does not wobble, but since it is necessary to create a special reflow carrier separately, it takes time and effort. Therefore, even when the existing reflow carrier is used, it is preferable to be able to prevent the connector from tilting.

In view of this, an object of the present disclosure is achieve a connector that make it possible to reduce the height and suppress inclination even when placed on an existing reflow carrier.

Solution to Problem

A connector according to the present disclosure includes: a housing; and a plurality of terminals held in the housing and can be mounted on a sheet-like connecting member. In a state where the housing is located above the connecting member, the housing has a top wall disposed on an upper side in a top-bottom axis, a bottom wall disposed on a lower side in the top-bottom axis, a front wall disposed on a front side in a front-rear axis that is an axis intersecting with the top-bottom axis, and a rear wall disposed on a rear side in the front-rear axis. The plurality of terminals are held in the housing in a state where the plurality of terminals are arranged along a width axis that is an axis intersecting with the top-bottom axis and the front-rear axis. Each of the plurality of terminals has a connecting part protruding from the rear wall while being held in the housing, the connecting part is provided with a mounting surface that can be mounted on the connecting member. A lower side surface of the bottom wall in the top-bottom axis has a first region and a second region divided into two by a center of gravity plane defined by an imaginary plane that includes a center of gravity and is perpendicular to the front-rear axis. The first region is positioned at the rear side in the front-rear axis and the second region is positioned at the front side in the front-rear axis. The first region has a facing region that faces the connecting member in the top-bottom axis when the connecting part is mounted on the connecting member. The second region is a non-facing region that does not face the connecting member in the top-bottom axis when the connecting part is mounted on the connecting member. The second region has a back surface positioned at the upper side in the top-bottom axis with respect to an imaginary plane that includes the mounting surface of the connecting part and is perpendicular to the top-bottom axis; and a protrusion part protruding downward from the back surface in the top-bottom axis.

Advantageous Effects

The present disclosure can provide a connector that make it possible to reduce the height and suppress inclination even when placed on an existing reflow carrier.

DESCRIPTION OF EMBODIMENTS

With reference to the drawings, an embodiment of the present disclosure is described in detail below. The following description is given of a plug connector 1 mounted on a flexible sheet-like cable (connecting member) 1A as a connector. Also, the following description is given of a receptacle connector 2 mounted on a rigid sheet-like circuit board (opponent connecting member) 2A as an opponent connector to which the plug connector 1 is fitted.

Furthermore, in the following, a top-bottom axis, a front-rear axis, and a width axis of the plug connector 1 are defined in a state where a plug housing 10 is located above the sheet-like cable (connecting member) 1A. The top-bottom axis, the front-rear axis, and the width axis are merely defined for convenience in order to explain each configuration, and do not define the actual arrangement state of the plug connector 1. Note that, in this embodiment, a direction in which the terminals are inserted into the housing of each connector coincides with the front-rear axis, and a direction perpendicular to a plane including a mounting surface (a normal direction of the plane including the mounting surface) with mounted on the connecting member is coincides with the top-bottom axis of the connector. In this event, a direction in which the terminals housed in the housing of each connector are arranged is the width axis.

Moreover, in this embodiment, in three-dimensional orthogonal coordinates, an axis extending along the Z axis is the top-bottom axis, an axis extending along the X axis is the front-rear axis, and an axis extending along the Y axis is the width axis. To be more specific, an axis perpendicular to the top-bottom axis (a direction extending along the Z axis) is the front-rear axis (a direction extending along the X axis). Further, an axis perpendicular to the top-bottom axis (the direction extending along the Z axis) and the front-rear axis (the direction extending along the X axis) is the width axis (a direction extending along the Y axis).

Furthermore, while the side on which the connectors face each other when fitted together is defined as the front of the front-rear axis.

Configuration Example of Connector Set

Figure 1:
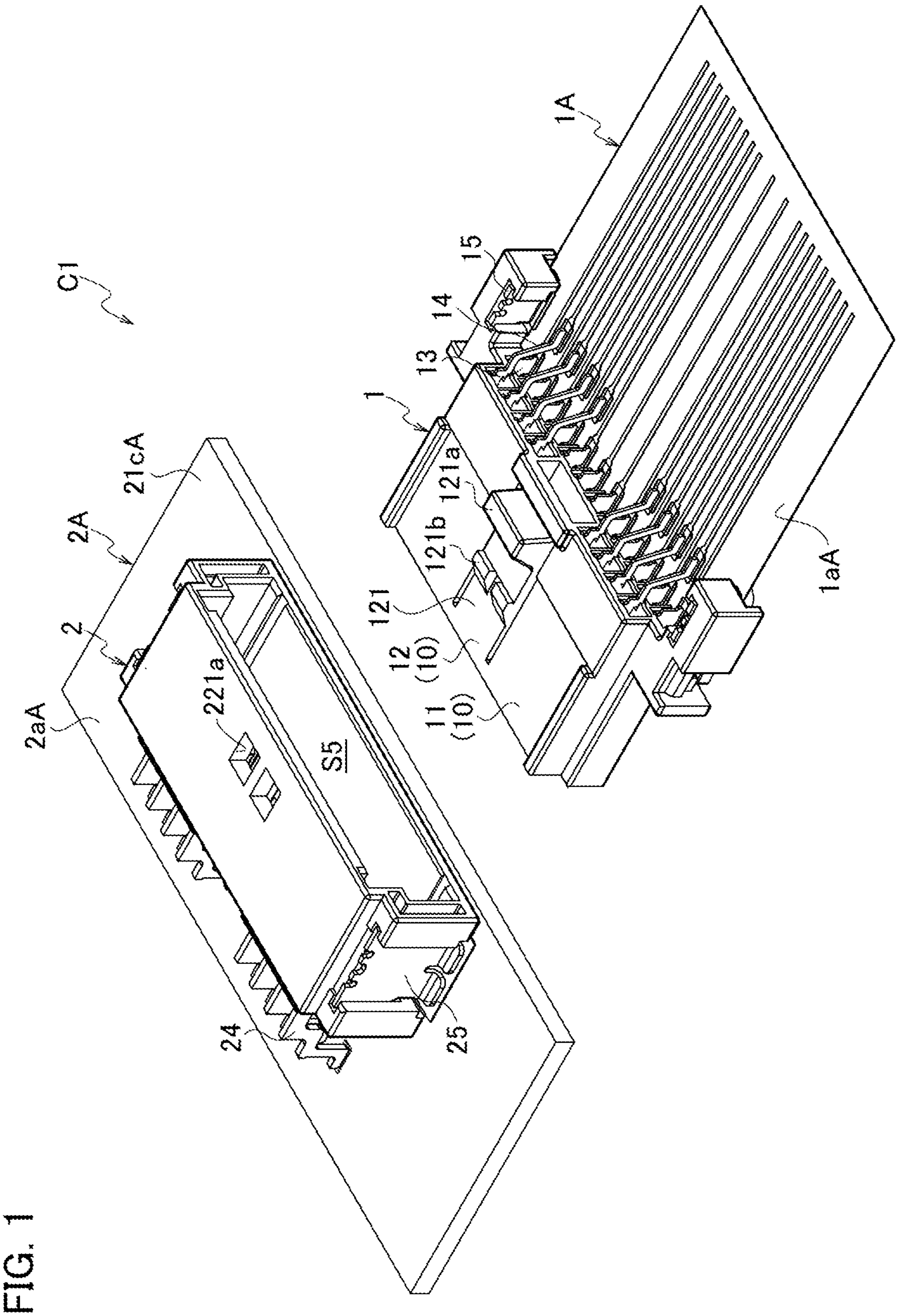
FIG. 1 is an exploded perspective view showing an example of a connector set including a plug connector mounted on a cable and a receptacle connector mounted on a circuit board.
Figure 2:
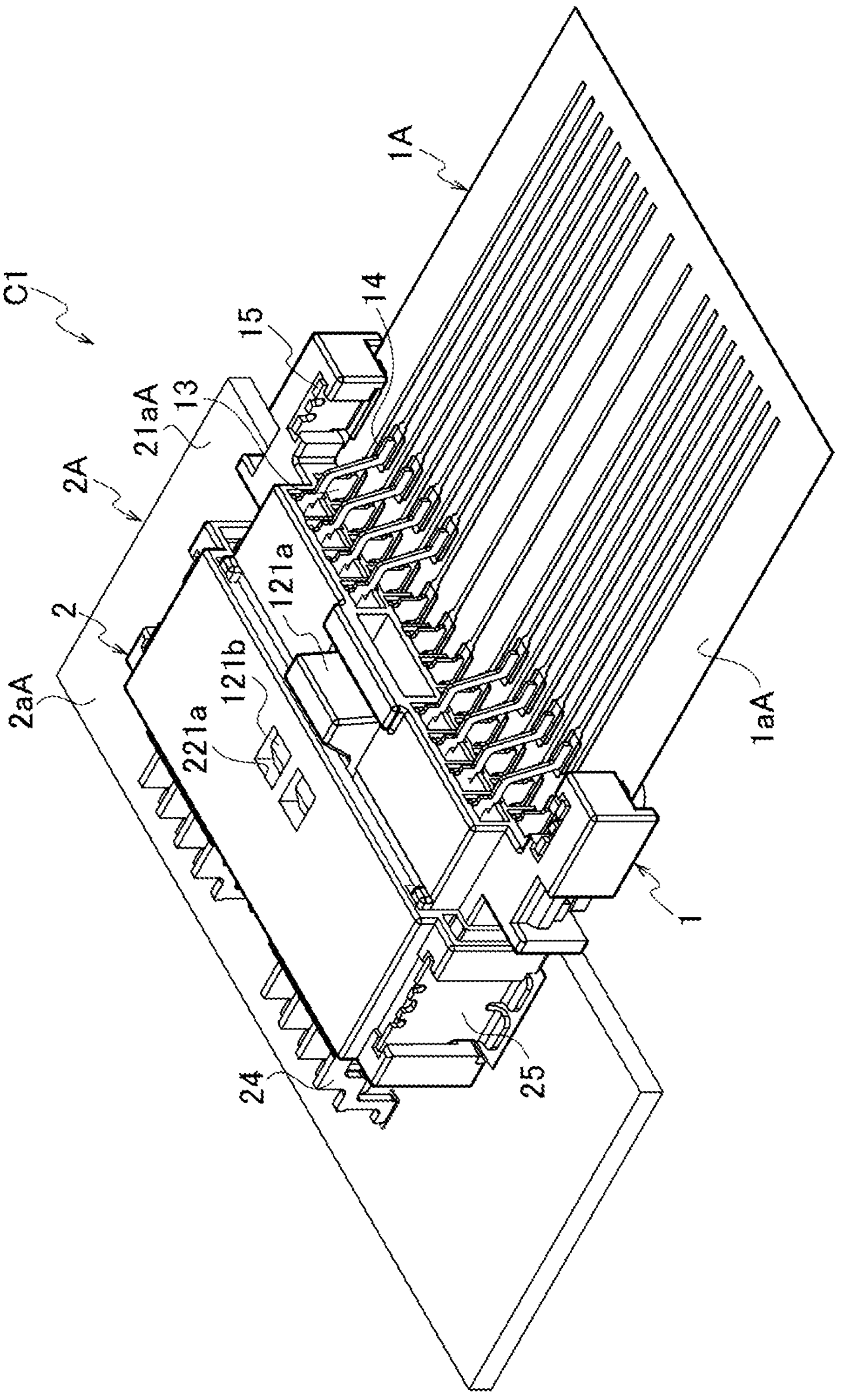
FIG. 2 is a perspective view showing an example of the connector set in a state where the plug connector mounted on the cable and the receptacle connector mounted on the circuit board are fitted together.

The plug connector (connector) 1 according to this embodiment is used for a connector set C1 shown in FIGS. 1 and 2 and the like.

The connector set C1 includes a plug connector 1 described above and a receptacle connector 2 to which the plug connector 1 is fitted, as shown in FIGS. 1 and 2.

In this embodiment, the plug connector 1 is formed to be mountable on the cable (connecting member) 1A such as an FPC and an FFC. To be more specific, the plug connector 1 is configured to be mounted on the cable 1A by electrically connecting (mounting) first and second mounting pieces (connecting parts) 132 and 142 of plug terminals (terminals) 13 and 14 included in the plug connector 1 to an exposed conductor part 151*b*A of the cable 1A.

Meanwhile, the receptacle connector 2 is formed to be mountable on the circuit board (opponent connecting member) 2A. To be more specific, the receptacle connector 2 is configured to be mounted on the circuit board 2A by electrically connecting (mounting) first and second mounting pieces (opponent connecting parts) 232 and 242 of receptacle terminals (opponent terminals) 23 and 24 included in the receptacle connector 2 to a conductor part 2*b*A of the circuit board 2A.

Then, the plug connector 1 in which the plug terminals 13 and 14 are held by a plug housing 10, and in which the first and second mounting pieces 132 and 142 are mounted on the cable 1A is fitted into the receptacle connector (opponent connector) 2. Thus, the plug terminals 13 and 14 are electrically connected to the receptacle terminals (opponent terminals) 23 and 24 included in the receptacle connector 2.

Figure 3:
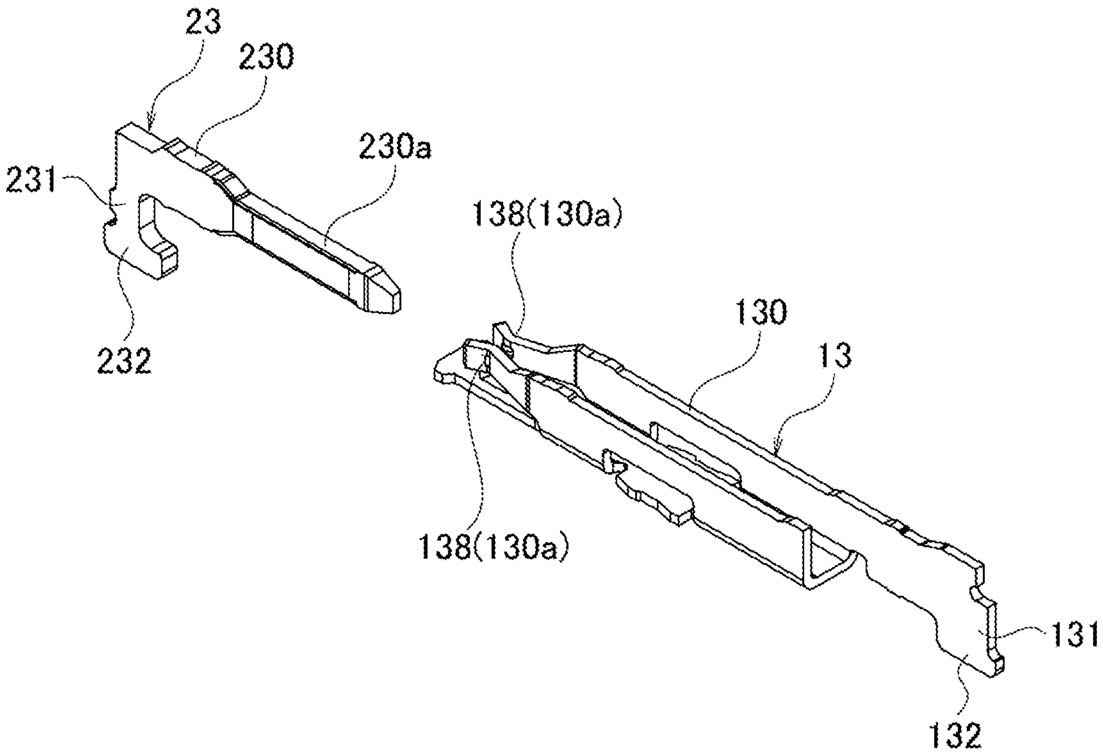
FIG. 3 is a diagram showing a plug terminal and a receptacle terminal included in the connector set shown as an example, FIG. 3(*a*) is a perspective view showing a state where a lower plug terminal and a lower receptacle terminal are not in contact with each other and FIG. 3(*b*) is a plan view showing a state where the lower plug terminal and the lower receptacle terminal are in contact with each other.
Figure 3:
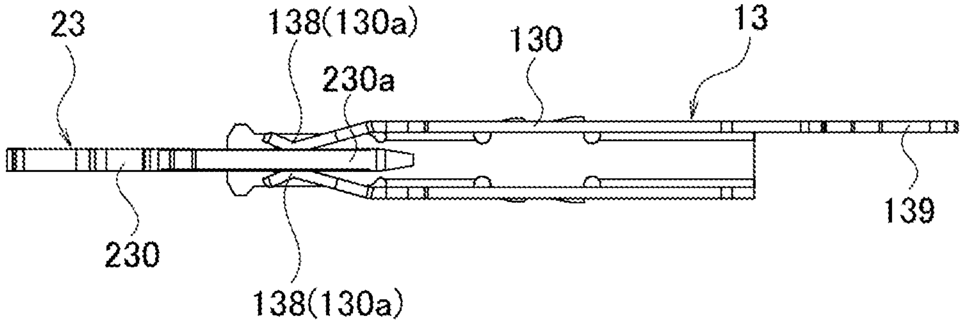
Figure 4:
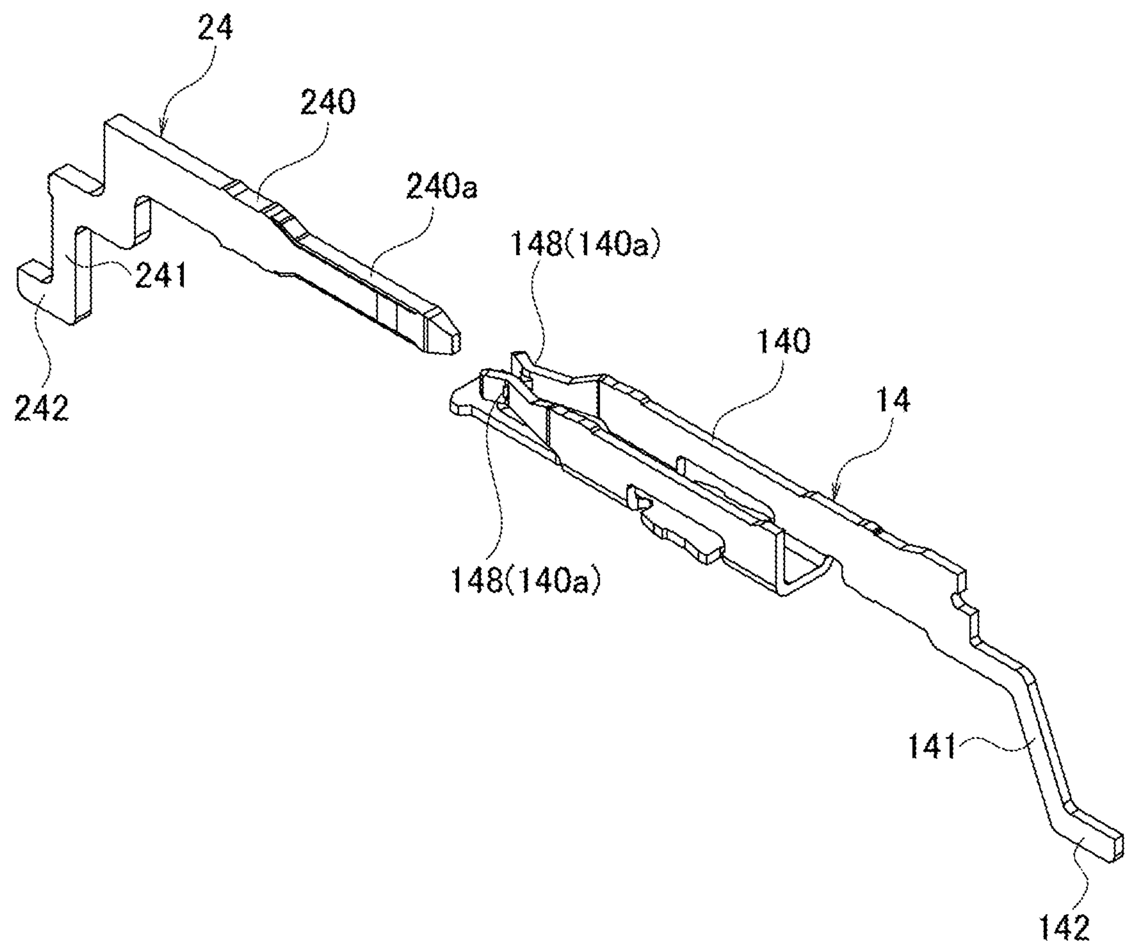
FIG. 4 is a diagram showing the plug terminal and the receptacle terminal included in the connector set shown as an example, FIG. 4(*a*) is a perspective view showing a state where an upper plug terminal and an upper receptacle terminal are not in contact with each other and FIG. 4(*b*) is a plan view showing a state where the upper plug terminal and the upper receptacle terminal are in contact with each other.
Figure 4:
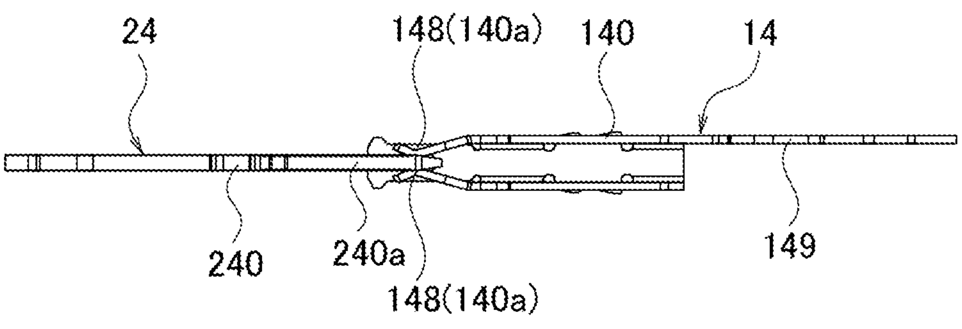
Figure 5:
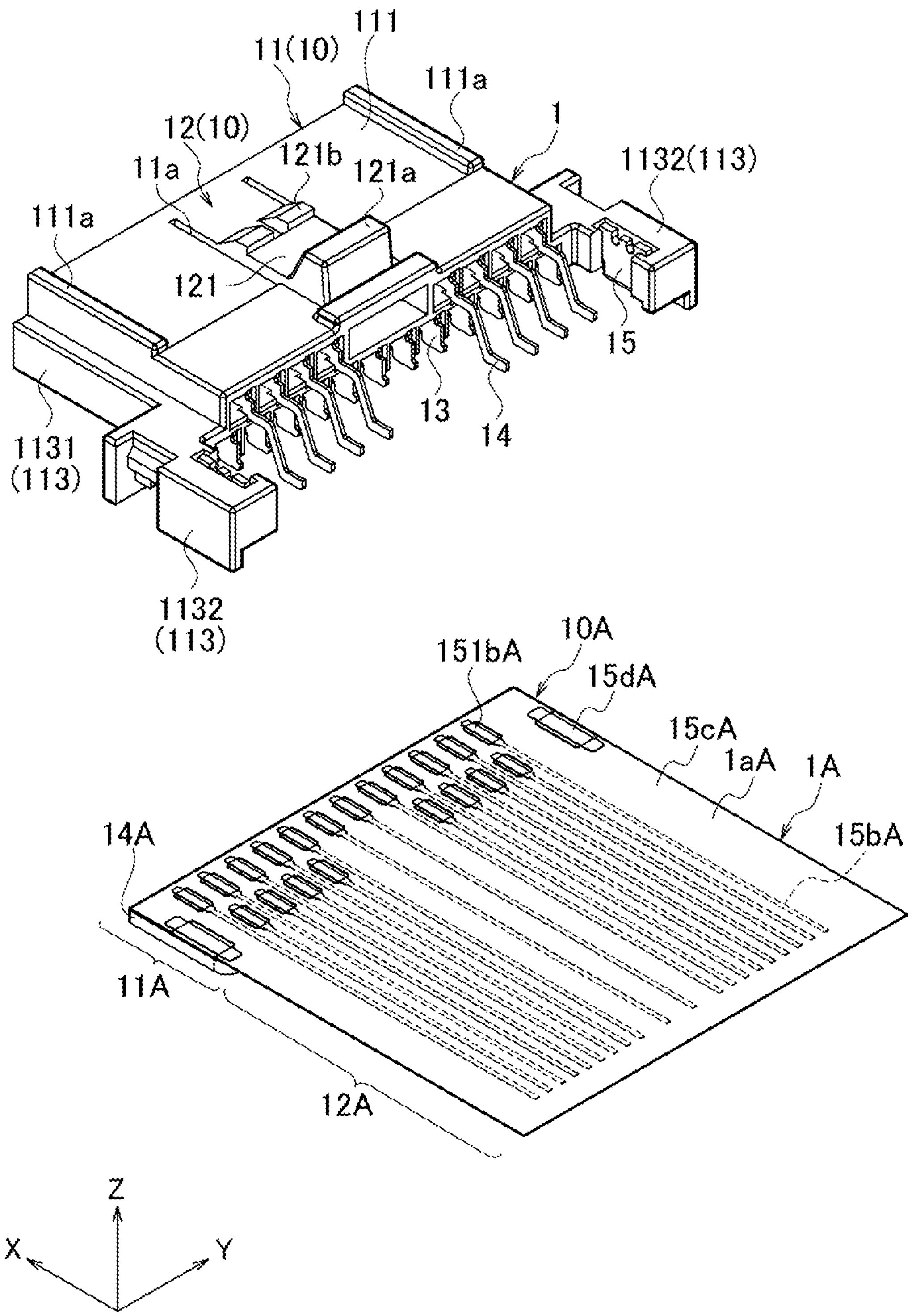
FIG. 5 is a perspective view showing a state before the plug connector included in the connector set shown as an example is mounted on a cable.
Figure 6:
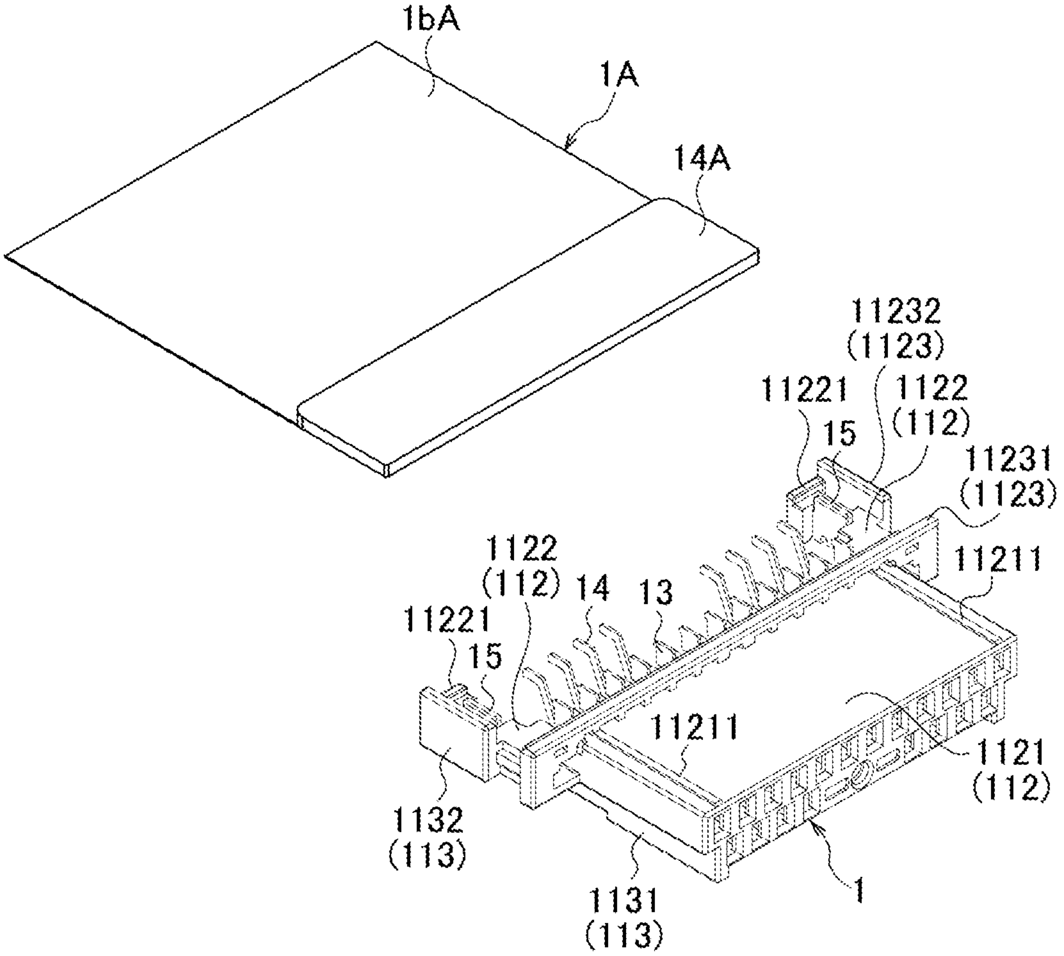
FIG. 6 is a diagram explaining how the plug connector included in the connector set shown as an example is mounted on the cable, FIG. 6(*a*) is a perspective view showing a state viewed from the reverse side before the plug connector is mounted and FIG. 6(*b*) is a perspective view showing a state viewed from the reverse side after the plug connector is mounted.
Figure 6:
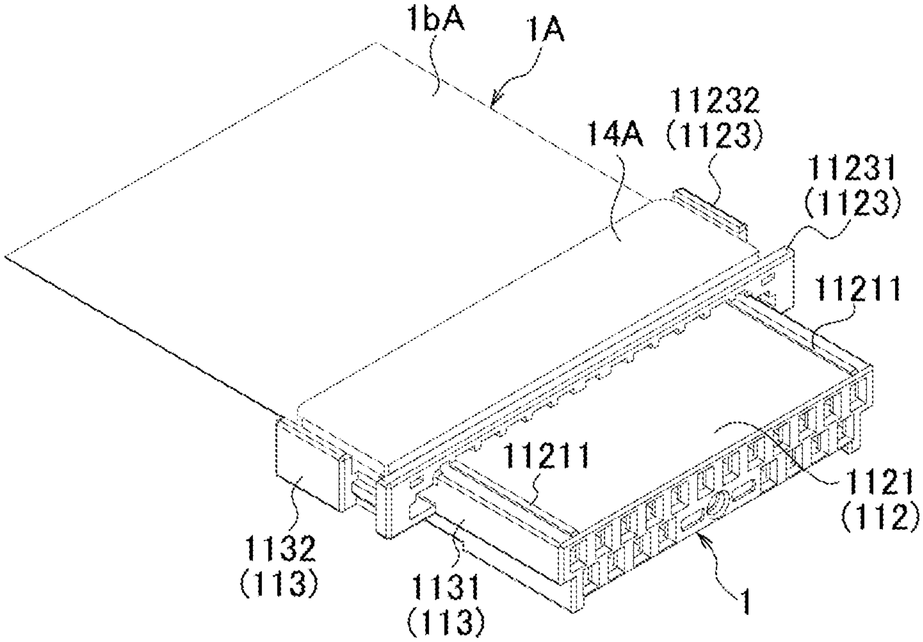
Figure 7:
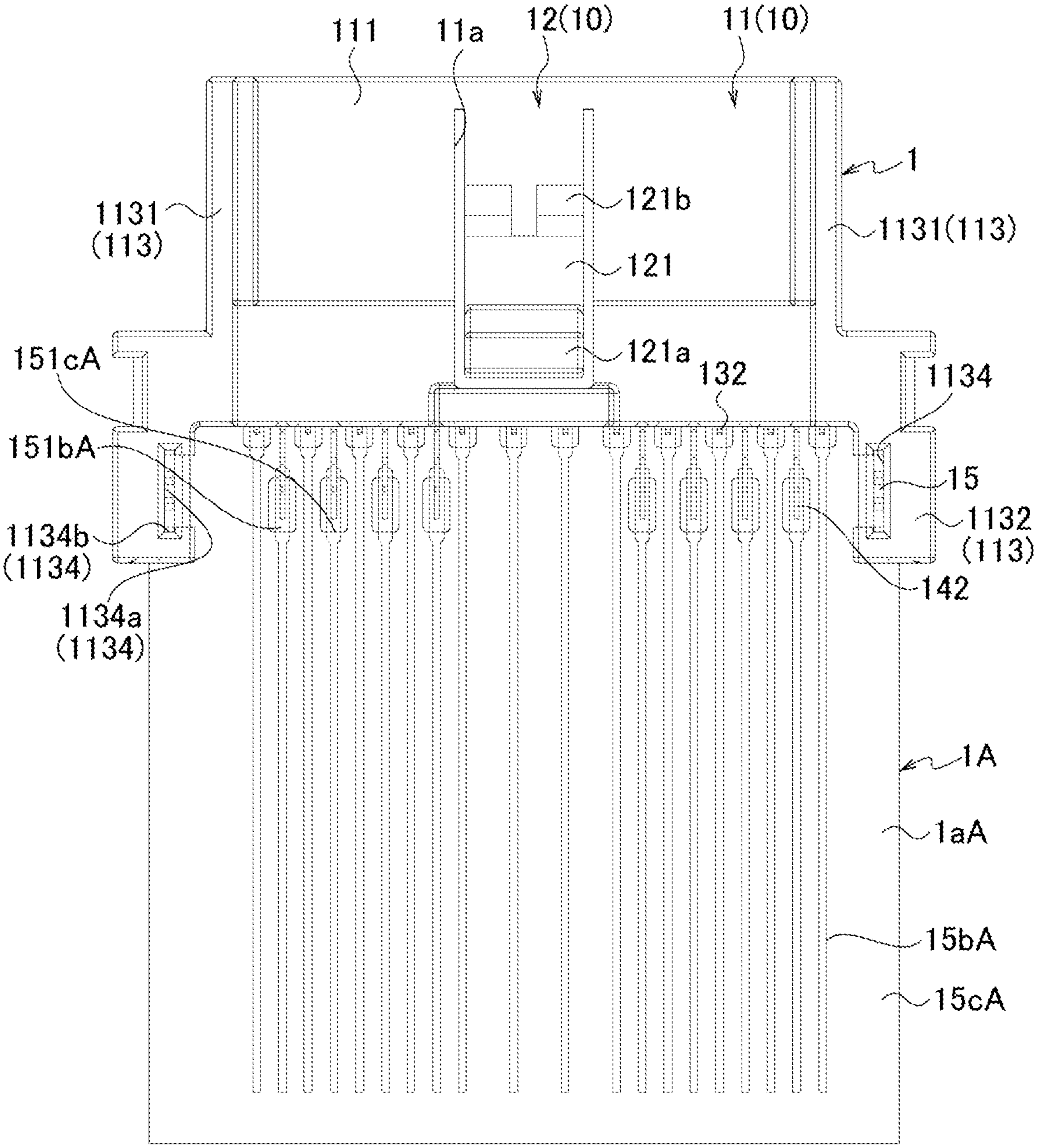
FIG. 7 is a plan view showing a state where the plug connector included in the connector set shown as an example is mounted on the cable.
Figure 8:
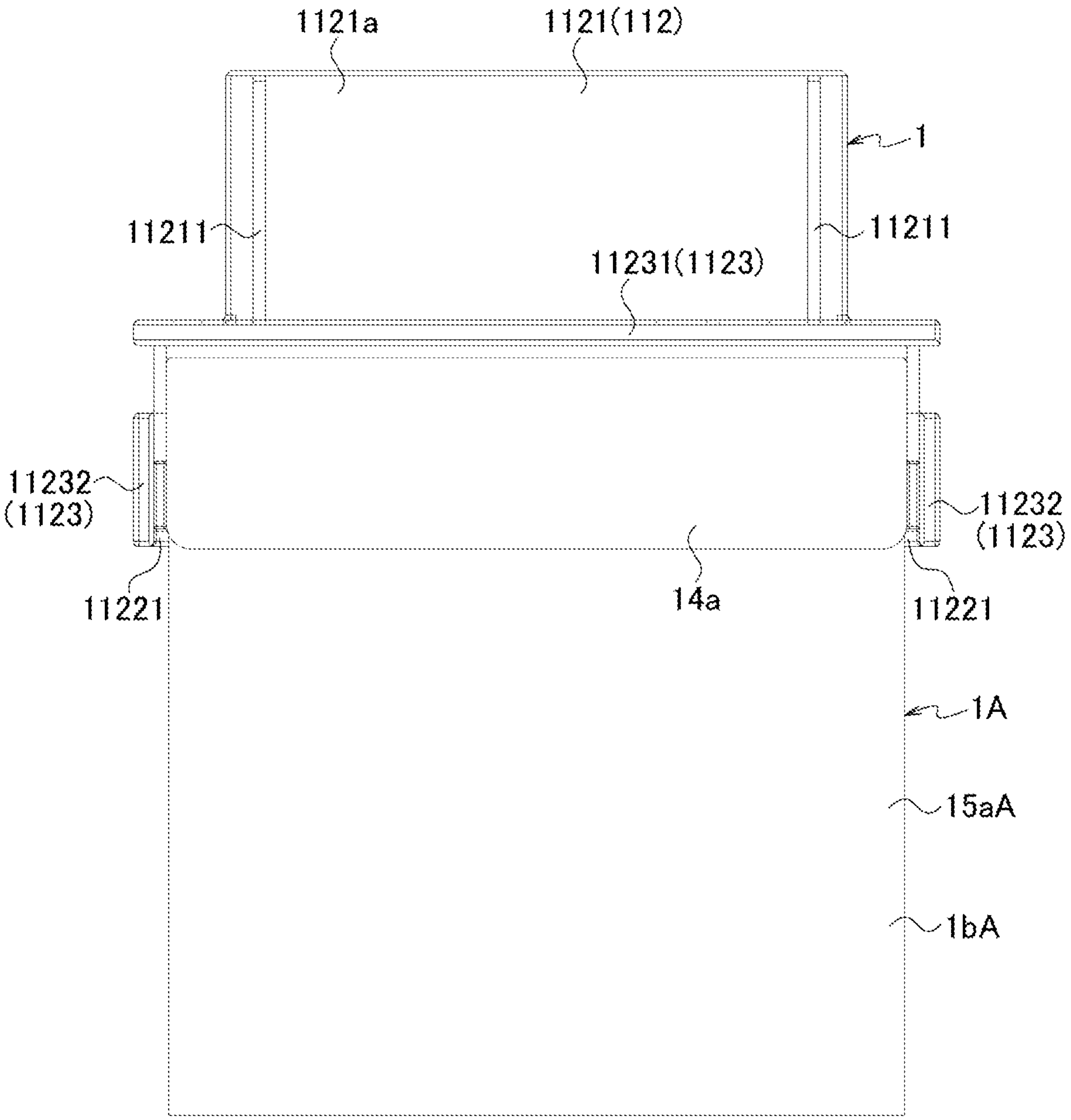
FIG. 8 is a reverse side view showing a state where the plug connector included in the connector set shown as an example is mounted on the cable.

As described above, the connector set C1 electrically connects the cable 1A to the circuit board 2A by fitting the plug connector 1 into the receptacle connector 2 to achieve conduction between the plug terminals 13 and 14 and the receptacle terminals 23 and 24 (see FIGS. 2 to 4).

Configuration Example of Cable 1A

Next, with reference to FIGS. 5 to 8, description is given of a configuration example of the cable 1A on which the plug connector 1 is mounted.

The cable 1A has a sheet shape (flat plate shape) with a top surface (front surface: one side) 1*a*A and a rear surface (back surface: the other side) 1*b*A. The top surface 1*a*A serves as a mounting surface to mount the plug connector 1. The cable 1A is also flexible and thus can be bent (curved) in a cable thickness axis.

This cable 1A includes a connection region 11A used for connection with the plug connector 1 and an extension region 12A in which a conductor part 15*b*A extends for wiring with another circuit.

In this embodiment, the cable 1A is formed such that the connection region 11A is positioned at one end side of the extension region 12A. In a state where the plug connector 1 having the connection region 11A connected thereto is fitted into the receptacle connector, the extension region 12A is positioned on the opposite side of the receptacle connector.

Moreover, the cable 1A has a multilayer structure, including a base member 15*a*A, the conductor part 15*b*A laminated on the base member 15*a*A and a covering part 15*c*A laminated on the base member 15*a*A so as to cover the conductor part 15*b*A. The base member 15*a*A and the covering part 15*c*A are formed of an insulator films to cover the conductor part 15*b*A. On the other hand, the conductor part 15*b*A is formed of conductor films printed on the insulator films included in the covering part 15*c*A, which are a plurality of wiring patterns corresponding to the plurality of terminals (the lower plug terminals 13 and the upper plug terminals 14) to be described later, respectively.

On the upper surface of the connection region 11A, a plurality of exposed conductor parts 151*b*A are formed, which are the conductor part 15*b*A exposed from the covering part 15*c*A. The plurality of exposed conductor parts 151*b*A are formed in two rows along the front-rear axis, and the exposed conductor parts 151*b*A in each row are formed so as to be arranged at a predetermined pitch in the width axis (extending direction of Y axis). Furthermore, in this embodiment, the plurality of exposed conductor parts 151*b*A are formed in a staggered pattern in a plan view (state viewed along a normal direction of the mounting surface 1*a*A).

Such a structure can be formed, for example, by printing the plurality of conductor films on the base member 15*a*A to form the conductor parts 15*b*A and then covering the conductor parts 15*b*A with the covering part 15*c*A. In this event, a plurality of through holes 151*c*A are formed in the covering part 15*c*A so as not to cover the tip of the conductor parts 15*b*A. Thus, the cable 1A having the tip of the conductor part 15*b*A exposed on one side (top side of the top-bottom axis) is formed.

Note that a method for forming the cable 1A is not limited to the above method, but various other methods can be used to form the cable 1A.

On the upper surface of the connection region 11A, fixing parts 15*d*A are also formed to fix holding brackets 15 to be described later in the plug connector 1. In this embodiment, a pair of fixing parts 15*d*A are formed on the outer side of the width axis (extending direction of Y axis) than the exposed conductor parts 151*b*A of rear row arranged in the width axis (extending direction of Y axis). The fixing parts 15*d*A can be formed, for example, in the same manner as the conductor parts 15*b*A in a printing process for the conductor parts 15*b*A.

Furthermore, in this embodiment, the cable 1A includes a reinforcing plate (a connecting plate) 14A. This reinforcing plate 14A is formed using glass epoxy resin, stainless steel, or the like, and is configured to reinforce the connection region 11A of the cable 1A by sandwiching the connection region 11A of the cable 1A between the reinforcing plate 14A and the plug connector 1.

The reinforcing plate 14A in this embodiment has a shape corresponding to the shape of, the connection region 11A of the cable 1A. In other words, the outline shape of the reinforcing plate 14A in plan view (as viewed along the normal direction of the mounting surface 1*a*A) is approximately the same as the outline shape of the connection region 11A (a rectangular shape). Then, the reinforcing plate 14A is attached to the rear surface side of the connection region 11A with an adhesive or the like.

In this event, it is preferable that the entire exposed conductor part 151*b*A overlap with the reinforcing plate 14A in the plan view (state viewed along the normal direction of the mounting surface 1*a*A). In this way, the entire exposed conductor part 151*b*A is supported by the reinforcing plate 14A, and thus can be prevented from bending in the top-bottom axis (extending direction of Z axis) or warping in the width axis (extending direction of Y axis).

Configuration Example of Plug Connector 1

Next, with reference to FIGS. 9 to 13, description is given of a configuration example of the plug connector 1.

Figure 9:
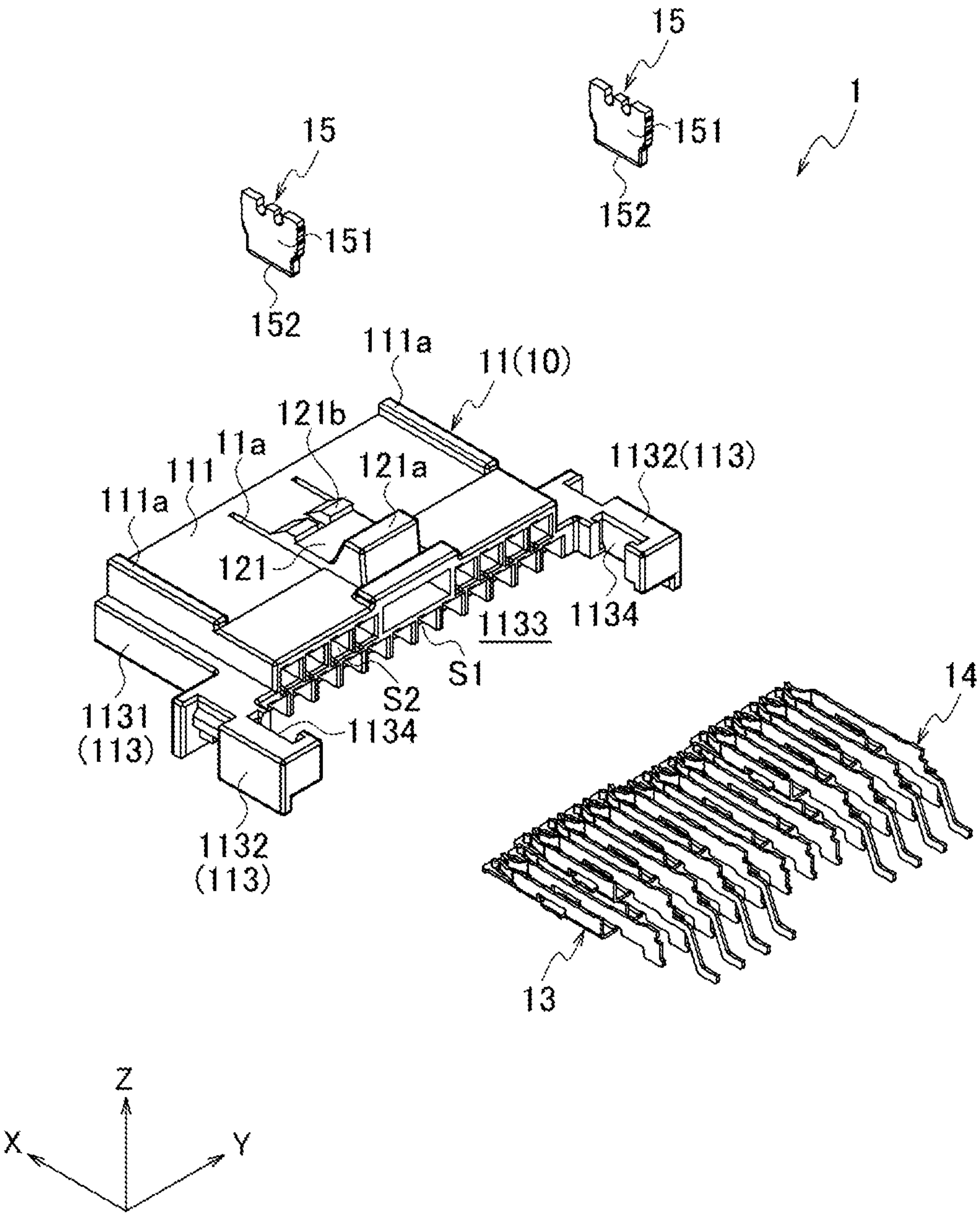
FIG. 9 is an exploded perspective view showing the plug connector included in the connector set shown as an example.
Figure 10:
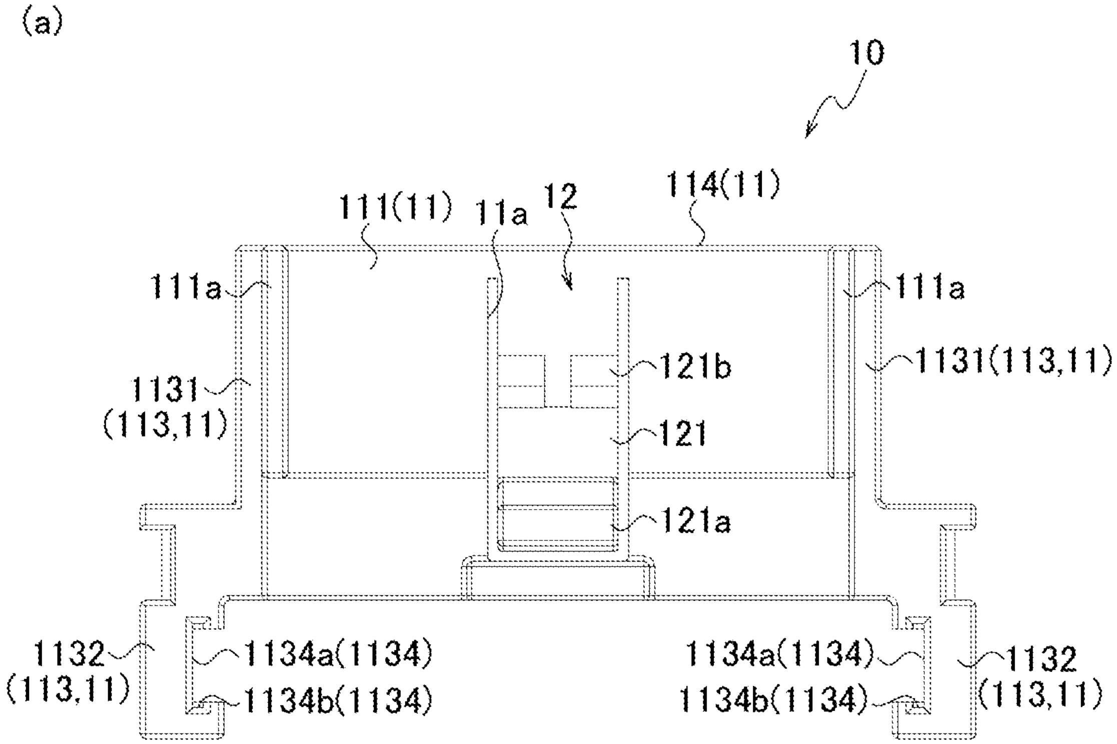
FIG. 10 is a diagram showing a plug housing included in the plug connector, FIG. 10(*a*) is a plan view and FIG. 10(*b*) is a reverse side view.
Figure 10:
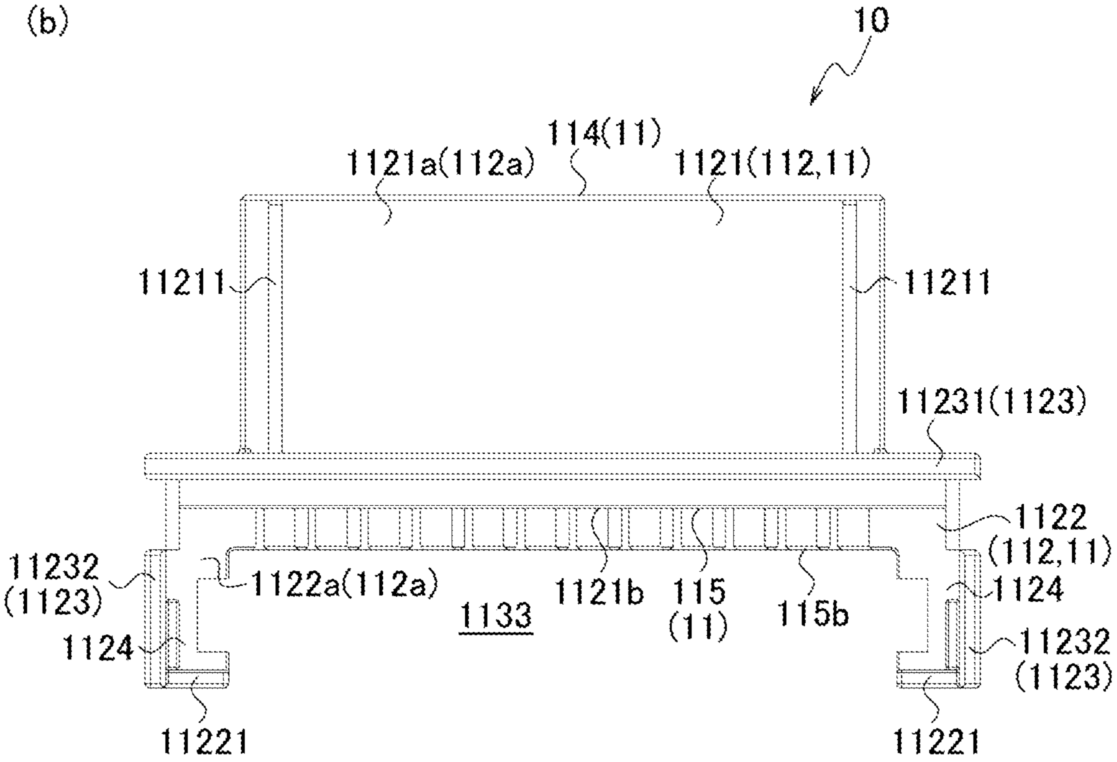
Figure 11:
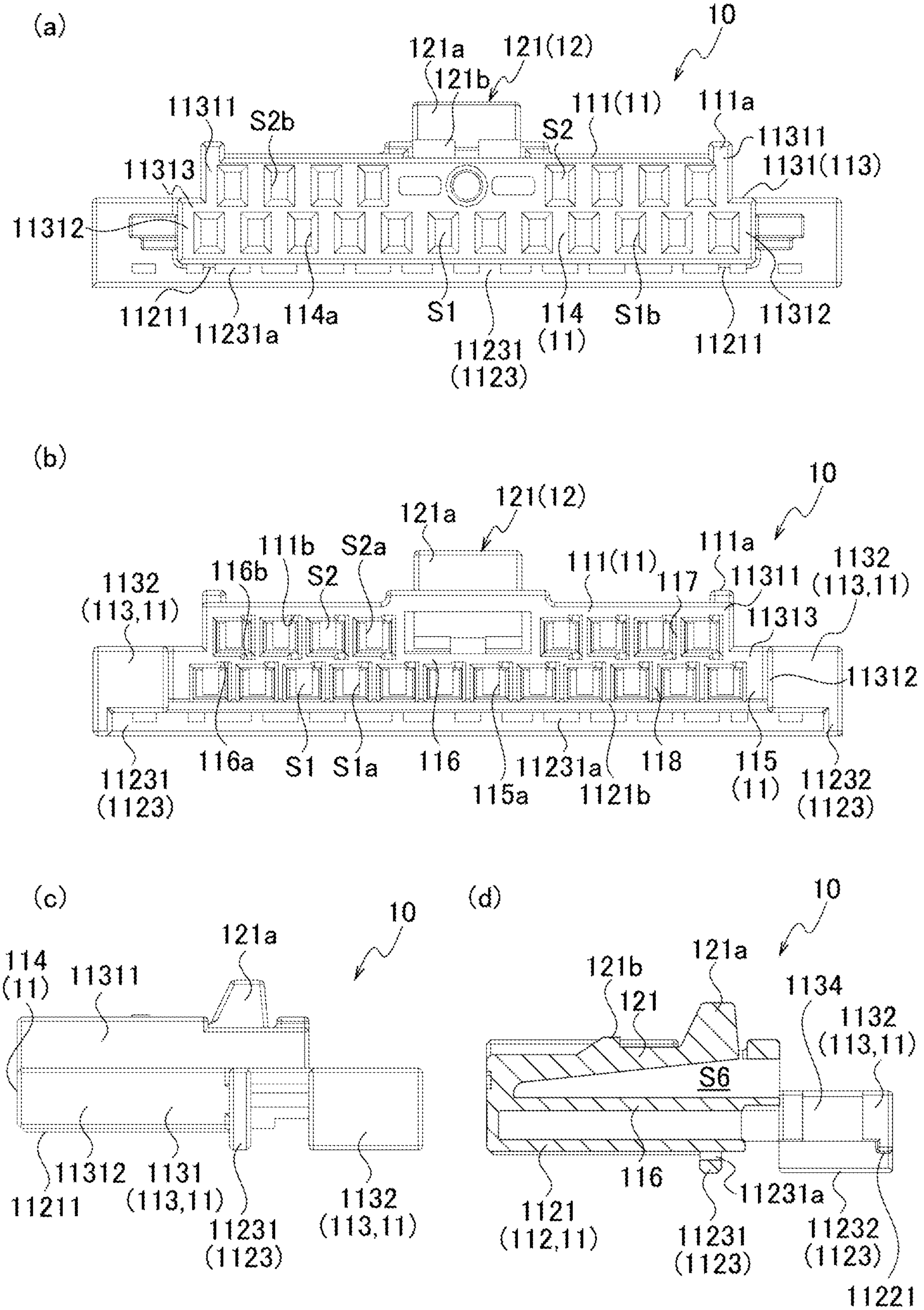
FIG. 11 is a diagram showing the plug housing included in the plug connector, FIG. 11(*a*) is a front view, FIG. 11(*b*) is a back view, FIG. 11(*c*) is a side view, and FIG. 11(*d*) is a sectional side view.

As shown in FIG. 9, the plug connector (connector) 1 includes a plug housing (housing) 10 and plug terminals (terminals: lower plug terminals 13 and upper plug terminals 14) held by the plug housing 10. The plug connector (connector) 1 also includes the holding brackets 15 held by the plug housing 10.

The plug terminals (lower plug terminals 13 and upper plug terminals 14) held by the plug housing 10 are mounted on the exposed conductor part 151*b*A of the cable 1A disposed outside the plug housing 10. Thus, the plug connector 1 is mounted on the cable 1A as the mounting member. Note that the plug terminals (lower plug terminals 13 and upper plug terminals 14) are mounted on the exposed conductor part 151*b*A by soldering or the like. The holding brackets 15 are fixed to the fixing parts 15*d*A of the cable 1A by soldering or the like, in a state where the holding brackets 15 are held by the plug housing 10, to fix the plug housing 10 to the cable 1A.

The plug housing 10 includes a rigid housing main body 11, and can be formed, for example, using an insulating resin material.

The housing main body 11 also has a lock part 12 which holds the plug housing 10 and a housing 20 of the receptacle connector 2 in their fitted state or releases the fitted state.

Thus, in this embodiment, the plug housing 10 includes the housing main body 11 and the lock part 12 formed in the housing main body 11.

The housing main body 11 includes a top wall 111, a bottom wall 112, and a pair of side walls 113 connecting both ends, in the width axis (extending direction of Y axis), of the top wall 111 and the bottom wall 112. The housing main body 11 also includes a front wall 114 provided continuously from front ends of the top wall 111, the bottom wall 112, and the side walls 113, 113, and a rear wall 115 provided continuously from rear ends of the top wall 111, the bottom wall 112, and the side walls 113, 113.

Here, in this embodiment, the rear wall 115 is a first wall disposed on a rear side in the front-rear axis (extending direction of X axis), and the front wall 114 is a second wall disposed on a front side in the front-rear axis (extending direction of X axis). Moreover, the top wall 111 is a third wall disposed on an upper side in the top-bottom axis (extending direction of Z axis) that is an axis intersecting with the front-rear axis (extending direction of X axis), and bottom wall 112 is a forth wall disposed on a lower side in the top-bottom axis (extending direction of Z axis).

In addition, the housing main body 11 includes a partition walls 116 that is provided continuously from the pair of side walls 113, the front wall 114, and the rear wall 115 and partitions, into upper and lower parts, a space defined by the top wall 111, the bottom wall 112, the side walls 113, 113, the front wall 114, and the rear wall 115.

The housing main body 11 further includes a plurality of upper partition walls 117 provided continuously from the top wall 111, the partition wall 116, the front wall 114, and the rear wall 115. These upper partition walls 117 partition the upper space partitioned by the partition wall 116 into a plurality of spaces. The housing main body 11 also includes a plurality of lower partition walls 118 provided continuously from the bottom wall 112, the partition wall 116, the front wall 114, and the rear wall 115. These lower partition walls 118 partition the lower space partitioned by the partition wall 116 into a plurality of spaces.

The lock part 12 is formed in the middle, in the width axis, of the upper side of the housing main body 11. To be more specific, the top wall 111 is formed on either side in the width axis, and the upper partition wall 117 is provided continuously from the inner side, in the width axis, of each of the top walls 111. As described above, in this embodiment, the housing main body 11 has a shape in which the middle part in the width axis is recessed as viewed along the insertion direction (front-rear axis; extending direction of X axis). The lock part 12 is formed in a recess part 11*a* formed in the middle, in the width axis, of this housing main body 11.

The lock part 12 includes a lever part 121 that is provided continuously from the front end of the partition wall 116 and extends rearward. This lever part 121 has its rear side capable of moving in the top-bottom axis relative to the partition wall 116 (housing main body 11). The lever part 121 has an operation part 121*a* formed at its rear end to operate the lever part 121, and also has an engagement protrusion 121*b* formed in its central portion in the front-rear axis to engage with an engagement recess part (engaged part) 221*a* formed in the receptacle connector 2.

In this embodiment, when the plug housing 10 and the receptacle housing 20 of the receptacle connector 2 are fitted together, the housings of the respective connectors can be locked together (maintained in the fitted state) by the engagement protrusion 121*b* engaging with the engagement recess part 221*a*. Then, the fitted state of the housings of the respective connectors can be released by lowering the operation part 121*a* of the lever part 121 to move downward the lever part 121 as well as the engagement protrusion 121*b*, thus releasing the engagement with the engagement recess part 221*a*.

Furthermore, below the lever part 121 (between the lever part 121 and the partition wall 116), a deflection allowance space S6 is formed where downward deflection of the lever part 121 (the movement of the lever part 121 relative to the housing main body 11) is allowed.

Moreover, in this embodiment, guide protrusions 111*a* extending in the front-rear axis are formed at both ends in the width direction of the top wall 111 so as to protrude upward. The guide protrusions 111*a* are inserted into guide grooves 211*a* to be described later in the receptacle housing 20. The guide protrusions 111*a* prevent incorrect insertion when the plug housing 10 is inserted into the receptacle housing 20.

Also, in this embodiment, the front wall 114 has through-holes 114*a* formed therein, which communicate with the plurality of spaces partitioned by the partition wall 116 and the upper and lower partition walls 117 and 118. Likewise, the rear wall 115 has through-holes 115*a* formed therein, which communicate with the plurality of spaces partitioned by the partition wall 116 and the upper and lower partition walls 117 and 118.

Thus, in this embodiment, the plurality of spaces penetrating in the front-rear axis are formed in the housing main body 11. Then, the plug terminals (lower plug terminals 13 and upper plug terminals 14) are press-fitted (inserted) into the spaces penetrating in the front-rear axis.

Furthermore, in this embodiment, a plurality of spaces arranged in the width axis (extending direction of Y axis) are formed in two stages in the top-bottom axis (extending direction of Z axis) in the housing main body 11. These plurality of spaces are formed in a staggered pattern when viewed from the rear side in the front-rear axis of the housing main body 11. Accordingly, the plug connector 1 is reduced in size in the width axis.

To be more specific, on the lower side (mounting surface 1*a*A side) of the housing main body 11, a plurality of spaces defined by the bottom wall 112, the partition wall 116, and the lower partition walls 118 are arranged in the width axis (extending direction of Y axis). These spaces formed on the lower side (mounting surface 1*a*A side) of the housing main body 11 serve as first spaces S1 into which lower plug terminals 13 are press-fitted (inserted).

On the other hand, on the upper side (position further away from the mounting surface 1*a*A than the first spaces S1) of the housing main body 11, a plurality of spaces defined by the top wall 111, the partition wall 116, and the upper partition walls 117 are arranged in the width axis (extending direction of Y axis). These spaces formed on the upper side of the housing main body 11 serve as second spaces S2 into which upper plug terminals 14 are press-fitted (inserted).

In this embodiment, in a lower part of the housing main body 11, 12 spaces (lower spaces S1) are arranged in the width axis. On the other hand, in an upper part of the housing main body 11, 4 spaces (upper spaces S2) are arranged at one side of the lock part 12 in the width axis and 4 spaces (upper spaces S2) are arranged at the other side of the lock part 12 in the width axis. In other words, in the upper part of the housing main body 11, 8 spaces (upper spaces S2) are arranged in the width axis in such a manner as to sandwich the lock part 12. Accordingly, the housing main body 11 is reduced in size in the height dimension.

Furthermore, in this embodiment, the upper partition walls 117 and the lower partition walls 118 are formed at positions shifted from each other in the width axis. More specifically, the first spaces S1 and the second spaces S2 are formed so as to partially overlap with each other in the plan view. In other words, the first spaces S1 and the second spaces S2 overlap with each other, when the plug housing 10 is viewed along a direction (top-bottom axis) normal to the mounting surface 1*a*A, in a state where the plug terminals (lower plug terminals 13 and upper plug terminals 14) are held by the plug housing 10 and also mounted on the cable 1A.

The lower plug terminals 13 are each configured to be press-fitted (inserted) forward from an opening at the rear end side of the first space S1. This opening at the rear end side of the first space S1 serves as an insertion opening (insertion slot) S1*a*. Also, an opening at the front end side of the first space S1 is formed to be smaller than the insertion opening S1*a* so as to prevent the lower plug terminal 13 from falling off. More specifically, forward movement of the lower plug terminal 13 press-fitted (inserted) from the insertion opening S1*a* is restricted by the front wall 114. Note that the opening at the front end side of the first space S1 serves as an introduction port S1*b* for introducing a contact portion 230*a* of the lower receptacle terminal 23 of the receptacle connector 2 to be described later into the first space S1. This introduction port S1*b* has its peripheral portion formed into a tapered shape so as to facilitate introduction of the contact portion 230*a* of the lower receptacle terminal 23.

Likewise, the upper plug terminals 14 are each configured to be press-fitted (inserted) forward from an opening at the rear end side of the second space S2. This opening at the rear end side of the second space S2 serves as an insertion opening (insertion slot) S2*a*. Also, an opening at the front end side of the second space S2 is formed to be smaller than the insertion opening S2*a* so as to prevent the upper plug terminal 14 from falling off. More specifically, forward movement of the upper plug terminal 14 press-fitted (inserted) from the insertion opening S2*a* is restricted by the front wall 114. Note that the opening at the front end side of the second space S2 serves as an introduction port S2*b* for introducing a contact portion 240*a* of the upper receptacle terminal 24 of the receptacle connector 2 to be described later into the second space S2. This introduction port S2*b* has its peripheral portion formed into a tapered shape so as to facilitate introduction of the contact portion 240*a* of the upper receptacle terminal 24.

Moreover, in the lower part of the rear end of the top wall 111, grooves 111*b* opened rearward and downward are formed to communicate with the second space S2. In this embodiment, the grooves 111*b* are formed on one side of the second space S2 in the width direction and upper ends of side walls 144 of the upper plug terminals 14 to be described later are inserted into the grooves 111*b*. In this embodiment, the grooves 111*b* are formed to have a groove width (length in the width axis) slightly larger than the thickness of the side wall 144.

Likewise, in the lower part of the rear end of the partition wall 116, grooves 116*a* opened rearward and downward are formed to communicate with the first space S1. In this embodiment, the grooves 116*a* are formed on one side of the first space S1 in the width direction and upper ends of side walls 134 of the lower plug terminals 13 to be described later are inserted into the grooves 116*a*. In this embodiment, the grooves 116*a* are formed to have a groove width (length in the width axis) slightly larger than the thickness of the side wall 134.

Furthermore, in the upper part of the rear end of the partition wall 116, grooves 116*b* opened rearward and downward are formed to communicate with the second space S2. The grooves 116*b* are formed so as to face the groove 111*b* in the top-bottom axis and a leg part 141 of the upper plug terminal 14 has its upper part inserted into this groove 116*b*. In this embodiment, the grooves 116*b* are formed to have a groove width (length in the width axis) slightly larger than the thickness of the leg part 141.

Moreover, the pair of side walls 113, 113 respectively include: a pair of side wall main bodies 1131, 1131 and side wall side extension parts 1132, 1132 connecting to rear end of the side wall main bodies 1131, 1131.

In this embodiment, the pair of side wall main bodies 1131, 1131 respectively include: an upper step part 11311 extending in the top-bottom axis and a lower step part 11312 extending in the top-bottom axis on the outer side of the width axis than the upper step part 11311. Also, the pair of side wall main bodies 1131, 1131 respectively include a connection part 11313 extending in the horizontal direction and connecting between lower end of the upper step part 11311 and upper end of the lower step part 11312. Then, the side wall side extension parts 1132, 1132 extending rearward are formed in the pair of lower step parts 11312 respectively. Further, the pair of side wall side extension parts 1132, 1132 are formed to face each other along the width axis. A region where the side wall side extension parts 1132, 1132 face each other serves as a recess part 1133 that houses first and second mounting pieces 132 and 142 of the plug terminals 13 and 14.

As described above, in this embodiment, the first and second mounting pieces 132 and 142 of the plug terminals 13 and 14 are mounted on the exposed conductor part 151*b*A of the cable 1A at the position closer to the front than the rear ends of the side wall side extension parts 1132, 1132. In this event, the connection region 11A of the cable 1A is sandwiched between the side wall side extension parts 1132, 1132 and the reinforcing plate 14A.

With this configuration, when the cable 1A is fanned to move away from the reinforcing plate 14A, the cable 1A and the reinforcing plate 14A can be more surely suppressed from coming off each other. Furthermore, in this embodiment, the first and second mounting pieces 132 and 142 of the plug terminals 13 and 14 are positioned closer to the front than the tips (rear ends) of the side wall side extension parts 1132, 1132. Thus, the first and second leg parts 131 and 141 of the plug terminals 13 and 14 as well as the first and second mounting pieces 132 and 142 can be prevented from being deformed by fanning of the cable 1A. More specifically, the mounting parts between the cable 1A and the plug terminals 13 and 14 can be protected from fanning of the cable 1A.

Moreover, in this embodiment, at the inner side of the width axis of the pair of side wall side extension parts 1132, holding bracket attachments 1134, 1134 are formed, respectively, to hold the holding brackets 15. Thus, in this embodiment, in the recess part 1133 that houses first and second mounting pieces 132 and 142 of the plug terminals 13 and 14, the holding bracket attachments 1134, 1134 are also formed.

The holding bracket attachment 1134 includes: a recess part 1134*a* opened in the top-bottom axis and inward of the width axis; and slits 1134*b*, 1134*b* provided continuously outward, in the width axis, of the recess part 1134*a*, into which both ends, in the front-rear axis, of a main body part 151 of the holding bracket 15 is inserted. In a state where the holding brackets 15 are held by the plug housing 10, fixing pieces 152 provided continuously from lower ends of the main body parts 151 are fixed to the fixing parts 15*d*A of the cable 1A, thereby fixing the plug housing 10 to the cable 1A.

Moreover, in this embodiment, the bottom wall 112 includes a bottom wall main body 1121 connected to lower ends of the pair of side wall side extension parts 1131, 1131 (lower ends of the pair of lower step parts 11312, 11312). The bottom wall 112 also includes a bottom wall side extension part 1122 connected to lower ends of the pair of side wall side extension parts 1131, 1131 and rear end of the bottom wall main body 1121. Thus, in this embodiment, a bottom surface 112*a* of the bottom wall 112 (lower side surface of the top-bottom axis) includes: a bottom surface 1121*a* of the bottom wall main body 1121 and a bottom surface 1122*a* of the bottom wall side extension part 1122. Here, in this embodiment, the bottom wall side extension part 1122 is connected to upper part of a rear end surface 1121*b* of the bottom wall main body 1121. More specifically, a bottom surface 112*a* of the bottom wall 112 has a step shape in which the bottom surface 1122*a* of the bottom wall side extension part 1122 is positioned above the bottom surface 1121*a* of the bottom wall main body 1121.

Then, the rear end surface 1121*b* is positioned forward than a rear end surface 115*b* of the rear wall 115 in the front-rear axis. This prevents the leg parts 131 of the press-fitted (inserted) lower plug terminals 13 from interfering with the bottom wall 112.

Moreover, at the lower side (rear surface side) of the bottom wall 112, a protrusion part 11211 extending in the front-rear axis is formed so as to protrude downward. The description is later given of a specific configuration of the protrusion part 11211.

Furthermore, at the lower side (rear surface side) of the bottom wall 112, a second protrusion part 1123, which is a protrusion part different from the protrusion part 11211, is formed so as to protrude downward. In this embodiment, the second protrusion part 1123 is formed on the rear side of the front-rear axis than the protrusion part 11211.

By forming such a second protrusion part 1123 in the bottom wall 112, a recess part 1124 is formed in the lower surface of the bottom wall 112. Thus, when the plug connector 1 is mounted on the cable 1A, the connection region 11A having the reinforcing plate 14A attached thereto is housed in the recess part 1124 (see FIG. 9(*b*)). As described above, in this embodiment, the connection region 11A to which the reinforcing plate 14A is attached serves as a for-connection portion 10A which is housed and held in the recess part 1124. Then, the second protrusion parts 1123 are formed on the bottom wall 112 such that the amount of protrusion is larger than or equal to the thickness of the for-connection portion 10A (the sum of the thicknesses of the cable 1A and the reinforcing plate 14A).

In this embodiment, the second protrusion parts 1123 include a front protrusion part 11231 formed to elongate in the width axis at a portion of the bottom wall 112 where the rear end of the protrusion part 11211. The front protrusion part 11231 is formed on the rear side of the bottom wall main body 1121 and is formed to protrude outward in the width axis than the lower step part 13312. In this embodiment, the front protrusion part 11231 is formed from the bottom surface 1121*a* of the bottom wall main body 1121 to the connection part 11313. Then, the front protrusion part 11231 is configured that a portion protruding outward in the width axis than the lower step part 13312 can be pinched by hand.

Furthermore, in this embodiment, the front protrusion part 11231 is provided with a plurality of through holes 11231*a* that penetrate in the front-rear axis (extending direction of the X axis). These through holes 11231*a* are formed such that the front protrusion part 11231 does not overlap with the connecting parts (first mounting pieces 132 and second mounting pieces 142) of the plurality of terminals (lower plug terminals 13 and upper plug terminals 14) when viewed along the front-rear axis. Furthermore, in this embodiment, portions of the front protrusion part 11231 that corresponds to the fixing pieces 152 of the holding brackets 15 is also provided with the through holes 11231*a* when viewed along the front-rear axis. Thus, the front protrusion part 11231 does not overlap with the fixing pieces 152 of the holding brackets 15 when viewed along the front-rear axis.

Moreover, the second protrusion parts 1123 include rear protrusion parts 11232 formed at portions of the bottom wall 112 rearward in the front-rear axis than the front protrusion part 11231. In this embodiment, a pair of rear protrusion parts 11232, 11232 are formed on both ends in the width direction of the bottom wall side extension part 1122 so as to extend in an elongated manner along the front-rear axis.

Then, one front protrusion part 11231 and the pair of rear protrusion parts 11232, 11232 surround the for-connection portion 10A (the cable 1A and the reinforcing plate 14A) having a substantially rectangular shape on three sides when the plug connector 1 is mounted on the cable 1A. More specifically, the second protrusion parts 1123 are formed only at peripheral edge portions of the for-connection portion 10A. Note that, the for-connection portion 10A may have any shape as long as it can be housed in the recess part 1124.

Furthermore, in this embodiment, as described above, the bottom surface 112*a* of the bottom wall 112 is formed in the step shape in which the bottom surface 1122*a* of the bottom wall side extension part 1122 is positioned above the bottom surface 1121*a* of the bottom wall main body 1121. Moreover, the front protrusion part 11231 is formed on the rear side of the bottom wall main body 1121 and the rear protrusion parts 11232 are formed on both ends in the width direction of the bottom wall side extension part 1122. Therefore, in this embodiment, a mounting protrusion part 11221 is provided at the rear end of the bottom wall side extension part 1122 so as to extend along the width axis. Thus, the connected part 10A can be housed in the recess part 1124 in a substantially horizontal state.

Figure 12:
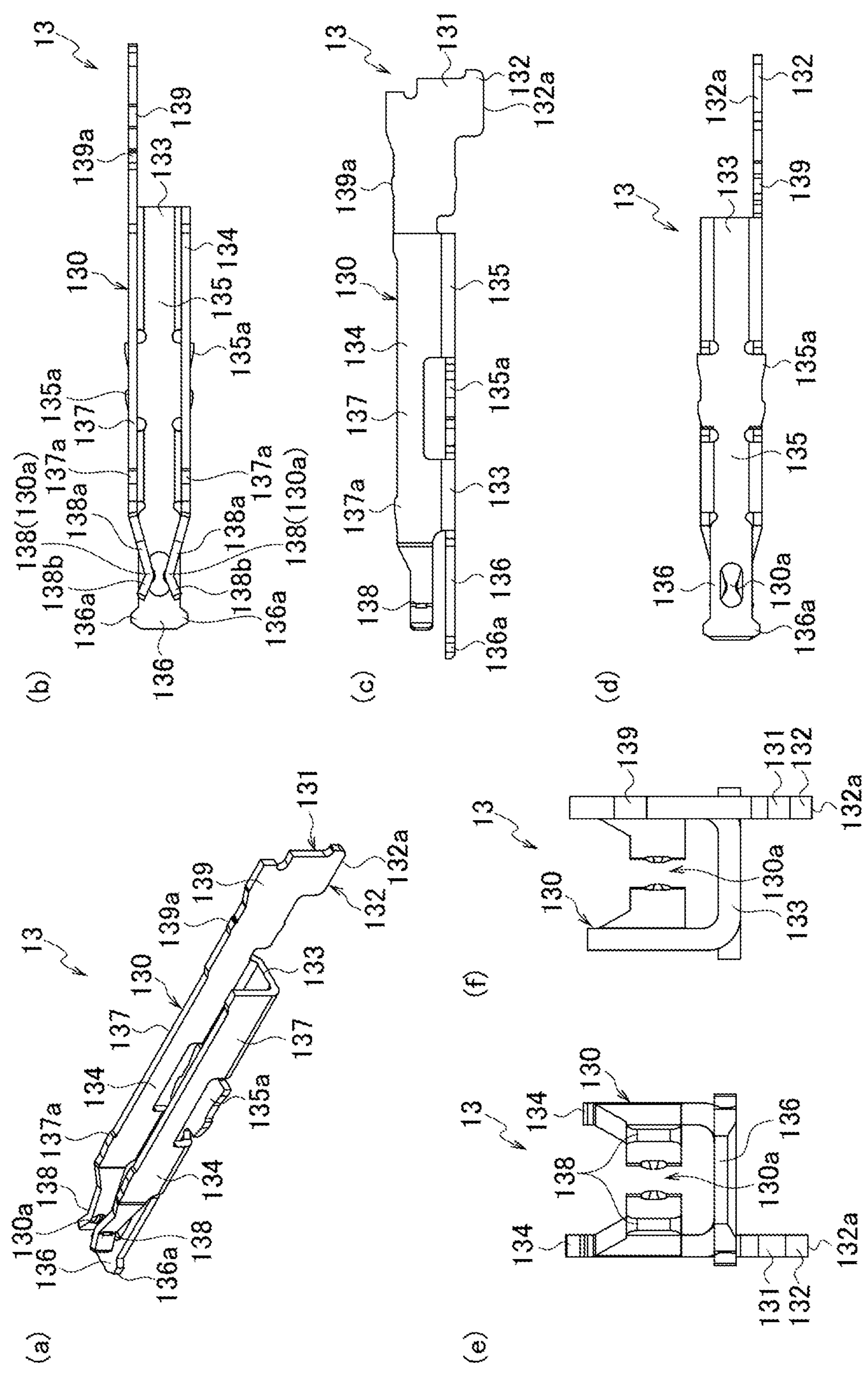
FIG. 12 is a diagram showing the lower plug terminal included in the plug connector, FIG. 12(*a*) is a perspective view, FIG. 12(*b*) is a plan view, FIG. 12(*c*) is a side view, FIG. 12(*d*) is a reverse side view, FIG. 12(*e*) is a front view, and FIG. 12(*f*) is a back view.
Figure 13:
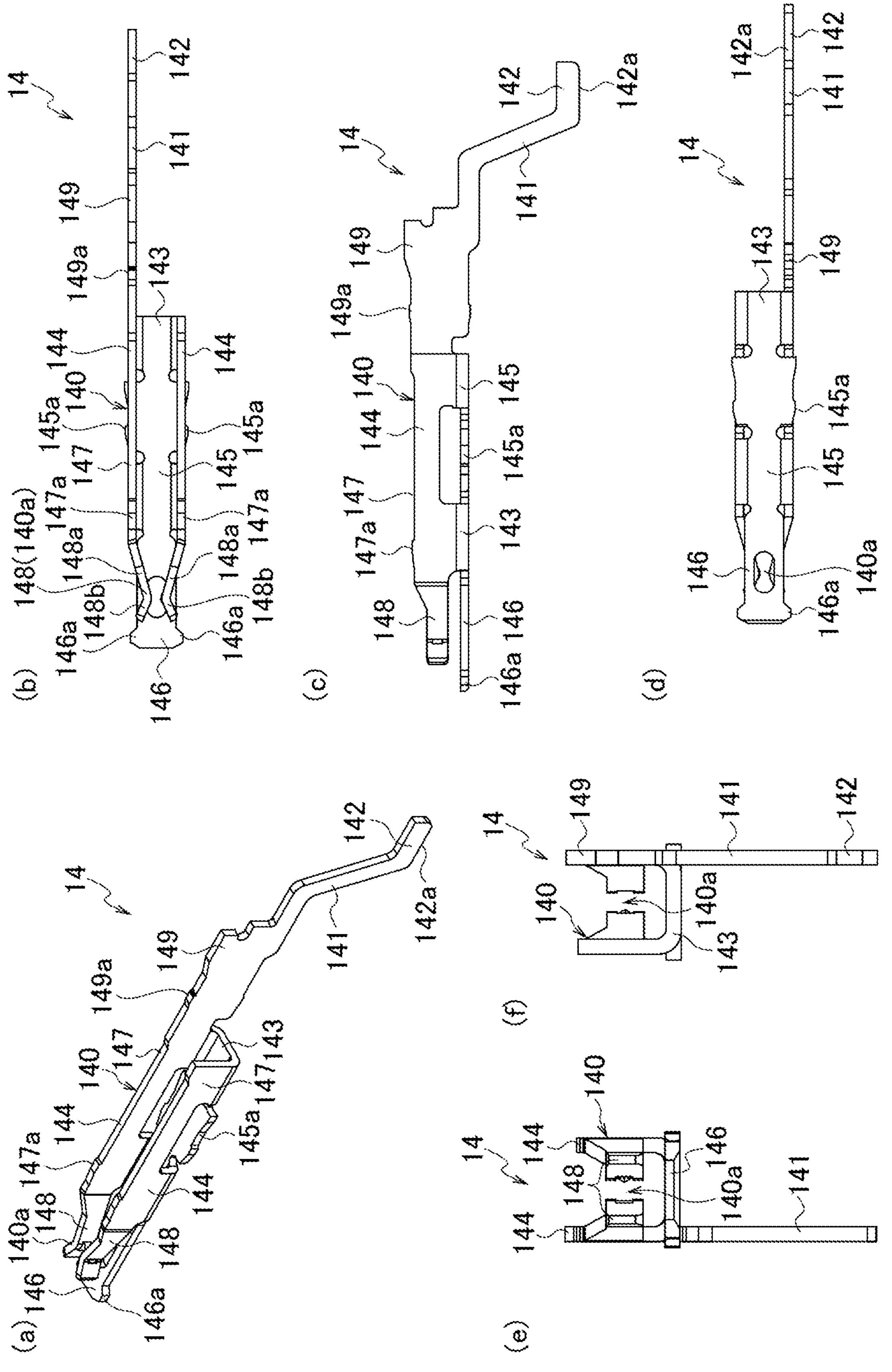
FIG. 13 is a diagram showing the upper plug terminal included in the plug connector, FIG. 13(*a*) is a perspective view, FIG. 13(*b*) is a plan view, FIG. 13(*c*) is a side view, FIG. 13(*d*) is a reverse side view, FIG. 13(*e*) is a front view, and FIG. 13(*f*) is a back view.

Next, with reference to FIGS. 12 and 13, description is given of a specific configuration of the plug terminals (terminals).

In this embodiment, the plug terminals (terminals) each include: a main body part to be inserted into a space formed in the plug housing 10; a leg part extending from the main body part toward the mounting surface 1*a*A of the cable 1A in a state where the plug terminals are mounted on the cable (the connecting member) 1A; and a mounting part provided continuously from the leg part and to be mounted on the cable 1A.

To be more specific, the plug terminals include the lower plug terminal 13 to be press-fitted (inserted) into the first space S1 formed on the lower side (mounting surface 1*a*A side) of the housing main body 11. The plug terminals further include the upper plug terminal 14 to be press-fitted (inserted) into the second space S2 formed on the upper side (position further away from the mounting surface 1*a*A than the first space S1) of the housing main body 11.

In this embodiment, the lower plug terminal 13 is conductive, and a plurality of the lower plug terminals 13 are arranged in the width axis (a direction extending along the Y axis) of the plug housing 10. As shown in FIG. 12, the lower plug terminal 13 has a shape formed by bending a strip-shaped metal member in a strip thickness direction, and has an approximately U-shape when viewed along the insertion direction (front-rear axis; a direction extending along the X axis) (see FIGS. 12(*e*) and 12(*f*)). The lower plug terminal 13 as above can be formed, for example, by punching out a strip-shaped metal member having a specified shape and bending it.

The lower plug terminal 13 also includes a first main body part (main body part) 130 to be press-fitted (inserted) into the first space S1. The lower plug terminal 13 further includes: a first leg part (leg part) 131 extending from the first main body part 130 toward the mounting surface 1*a*A in a state where the lower plug terminal 13 is mounted on the cable (the connecting member) 1A. Then, the lower plug terminal 13 includes: a first mounting piece (connecting part) 132 provided continuously from the first leg part 131 and to be mounted on the cable 1A. The first mounting piece 132 (connecting part) is formed so as to protrude from the rear wall (first wall) 115 in a state where the lower plug terminal 13 is held in the plug housing (housing) 10.

The first main body part 130 includes a bottom wall 133 and a side wall 134 connected to both ends, in the width axis (a direction extending along the Y axis) of the bottom wall 133.

The bottom wall 133 includes: a bottom wall main body 135 provided continuously from the lower end of the side wall 134; and a contact protection part 136 that is provided continuously from the front end of the bottom wall main body 135 and protrudes forward. This contact protection part 136 prevents a contact part 130*a* of the lower plug terminal 13 from coming into contact with the housing main body 11 when the first main body part 130 is press-fitted (inserted) into the first space S1.

The bottom wall main body 135 and the contact protection part 136 have restricting pieces 135*a* and 136*a* formed therein, respectively, which protrude outward from both ends in the width axis (a direction extending along the Y axis). These restricting pieces 135*a* and 136*a* prevent the first main body part 130 from being obliquely press-fitted (inserted) when the first main body part 130 is press-fitted (inserted) into the first space S1.

The side wall 134 includes: a side wall main body 137 having its lower end provided continuously from the bottom wall main body 135; and an elastically deformable contact piece 138 that is provided continuously from the front end of the side wall main body 137 and comes into contact with the contact part of the receptacle connector.

The side wall main body 137 has a restricting protrusion 137*a* formed at its upper end. This restricting protrusion 137*a* prevents the first main body part 130 from being lifted when press-fitted (inserted) into the first space S1.

The contact piece 138 includes: an inner bent piece 138*a* provided continuously from the front end of the side wall main body 137 so as to be bent inward in the width axis; and an outer bent piece 138*b* provided continuously from the front end of the inner bent piece 138*a* so as to be bent outward in the width axis.

In this embodiment, the contact pieces 138 are provided continuously from the pair of side wall main bodies 137, 137, respectively, and are formed to be approximately line-symmetric in the plan view. More specifically, the pair of contact pieces 138, 138 include: the inner bent pieces 138*a*, 138*a* bent in a direction of getting close to each other toward the front; and the outer bent pieces 138*b*, 138*b* bent in a direction of getting away from each other toward the front.

The contact part 230*a* of the receptacle connector 2 is sandwiched in a spot (connection between the inner bent piece 138*a* and the outer bent piece 138*b*) where the pair of contact pieces 138, 138 come closest to each other (see FIG. 3(*b*)). Thus, in this embodiment, the pair of contact pieces 138, 138 function as the contact part 130*a* of the lower plug terminal 13. Also, the pair of outer bent pieces 138*b* function as a guide part for more smoothly guiding the contact part 230*a* of the receptacle connector 2.

Furthermore, in this embodiment, an extension wall 139 protruding rearward is provided continuously from the rear end of one of the pair of side wall main bodies 137, 137, and the first main body part 130 has a shape having its one side protruding rearward.

This extension wall 139 has a press-fit protrusion 139*a* formed at its upper end. The first main body part 130 is press-fitted into the first space S1 by sticking the press-fit protrusion 139*a* into the housing main body 11.

The first leg part 131 is provided extending downward (toward the cable 1A: connecting member) from the rear end of the extension wall 139. Thus, in this embodiment, the first leg part 131 is provided extending in the housing thickness direction from the first main body part 130 that is press-fitted (inserted) into the first space S1. Moreover, a first mounting piece 132 is provided continuously from the lower end of the first leg part 131 so as to protrude forward. In this embodiment, a flat lower end surface of the first mounting piece 132 extending in the substantially horizontal direction serves as a first mounting surface (mounting surface) 132*a* that can be mounted on the cable (connecting member) 1A.

In this event, the first leg part 131 and the first mounting piece 132 are each formed into a thin plate shape (plate shape) such that its plate thickness direction is approximately the same as the thickness direction of the side wall main body 137.

Therefore, in a state where the first main body part 130 is inserted into the first space S1 and also the first mounting piece (connecting part) 132 is mounted on the cable (connecting member) 1A, the thickness direction of the first leg part 131 is the width axis (a direction extending along the Y axis). More specifically, in a state where the plug connector 1 is mounted on the cable 1A, the thickness direction of the first leg part 131 is the direction intersecting with the insertion direction of the first main body part 130 into the first space S1 and with the direction normal to the mounting surface 1*a*A.

Meanwhile, the upper plug terminal 14 is also conductive, and a plurality of the upper plug terminals 14 are arranged in the width axis (a direction extending along the Y axis) of the plug housing 10. As shown in FIG. 13, the upper plug terminal 14 has a shape formed by bending a strip-shaped metal member in a strip thickness direction, and has an approximately U-shape when viewed along the insertion direction (front-rear axis; a direction extending along the X axis) (see FIGS. 13(*e*) and 13(*f*)). Such an upper plug terminal 14 can also be formed, for example, by bending a strip-shaped metal member.

The upper plug terminal 14 also includes a second main body part (main body part) 140 to be press-fitted (inserted) into the second space S2. The upper plug terminal 14 further includes: a second leg part (leg part) 141 extending from the second main body part 140 toward the mounting surface 1*a*A in a state where the upper plug terminal 14 is mounted on the cable 1A. Then, upper plug terminal 14 includes: a second mounting piece (connecting part) 142 provided continuously from the second leg part 141 and to be mounted on the cable 1A. The second mounting piece (connecting part) 142 is also formed so as to protrude from the rear wall (first wall) 115 in a state where the upper plug terminal 14 is held in the plug housing (housing) 10.

The second main body part 140 includes a bottom wall 143 and a side wall 144 provided continuously from both ends, in the width axis (a direction extending along the Y axis) of the bottom wall 143.

The bottom wall 143 includes: a bottom wall main body 145 provided continuously to the lower end of the side wall 144; and a contact protection part 146 that is provided continuously from the front end of the bottom wall main body 145 and protrudes forward. This contact protection part 146 prevents a contact part 140*a* of the upper plug terminal 14 from coming into contact with the housing main body 11 when the second main body part 140 is press-fitted (inserted) into the second space S2.

The bottom wall main body 145 and the contact protection part 146 have restricting pieces 145*a* and 146*a* formed therein, respectively, which protrude outward from both ends in the width axis (a direction extending along the Y axis). These restricting pieces 145*a* and 146*a* prevent the second main body part 140 from being obliquely press-fitted (inserted) when the second main body part 140 is press-fitted (inserted) into the second space S2.

The side wall 144 includes: a side wall main body 147 having its lower end connected to the bottom wall main body 145; and an elastically deformable contact piece 148 that is provided continuously from the front end of the side wall main body 147 and comes into contact with the contact part 240*a* of the receptacle connector 2.

The side wall main body 147 has a restricting protrusion 147*a* formed at its upper end. This restricting protrusion 147*a* prevents the second main body part 140 from being lifted when press-fitted (inserted) into the second space S2.

The contact piece 148 includes: an inner bent piece 148*a* provided continuously from the front end of the side wall main body 147 so as to be bent inward in the width axis; and an outer bent piece 148*b* provided continuously from the front end of the inner bent piece 148*a* so as to be bent outward in the width axis.

In this embodiment, the contact pieces 148 are continuous from the pair of side wall main bodies 147, 147, respectively, and are formed to be approximately line-symmetric in the plan view. More specifically, the pair of contact pieces 148, 148 include: the inner bent pieces 148*a*, 148*a* bent in a direction of getting close to each other toward the front; and the outer bent pieces 148*b*, 148*b* bent in a direction of getting away from each other toward the front.

The contact part 240*a* of the receptacle connector 2 is sandwiched in a spot (connection between the inner bent piece 148*a* and the outer bent piece 148*b*) where the pair of contact pieces 148, 148 come closest to each other (see FIG. 4(*b*)). Thus, in this embodiment, the pair of contact pieces 148, 148 function as the contact part 140*a* of the upper plug terminal 14. Also, the pair of outer bent pieces 148*b* function as a guide part for more smoothly guiding the contact part 240*a* of the receptacle connector 2.

Furthermore, in this embodiment, an extension wall 149 protruding rearward is provided continuously from the rear end of one of the pair of side wall main bodies 147, 147, and the second main body part 140 has a shape having its one side protruding rearward.

This extension wall 149 has a press-fit protrusion 149*a* formed at its upper end. The second main body part 140 is press-fitted into the second space S2 by sticking the press-fit protrusion 149*a* into the housing main body 11.

The second leg part 141 is provided extending downward (toward the cable 1A: connecting member) from the rear end of the extension wall 149. The second leg part 141 has its length, in the top-bottom axis, longer than the first leg part 131. Thus, in this embodiment, the second leg part 141 is provided extending in the housing thickness direction from the second main body part 140 that is press-fitted (inserted) into the second space S2. Moreover, a second mounting piece 142 is provided continuously from the lower end of the second leg part 141 so as to protrude rearward. In this embodiment, a flat lower end surface of the second mounting piece 142 extending in the substantially horizontal direction serves as a second mounting surface (mounting surface) 142*a* that can be mounted on the cable (connecting member) 1A.

Then, the first leg part 131 and the second leg part 141 are located at positions shifted by approximately a half pitch in the width axis in the state where the first main body part 130 and the second main body part 140 are inserted into the first space S1 and the second space S2. Thus, the connecting parts (first and second mounting pieces 132 and 142) are arranged in a staggered pattern in a state where the plurality of plug terminals 13 and 14 are held by the plug housing 10.

Moreover, the second leg part 141 and the second mounting piece 142 are also each formed into a thin plate shape (plate shape) such that its plate thickness direction is approximately the same as the thickness direction of the side wall main body 147.

Therefore, in a state where the second main body part 140 is inserted into the second space S2 and also the second mounting piece (connecting part) 142 is mounted on the cable (connecting member) 1A, the thickness direction of the second leg part 141 is the width axis (a direction extending along the Y axis). More specifically, in a state where the plug connector 1 is mounted on the cable 1A, the thickness direction of the second leg part 141 is the direction intersecting with the insertion direction of the second main body part 140 into the second space S2 and with the direction normal to the mounting surface 1*a*A.

Configuration Example of Receptacle Connector 2

Next, with reference to FIGS. 14 to 19, description is given of a configuration example of the receptacle connector 2.

Figure 14:
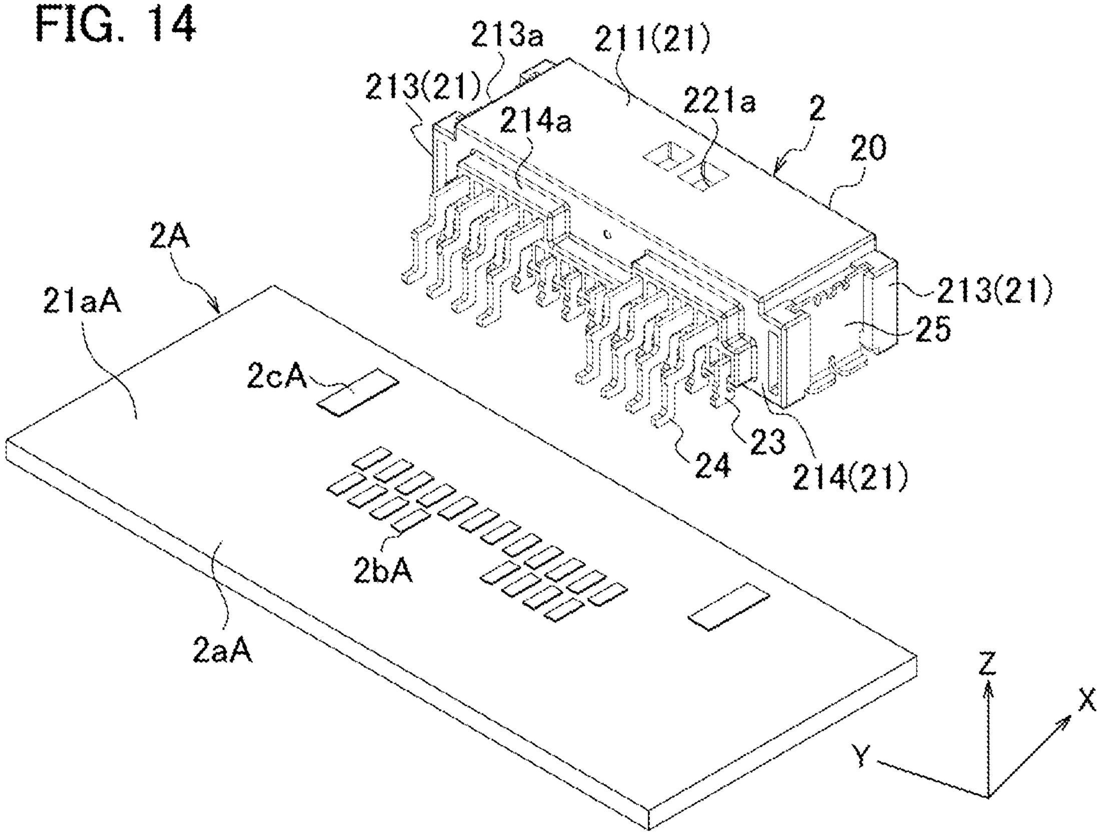
FIG. 14 is a perspective view showing a state before the receptacle connector included in the connector set shown as an example is mounted on the circuit board.
Figure 15:
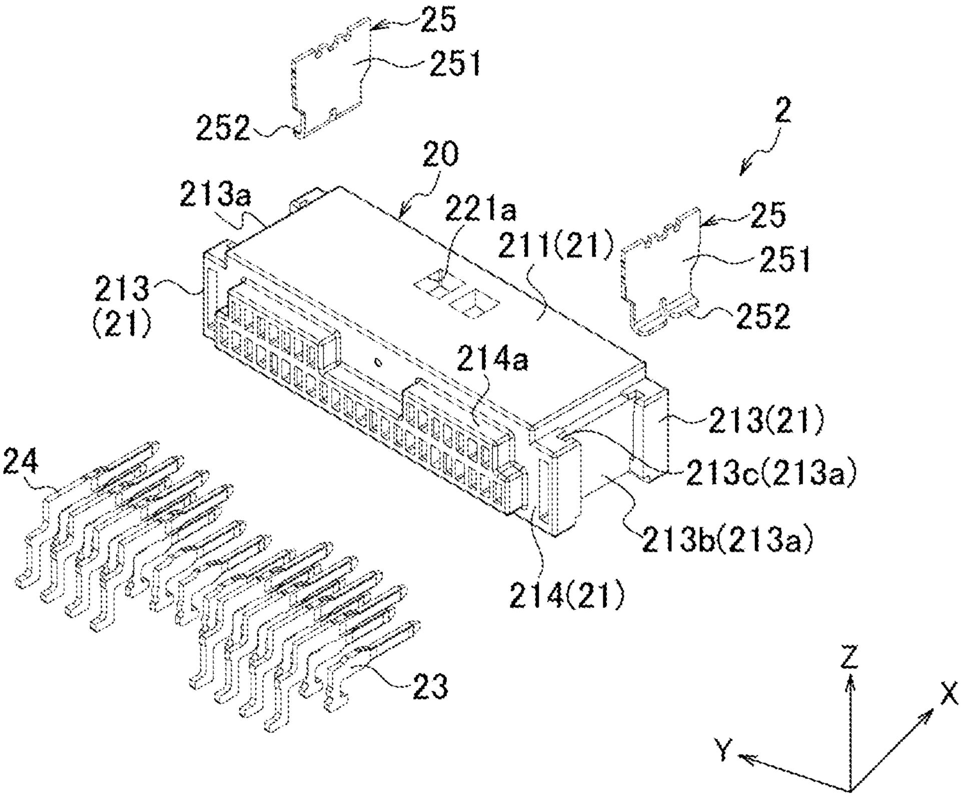
FIG. 15 is an exploded perspective view showing the receptacle connector included in the connector set shown as an example.
Figure 16:
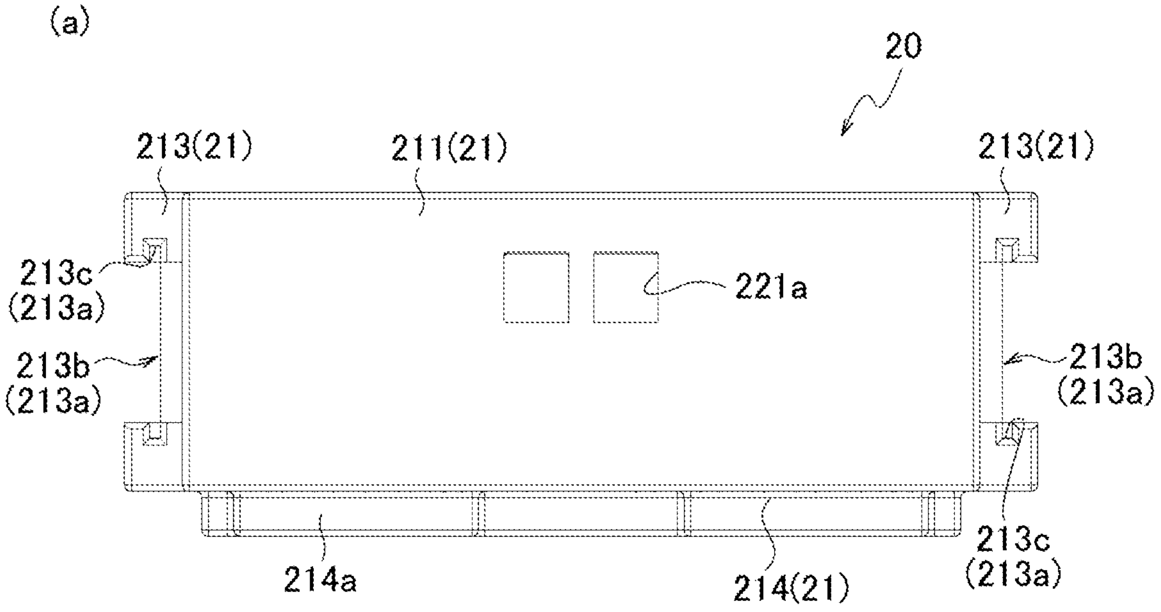
FIG. 16 is a diagram showing a receptacle housing included in the receptacle connector, FIG. 16(*a*) is a plan view and FIG. 16(*b*) is a reverse side view.
Figure 16:
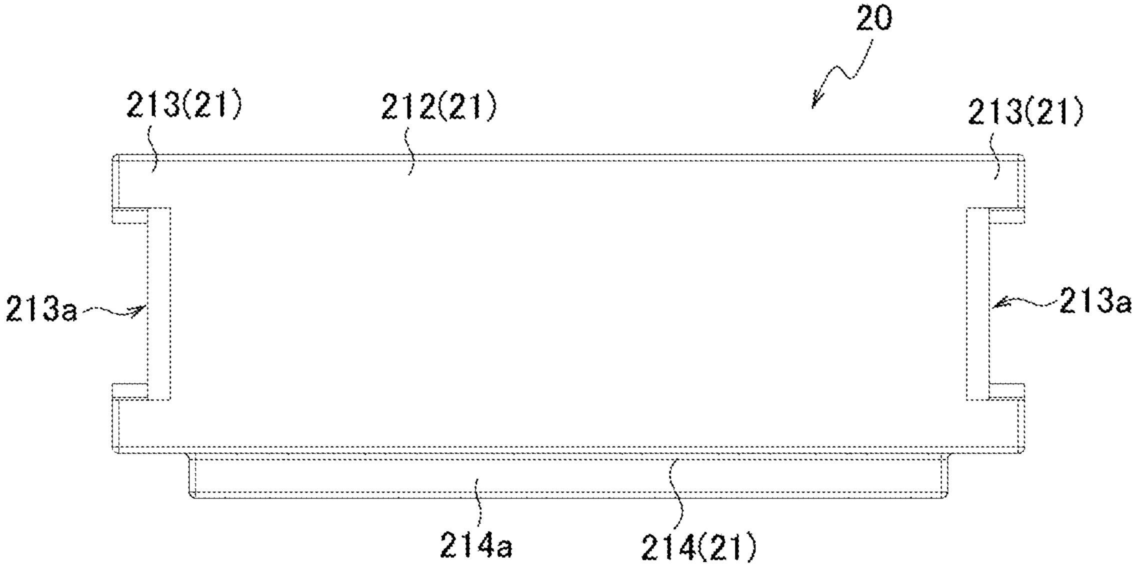
Figure 17:
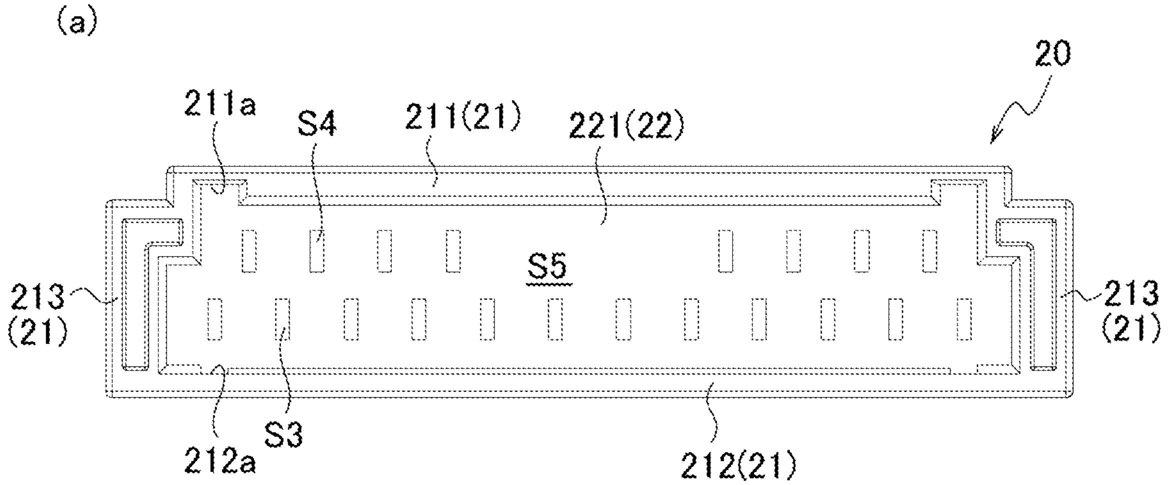
FIG. 17 is a diagram showing the receptacle housing included in the receptacle connector, FIG. 17(*a*) is a front view, FIG. 17(*b*) is a back view, FIG. 17(*c*) is a side view, and FIG. 17(*d*) is a sectional side view.
Figure 17:
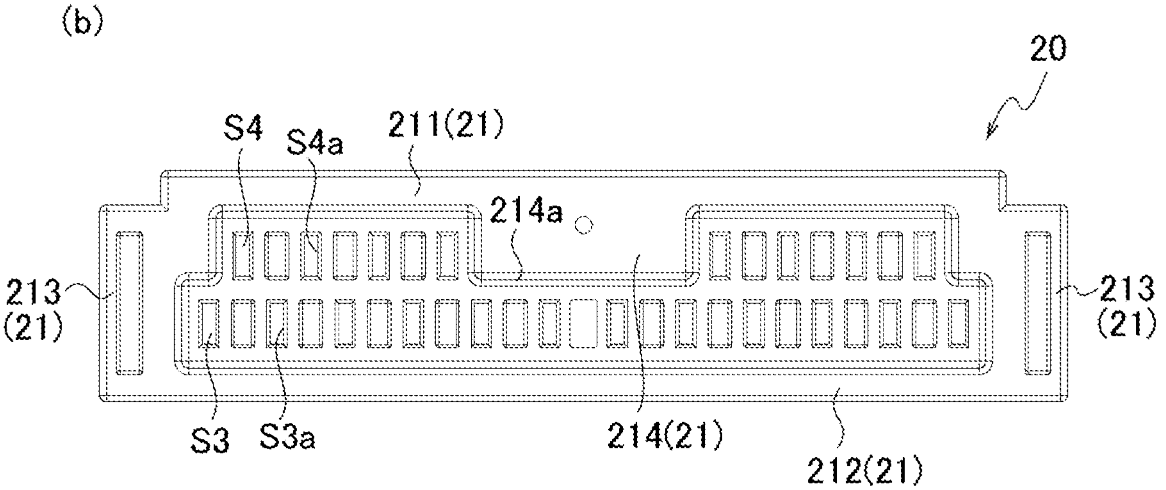
Figure 17:
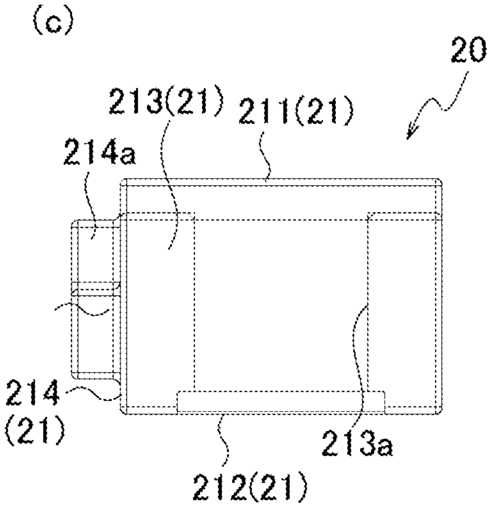
Figure 17:
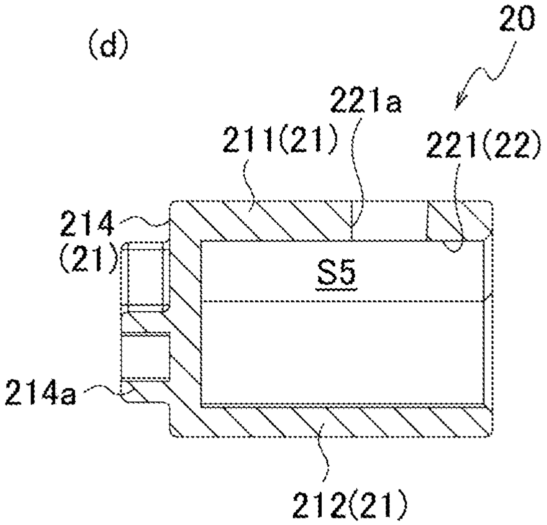

As shown in FIGS. 14 and 15, the receptacle connector 2 includes a receptacle housing (opponent housing) 20 and receptacle terminals (opponent terminals: lower receptacle terminals 23 and upper receptacle terminals 24) held by the receptacle housing 20. The receptacle connector 2 also includes holding brackets (opponent holding brackets) 25 held by the receptacle housing 20.

Then, the receptacle terminals 23 and 24 held by the receptacle housing 20 is mounted on the conductor part 2*b*A of the circuit board 2A disposed outside the receptacle housing 20. Thus, the receptacle connector 2 is mounted on the circuit board 2A as the opponent connecting member. Note that the receptacle terminals 23 and 24 are also mounted on the conductor part 2*b*A by soldering or the like. The holding brackets 25 are fixed to the fixing parts 2*c*A of the circuit board 2A by soldering or the like, in a state where the holding brackets 25 are held by the receptacle housing 20, to fix the receptacle housing 20 to the circuit board 2A.

Note that the circuit board 2A includes a board main body 2*a*A that has an approximately rectangular plate shape and is formed of a rigid and insulating resin material or the like. The conductor part 2*b*A and the fixing parts 2*c*A are formed so as to be exposed to the surface 21*a*A of the board main body 2*a*A. Thus, in this embodiment, the surface 21*a*A of the board main body 2*a*A serves as a mounting surface.

The receptacle housing 20 includes a rigid housing main body 21, and can be formed, for example, using an insulating resin material.

The housing main body 21 also has a lock insertion part 22 formed on its upper side. The lock part 12 configured to hold the plug housing 10 and the receptacle housing 20 in their fitted state or to release the fitted state is inserted into this lock insertion part 22.

Thus, in this embodiment, the receptacle housing 20 includes the housing main body 21 and the lock insertion part 22 formed in the housing main body 21.

The housing main body 21 includes a top wall 211, a bottom wall 212, a pair of side walls 213 connecting both ends, in the width axis (a direction extending along the Y axis), of the top wall 211 and the bottom wall 212, and a rear wall 214 provided continuously from rear ends of the top wall 211, the bottom wall 212, and the side walls 213, 213.

The lock insertion part 22 is formed in the middle, in the width axis, of the top wall 211. To be more specific, the lock insertion part 22 includes a housing part 221 that is formed inside of the top wall 211, and houses the lever part 121. In the middle, in the front-rear axis, of the housing part 221, an engagement recess part (engaged part) 221*a* is formed to engage with the engagement protrusion 121*b* of the lock part 12.

Moreover, guide grooves 211*a* are formed at both ends in the width direction of the top wall 211. The shape of this guide groove 211*a* corresponds to the shape of the guide protrusion 111*a*. When the plug housing 10 is fitted into the receptacle housing 20, the guide protrusion 111*a* is inserted into the guide groove 211*a*. Thus, the guide protrusion 111*a* positions the plug housing 10 in the width axis.

In addition, grooves 212*a* are formed at both ends in the width direction of the bottom wall 212. The shape of this groove 212*a* corresponds to the shape of the protrusion part 11211. When the plug housing 10 is fitted into the receptacle housing 20, the protrusion part 11211 is inserted into the groove 212*a*.

Moreover, the rear wall 214 has a plurality of spaces formed therein, which penetrate in the front-rear axis. In this embodiment, a plurality of spaces arranged in the width axis (a direction extending along the Y axis) are formed in two stages in the top-bottom width axis (a direction extending along the Z axis). These spaces are formed in a staggered pattern when viewed from the rear side in the front-rear axis of the housing main body 21. Accordingly, the receptacle connector 2 is reduced in size in the width axis.

Then, the lower receptacle terminals 23 and the upper receptacle terminals 24 are press-fitted (inserted) into the spaces penetrating in the front-rear axis, respectively.

To be more specific, the spaces formed on the lower side (mounting surface 21*a*A side) of the housing main body 21 serve as first spaces S3 into which lower receptacle terminals 23 are press-fitted (inserted).

On the other hand, the spaces formed on the upper side (position further away from the mounting surface 21*a*A than the first spaces S3) of the housing main body 21 serve as second spaces S4 into which upper receptacle terminals 24 are press-fitted (inserted).

The lower receptacle terminals 23 are each configured to be press-fitted (inserted) forward from an opening at the rear end side of the first space S3. This opening at the rear end side of the first space S3 serves as an insertion opening (insertion slot) S3*a*. Likewise, the upper receptacle terminals 24 are each configured to be press-fitted (inserted) forward from an opening at the rear end side of the second space S4. This opening at the rear end side of the second space S4 serves as an insertion opening (insertion slot) S4*a*.

Moreover, the housing main body 21 has a fitting space S5 formed therein, which is opened forward (toward the plug connector 1 side). This fitting space S5 is a space into which the housing main body 11 of the plug housing 10 is inserted and fitted, and which is defined by the top wall 211, the bottom wall 212, the pair of side walls 213, 213, and the rear wall 214. Therefore, the first space S3 and the second space S4 are formed to communicate with the fitting space S5, respectively. Note that, in this embodiment, part of the fitting space S5 serves as a housing part 221 of the lock insertion part 22.

Furthermore, in this embodiment, a plurality of projections 214*a* extending in the top-bottom axis and protruding rearward are arranged in the width axis at the rear end of the rear wall 214.

Moreover, the pair of side walls 213, 213 have holding bracket attachments 213*a*, 213*a* formed thereon, respectively, to hold the holding brackets 25.

In this embodiment, the holding bracket attachment 213*a* includes: a recess part 213*b* opened outward in the top-bottom axis and in the width axis; and slits 213*c*, 213*c* provided continuously inward, in the width axis, of the recess part 213*b*, into which both ends, in the front-rear axis, of a main body part 251 of the holding bracket 25 is inserted. In a state where the holding brackets 25 are held by the receptacle housing 20, fixing pieces 252 provided continuously from lower ends of the main body parts 251 are fixed to the fixing parts 2*c*A of the circuit board 2A, thereby fixing the receptacle housing 20 to the circuit board 2A.

Moreover, in this embodiment, the receptacle terminals each include: a main body part to be inserted into a space formed in the receptacle housing 20; a leg part extending from the main body part toward the mounting surface 21*a*A of the circuit board 2A in a state where the receptacle terminals are mounted on the circuit board (the mounting member) 2A; and a mounting part provided continuously from the leg part and to be mounted on the circuit board 2A.

To be more specific, the receptacle terminals include the lower receptacle terminal 23 to be press-fitted (inserted) into the first space S3 formed on the lower side (mounting surface 21*a*A side) of the housing main body 21. The receptacle terminals further include the upper receptacle terminal 24 to be press-fitted (inserted) into the second space S4 formed on the upper side (position further away from the mounting surface 21*a*A than the first space S3) of the housing main body 21.

Figure 18:
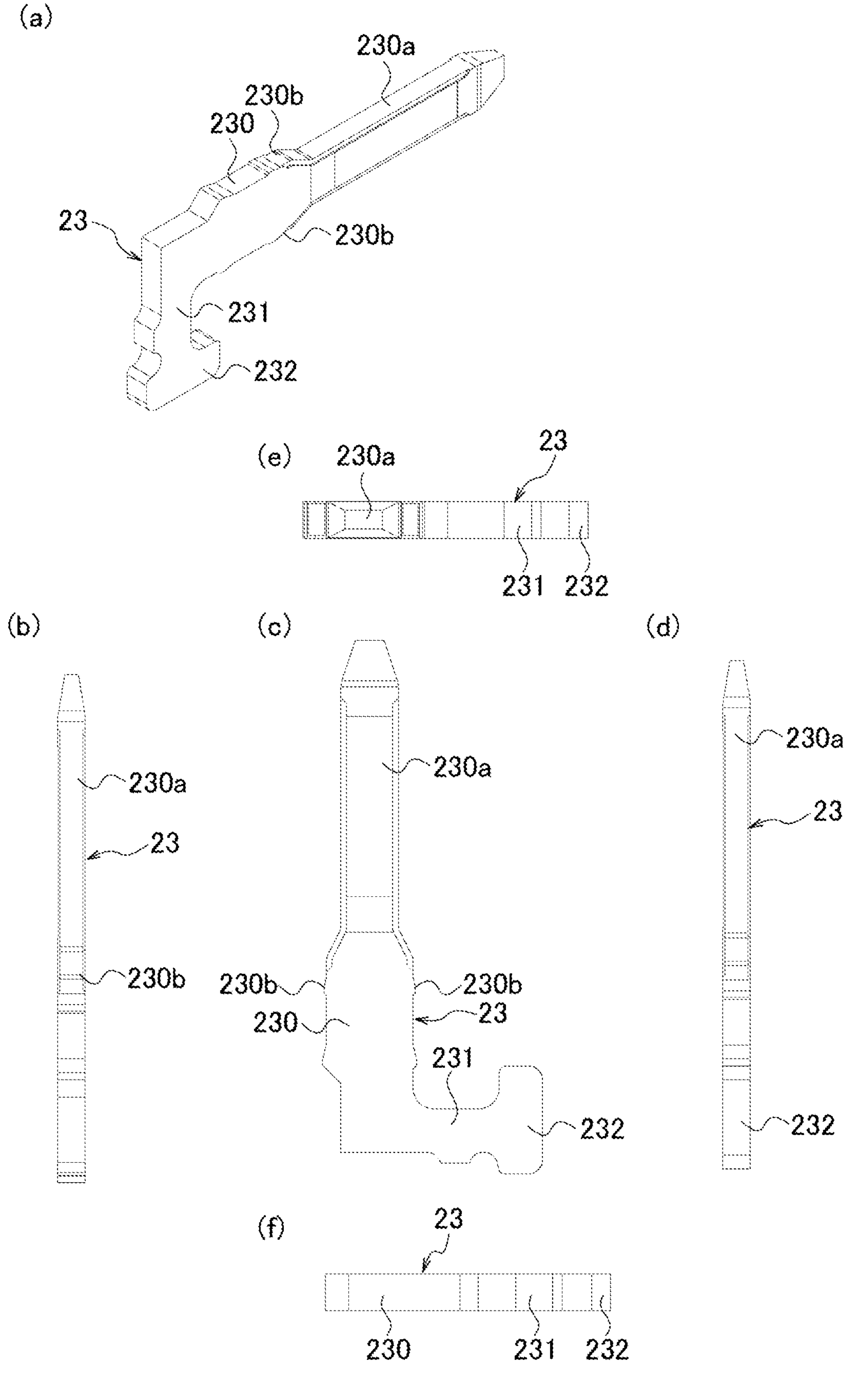
FIG. 18 is a diagram showing a lower receptacle terminal included in the receptacle connector, FIG. 18(*a*) is a perspective view, FIG. 18(*b*) is a plan view, FIG. 18(*c*) is a side view, FIG. 18(*d*) is a reverse side view, FIG. 18(*e*) is a front view, and FIG. 18(*f*) is a back view.

In this embodiment, the lower receptacle terminal 23 is conductive, and a plurality of the lower receptacle terminals 23 are arranged in the width axis (a direction extending along the Y axis) of the receptacle housing 20. As shown in FIG. 18, the lower receptacle terminal 23 is formed into a thin plate shape, and is press-fitted (inserted) from the rear side into the first space S3 formed in the housing main body 21 in a state where the plate thickness direction is approximately aligned with the width axis (a direction extending along the Y axis). Such a lower receptacle terminal 23 can be formed, for example, by punching thin sheet metal.

The lower receptacle terminal 23 also includes a first main body part (opponent main body part) 230 to be press-fitted (inserted) into the first space S3. The lower receptacle terminal 23 further includes: a first leg part (opponent leg part) 231 extending from the first main body part 230 toward the mounting surface 21*a*A in a state where the lower receptacle terminal 23 is mounted on the circuit board (the connecting member) 2A; and a first mounting piece (opponent connecting part) 232 provided continuously from the first leg part 231 and to be mounted on the circuit board 2A.

At the front end of the first main body part 230, an approximately rod-shaped contact part (opponent contact part) 230*a* is formed so as to protrude forward. Also, press-fit protrusions 230*b* are formed at the upper and lower ends of the first main body part 230. The first main body part 230 is press-fitted into the first space S3 by sticking the press-fit protrusions 230*b* into the housing main body 21. In the state where the first main body part 230 is press-fitted (inserted) into the first space S3, the contact part 230*a* is disposed in the fitting space S5.

Moreover, in this embodiment, the first leg part 231 is provided extending downward (toward the circuit board 2A: connecting member) from the rear end of the first main body part 230. To be more specific, the first leg part 231 is provided approximately linearly extending downward (toward the circuit board 2A: connecting member) from the rear end of the first main body part 230. Thus, in this embodiment, the first leg part 231 is provided extending in the housing thickness direction (top-bottom axis) from the first main body part 230 press-fitted (inserted) into the first space S3. The first mounting piece 232 is provided continuously from the lower end of this first leg part 231.

Figure 19:
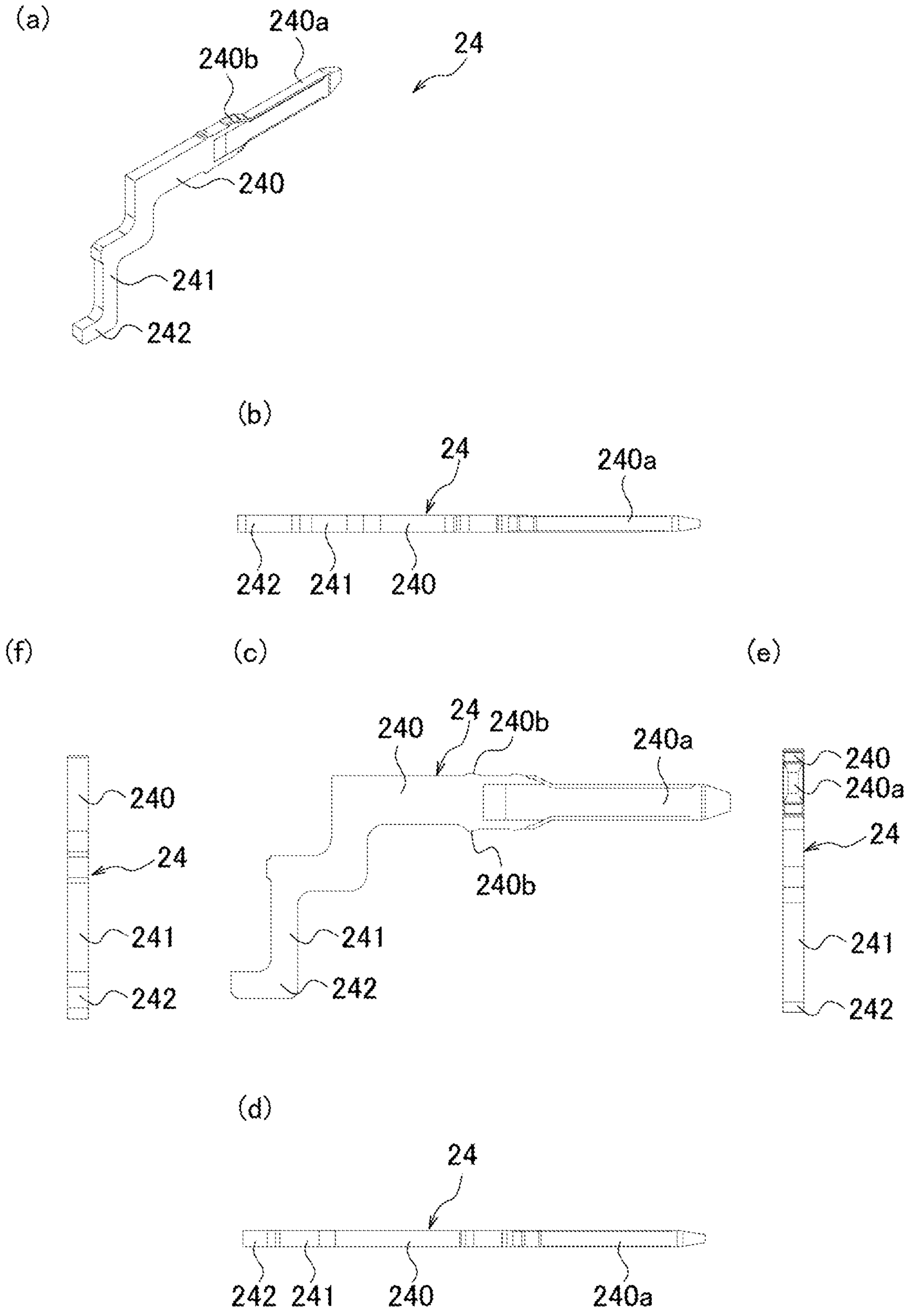
FIG. 19 is a diagram showing an upper receptacle terminal included in the receptacle connector, FIG. 19(*a*) is a perspective view, FIG. 19(*b*) is a plan view, FIG. 19(*c*) is a side view, FIG. 19(*d*) is a reverse side view, FIG. 19(*e*) is a front view, and FIG. 19(*f*) is a back view.
Figure 20:
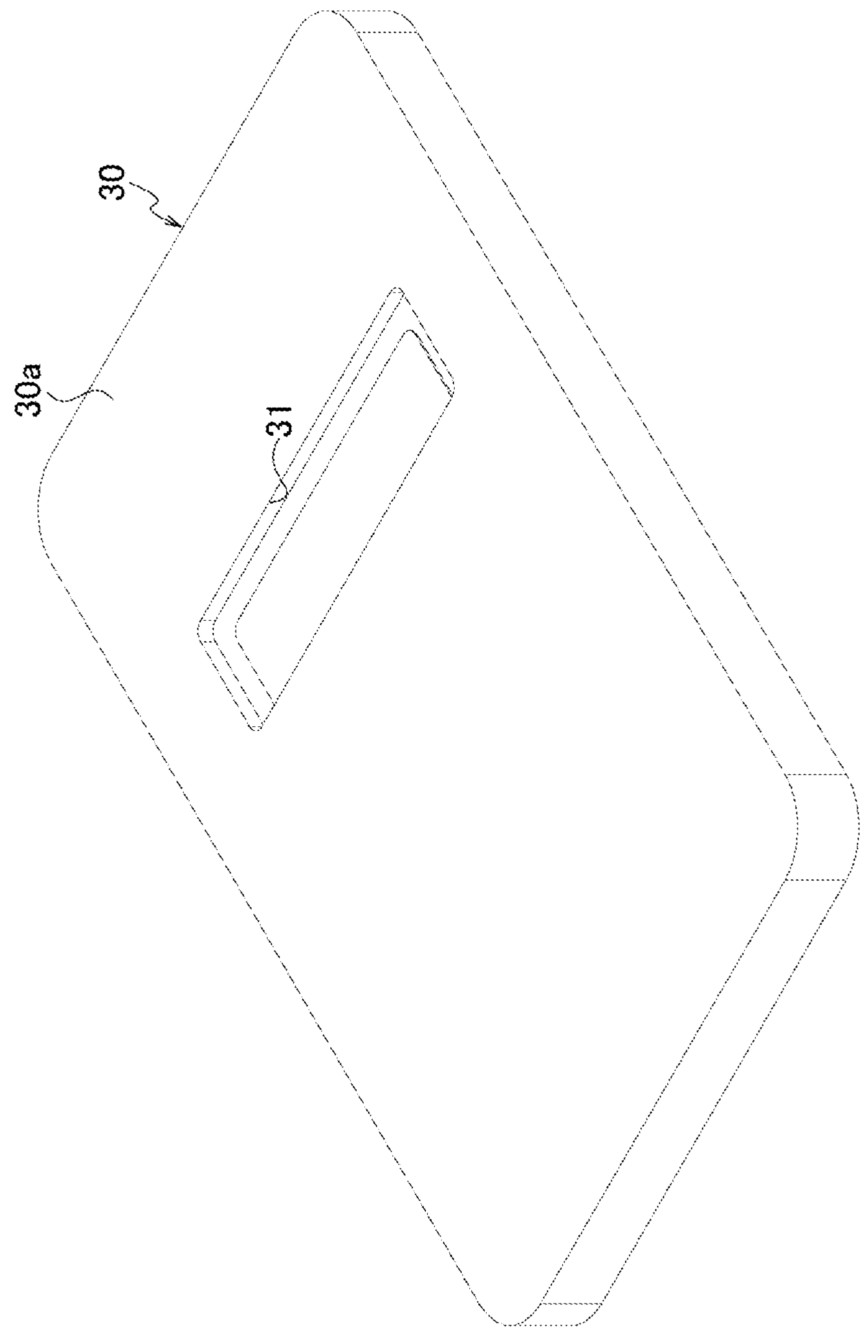
FIG. 20 is a perspective view showing a reflow carrier used when mounting the plug connector on the cable.
Figure 21:
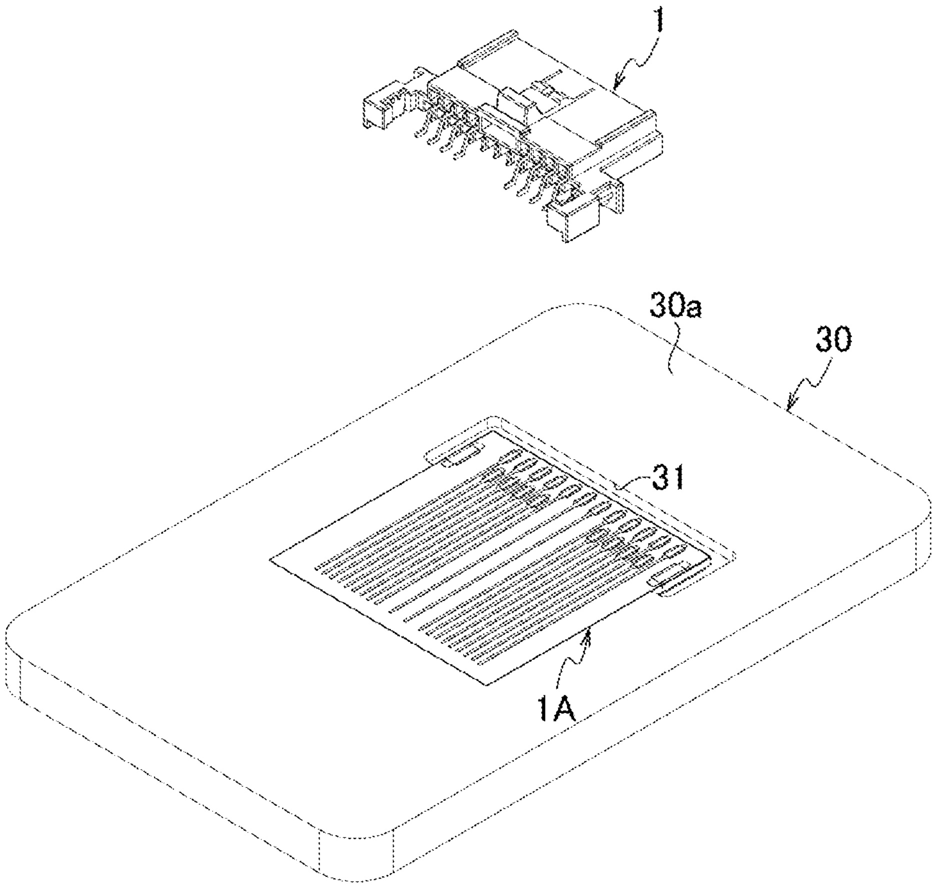
FIG. 21 is a diagram illustrating an example of a method for mounting the plug connector on the cable, and is a perspective view showing a state before the plug connector is placed on the cable placed on a reflow carrier.
Figure 22:
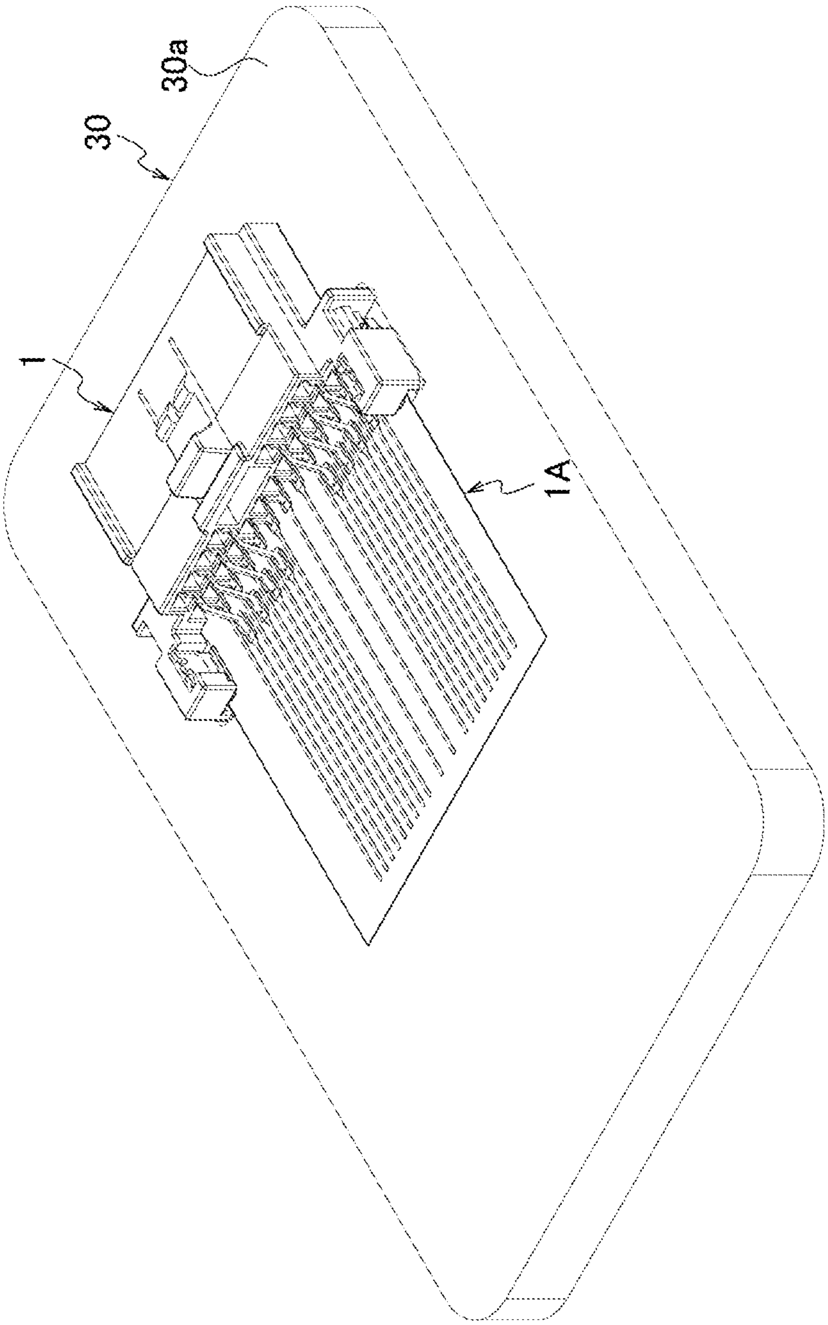
FIG. 22 is a diagram illustrating an example of a method for mounting the plug connector on the cable, and is a perspective view showing a state in which the plug connector is placed on the cable placed on the reflow carrier.
Figure 23:
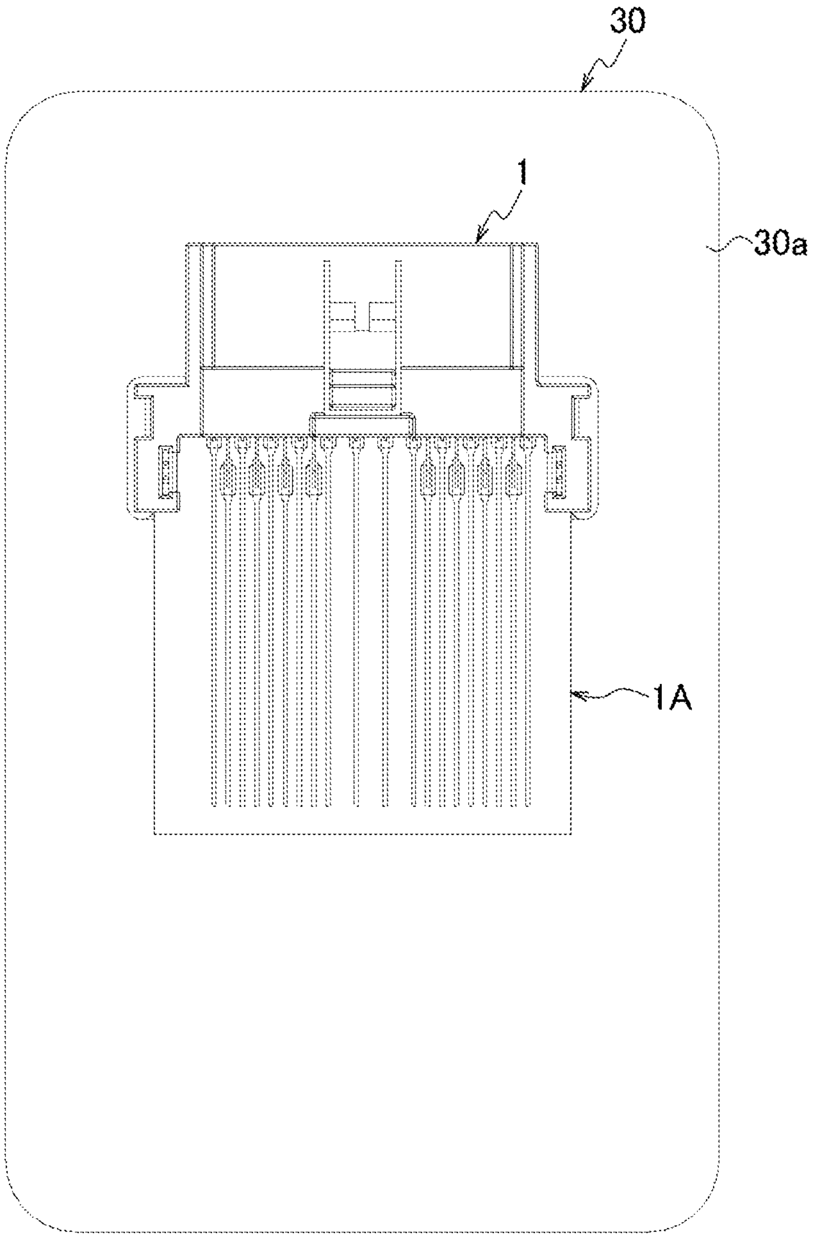
FIG. 23 is a diagram illustrating an example of a method for mounting the plug connector on the cable, and is a plan view showing a state in which the plug connector is placed on the cable placed on the reflow carrier.
Figure 24:
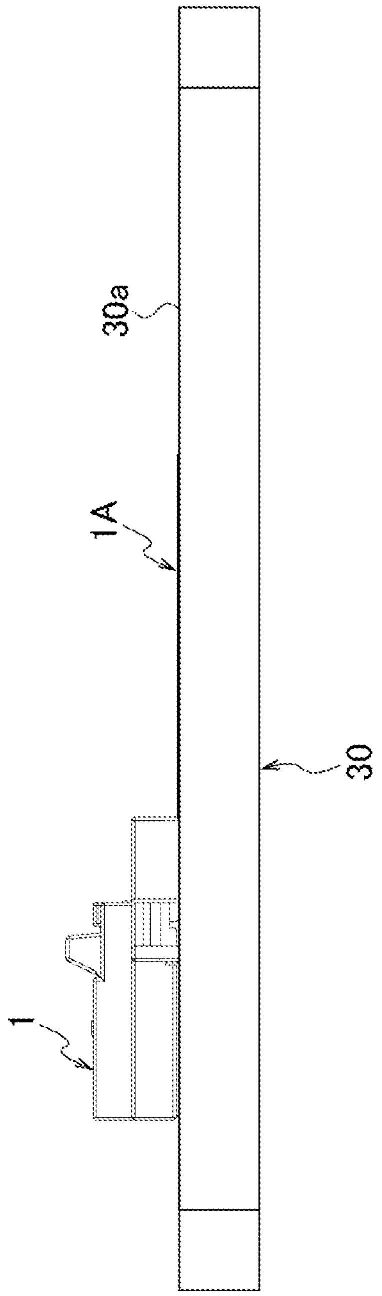
FIG. 24 is a diagram illustrating an example of a method for mounting the plug connector on the cable, and is a side view showing a state in which the plug connector is placed on the cable placed on the reflow carrier.
Figure 25:
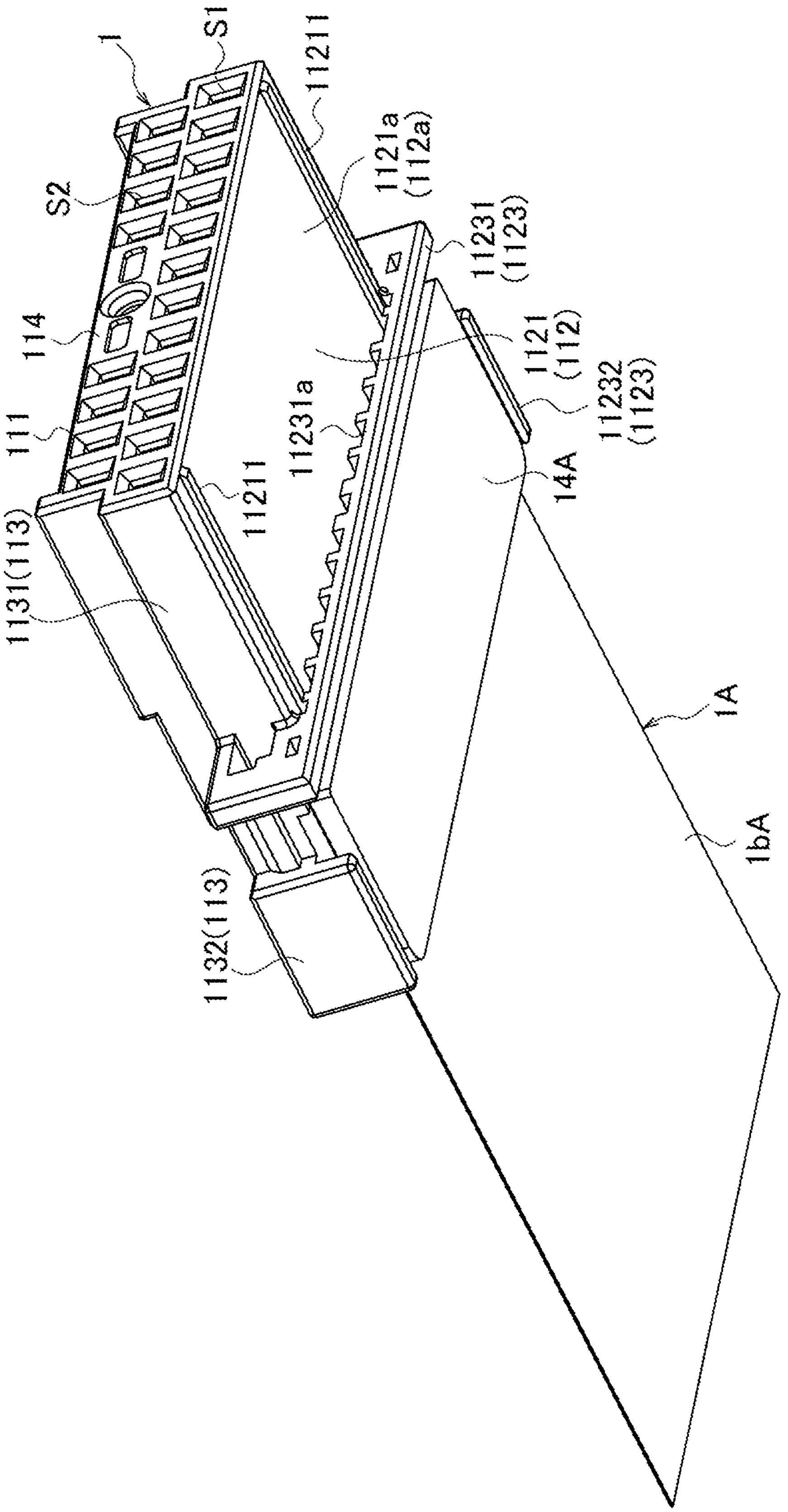
FIG. 25 is a perspective view showing an example of a protrusion part provided on the plug connector mounted on the cable.
Figure 26:
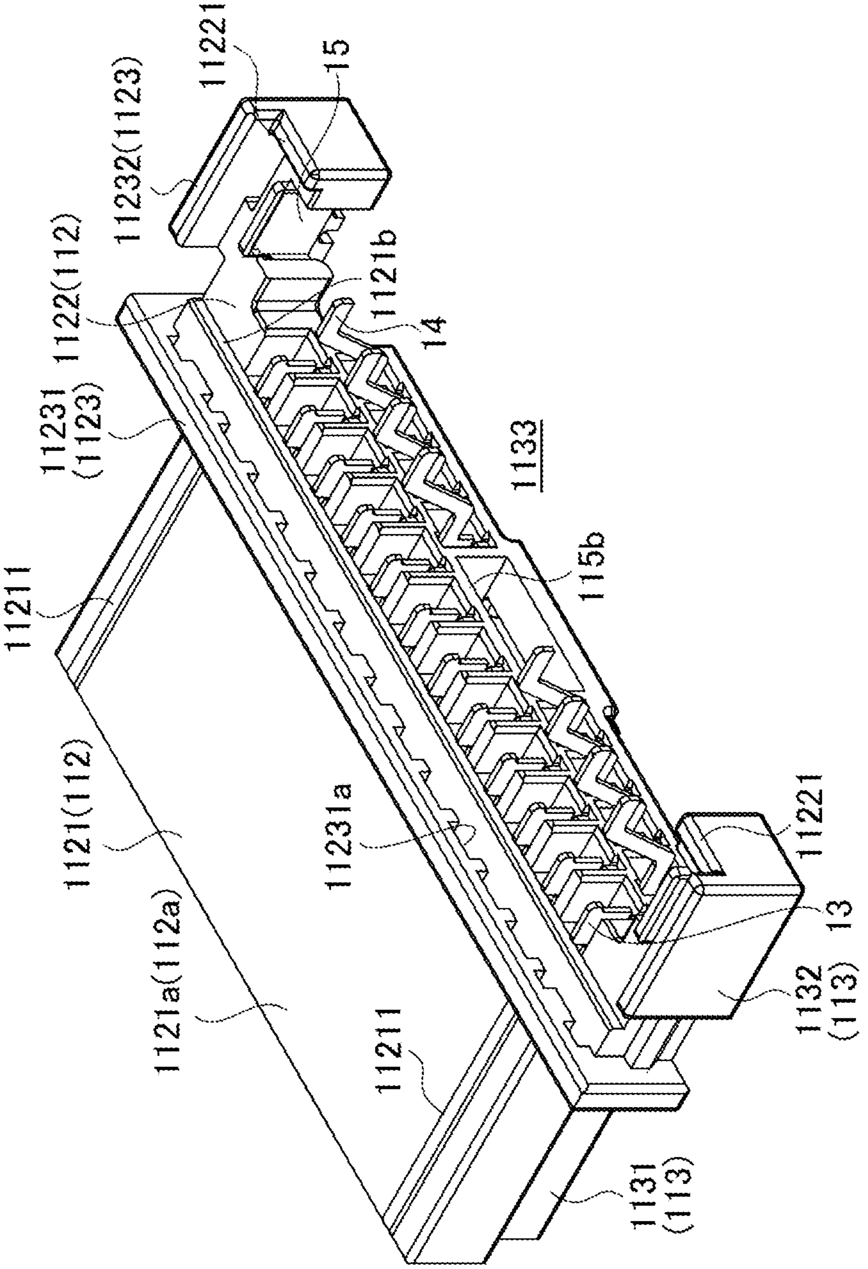
FIG. 26 is a perspective view showing the plug connector viewed from the reverse side.
Figure 27:
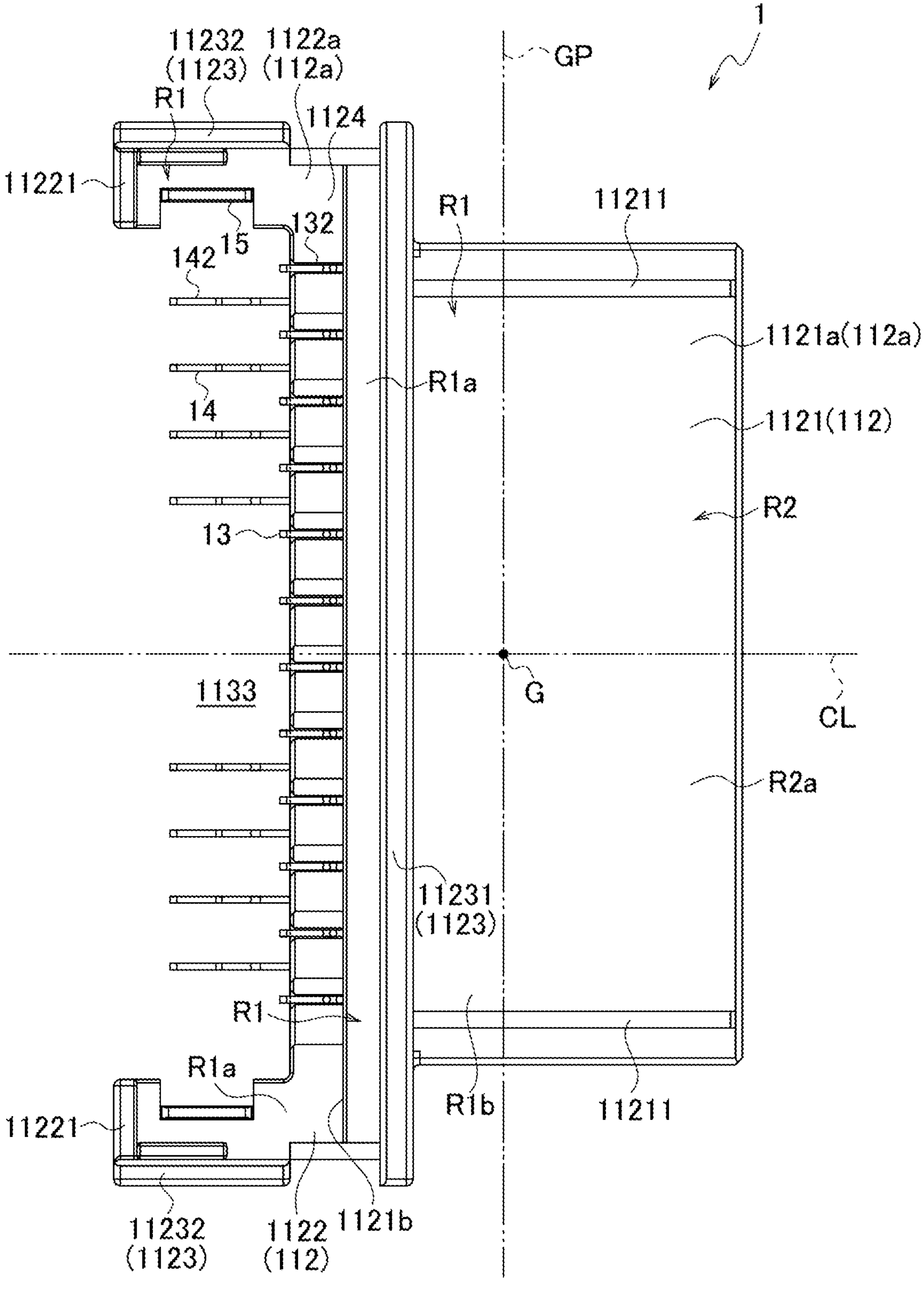
FIG. 27 is a reverse side view showing the plug connector.
Figure 28:
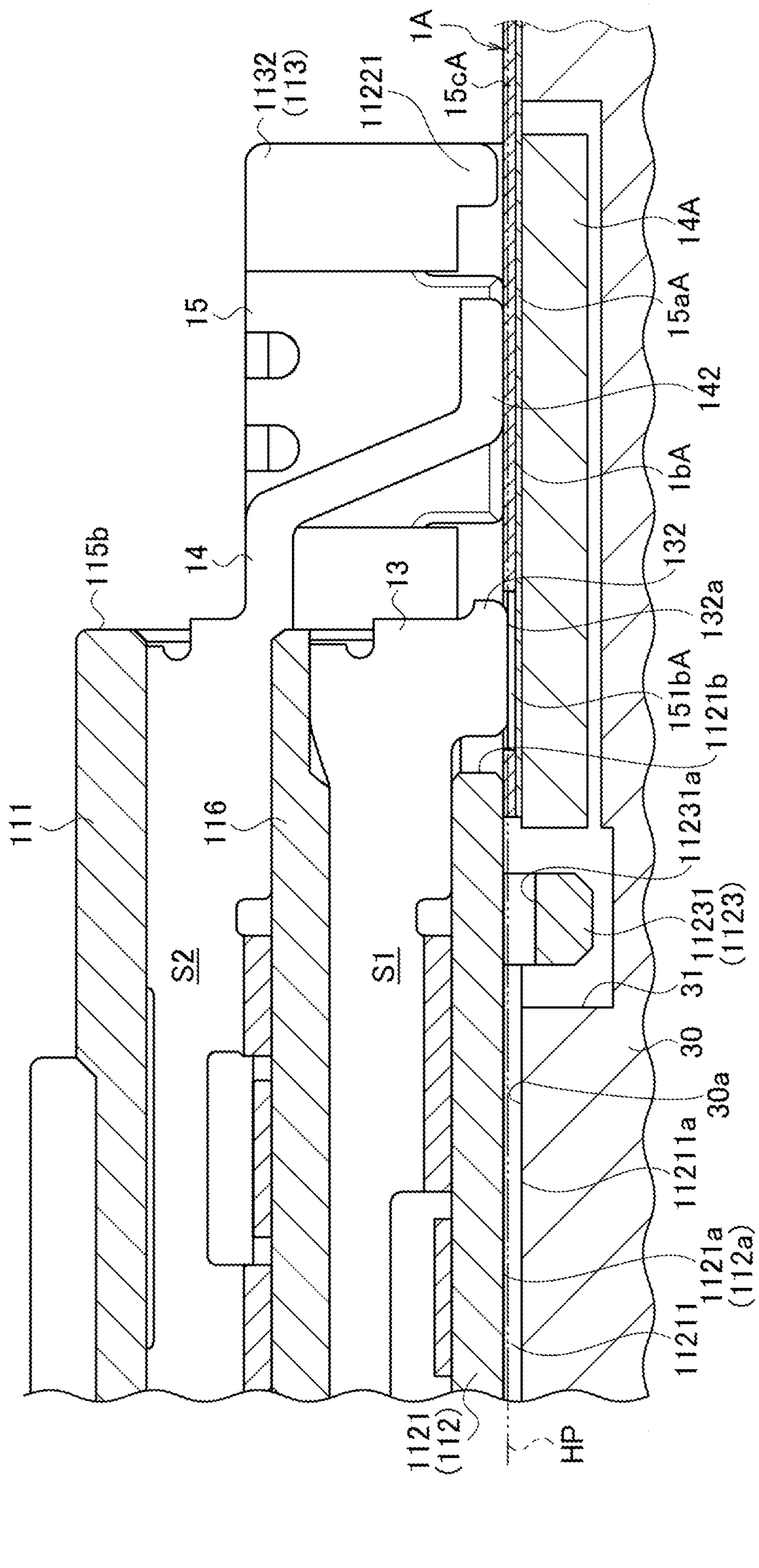
FIG. 28 is a partially enlarged side cross-sectional view showing a state in which the plug connector is placed on the cable placed on the reflow carrier.
Figure 29:
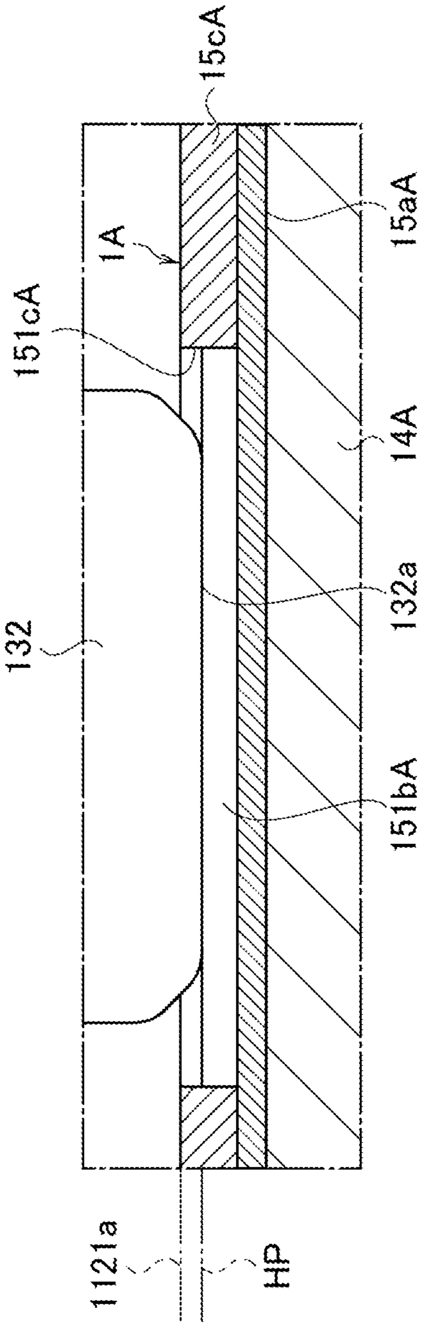
FIG. 29 is an enlarged side cross-sectional view showing a connecting part of the lower plug terminal in a state where the plug connector is placed on the cable placed on the reflow carrier.

Meanwhile, the upper receptacle terminal 24 is also conductive, and a plurality of the upper receptacle terminals 24 are arranged in the width axis (a direction extending along the Y axis) of the receptacle housing 20. As shown in FIG. 19, the upper receptacle terminal 24 is formed into a thin plate shape, and is press-fitted (inserted) from the rear side into the second space S4 formed in the housing main body 21 in a state where the plate thickness direction is approximately aligned with the width axis (a direction extending along the Y axis). Such an upper receptacle terminal 24 can also be formed, for example, by punching thin sheet metal.

The upper receptacle terminal 24 also includes a second main body part (opponent main body part) 240 to be press-fitted (inserted) into the second space S4. The upper receptacle terminal 24 further includes: a second leg part (opponent leg part) 241 extending from the second main body part 240 toward the mounting surface 21*a*A in a state where the upper receptacle terminal 24 is mounted on the circuit board (the mounting member) 2A; and a second mounting piece (opponent mounting part) 242 provided continuously from the second leg part 241 and to be mounted on the circuit board 2A.

At the front end of the second main body part 240, an approximately rod-shaped contact part (opponent contact part) 240*a* is formed so as to protrude forward. Also, press-fit protrusions 240*b* are formed at the upper and lower ends of the second main body part 240. The second main body part 240 is press-fitted into the second space S4 by sticking the press-fit protrusions 240*b* into the housing main body 21. In the state where the second main body part 240 is press-fitted (inserted) into the second space S4, the contact part 240*a* is disposed in the fitting space S5.

Moreover, in this embodiment, the second leg part 241 is bent into a crank shape and has its lower end located behind the second main body part 240. The second leg part 241 has its length, in the top-bottom axis, longer than the first leg part 231. Then, a second mounting piece 242 is provided continuously from the lower end of the second leg part 241.

More specifically, the connecting parts (first and second mounting pieces 232 and 242) are arranged in a staggered pattern in a state where the plurality of receptacle terminals are held by the receptacle housing 20.

When the plug connector 1 described above is fitted into the receptacle connector 2 thus configured, the lock part 12 of the plug housing 10 is inserted into the lock insertion part 22 of the receptacle housing 20, and thus the housing main body 11 is inserted into the fitting space S5.

In this event, the engagement protrusion 121*b* of the lever part 121 is pushed downward by the top wall 211 of the receptacle housing 20. When the engagement protrusion 121*b* is pushed downward by the top wall 211 in this way, the rear end part (operation part 121*a*) of the lever part 121 is elastically deformed so as to move downward, and thus the engagement protrusion 121*b* can be moved into the inner side of the lock insertion part 22.

Then, when the engagement protrusion 121*b* is moved into the inner side of the lock insertion part 22, the downward pushing of the engagement protrusion 121*b* by the top wall 211 is released, and the elastic restoring force of the lever part 121 moves the engagement protrusion 121*b* upward. The engagement protrusion 121*b* is moved upward to be engaged with the engagement recess part 221*a* formed in the receptacle connector 2, thus allowing the plug connector 1 and the receptacle connector 2 to be locked in the fitted state.

During the course of fitting the plug connector 1 into the receptacle connector 2, the tip of the contact part 230*a* of the lower receptacle terminal 23 is introduced into the first space S1 formed in the plug housing 10 from the introduction port S1*b* to come into contact with the contact part 130*a* of the first plug terminal 13. Note that, in this embodiment, the approximately rod-shaped contact part 230*a* is inserted between the pair of contact pieces 138, 138 and sandwiched by the pair of contact pieces 138, 138 to achieve conduction between the first plug terminal 13 and the lower receptacle terminal 23.

Likewise, the tip of the contact part 240*a* of the upper receptacle terminal 24 is introduced into the second space S2 formed in the plug housing 10 from the introduction port S2*b* to come into contact with the contact part 140*a* of the upper plug terminal 14. Note that, in this embodiment, the approximately rod-shaped contact part 240*a* is inserted between the pair of contact pieces 148, 148 and sandwiched by the pair of contact pieces 148, 148 to achieve conduction between the upper plug terminal 14 and the upper receptacle terminal 24.

As described above, the plug connector 1 and the receptacle connector 2 are fitted together to achieve conduction between the plug terminals 13 and 14 and the receptacle terminals 23 and 24. Thus, the connector set C1 is formed to electrically connect the cable 1A to the circuit board 2A.

Meanwhile, in order to detach the plug connector 1 from the receptacle connector 2, the operation part 121*a* of the lever part 121 is first lowered to move the lever part 121 downward. Accordingly, the engagement protrusion 121*b* is also moved downward to release the engagement between the engagement protrusion 121*b* and the engagement recess part 221*a*. Then, by pulling the plug connector 1 in a removal direction from the receptacle connector 2 in the state where the engagement between the engagement protrusion 121*b* and the engagement recess part 221*a* is released, the plug connector 1 is moved in the removal direction relative to the receptacle connector 2. When the plug connector 1 is thus moved in the removal direction relative to the receptacle connector 2, the conduction between the terminals is first released, and then the fitting between the housings is released. Thus, the plug connector 1 is detached from the receptacle connector 2.

Here, in this embodiment, the height of the connector set C1 can be reduced. To be more specific, the height of the connector set C1 can be reduced by preventing the cable 1A from being inserted into the receptacle housing (opponent housing) 20 when the plug connector (connector) 1 mounted on the cable (connecting member) 1A is being fitted into the receptacle connector (opponent connector) 2. In this event, it is preferable that the center of gravity G of the plug connector (connector) 1 is inserted into the receptacle housing (opponent housing) 20. In this way, the fitted state between the plug connector (connector) 1 and the receptacle connector (mating connector) 2 can be made more stable.

Furthermore, in the case where the cable 1A is not inserted into the receptacle housing (opponent housing) 20, the holding brackets 15 for holding the cable 1A are also positioned on the outside of the receptacle housing (opponent housing) 20. For example, in this embodiment, the holding brackets 15 are held by the plug housing 10 in the recess part 1133 formed in the rear side (opposite to the side to which the receptacle housing 20 is fitted) of the plug housing 10.

In this way, when the holding brackets 15 are configured to be positioned on the outside of the receptacle housing (opponent housing) 20, the portion of the plug connector (connector) 1 that is mounted on the cable (connecting member) 1A is biased to one side (opposite to the side to which the receptacle housing 20 is fitted) with respect to the center of gravity G of the plug connector (connector) 1. Note that, in this embodiment, the connecting parts (first and second mounting pieces 132 and 142) of the plurality of terminals and the fixing pieces 152 of the holding brackets 15 are the portions of the plug connector (connector) 1 that is mounted on the cable (connecting member) 1A.

Here, in general, mounting the plug connector (connector) 1 on the cable (connecting member) 1A is carried out by fixing the terminals to the cable (connecting member) 1A by soldering or the like in a state where the plug connector (connector) 1 is placed on the cable (connecting member) 1A after placing the cable (connecting member) 1A on the reflow carrier 30 (see FIGS. 20 to 24).

On an upper surface 30*a* side of the reflow carrier 30 used at this time, a recess part 31 in which the reinforcing plate 14A and the like are housed is formed so that the cable (connecting member) 1A can be held in a horizontal state. Then, mounting the plug connector (connector) 1 on the cable (connecting member) 1A is carried out in a state where the plug connector (connector) 1 is placed on the cable (connecting member) 1A placed horizontally on the reflow carrier 30.

In this way, the existing reflow carrier 30 is formed with the recess part 31 in which the reinforcing plate 14A and the like are housed, so that the cable (connecting member) 1A can be held in a horizontal state. To be more specific, the cable (connecting member) 1A is placed on the reflow carrier 30 in a state where the back surface 1*b*A of the cable (connecting member) 1A is in contact with the upper surface 30*a* of the reflow carrier 30. Then, the plug connector (connector) 1 is placed on the cable (connecting member) 1A placed horizontally on the reflow carrier 30.

In this event, in the case where the plug connector (connector) 1 having the configuration shown in this embodiment is placed on the cable (connecting member) 1A placed horizontally on the existing reflow carrier 30, the following problems may occur. To be more specific, in the plug connector (connector) 1 having the configuration shown in this embodiment, in order to prevent the cable 1A from being inserted into the receptacle housing 20, the side to which the receptacle housing 20 is fitted of the lower surface does not face the cable 1A. Therefore, a gap which is the thickness of the cable (connected member) 1A or more is formed between the side to which the receptacle housing 20 is fitted (the bottom surface 1121*a* of the bottom wall main body 1121) of the lower surface of the plug connector 1 and the upper surface 30*a* of the reflow carrier 30.

Thus, in the case where the plug connector (connector) 1 is placed on the cable (connecting member) 1A placed horizontally on the existing reflow carrier 30, the plug connector (connector) 1 is tilted. As a result, the terminals may not be properly fixed to the cable (connecting member) 1A.

In order to solve this kind of problem, it is conceivable to process the reflow carrier so that the plug connector (connector) 1 placed on the reflow carrier does not wobble. However, it takes time and effort to create a special reflow carrier separately. Therefore, even when the existing reflow carrier 30 is used, it is preferable to be able to prevent the plug connector (connector) 1 from tilting.

Therefore, in this embodiment, tilting the plug connector (connector) 1 can be suppressed even when the plug connector (connector) 1 which can reduce the height is placed on the existing reflow carrier 30.

To be more specific, by providing the plug housing 10 with the protrusion part 11211 that can fill the above-mentioned gap, the plug connector (connector) 1 can be placed horizontally without tilting even when the existing reflow carrier 30 is used.

In this embodiment, the lower side surface of the bottom wall 112 (bottom surface 112*a*) in the top-bottom axis (a direction extending along the Z axis) is divided into two by the center of gravity plane GP defined by the imaginary plane that includes the center of gravity G and is perpendicular to the front-rear axis (a direction extending along the X axis).

Then, a region positioned at the rear side in the front-rear axis (a direction extending along the X axis) with respect to the center of gravity plane GP is a first region R1 and a region positioned at the front side in the front-rear axis (a direction extending along the X axis) with respect to the center of gravity plane GP is a second region R2.

Here, in this embodiment, the center of gravity plane GP is positioned at the front side in the front-rear axis (a direction extending along the X axis) with respect to the front protrusion part 11231. Therefore, in this embodiment, a region positioned at the front side in the front-rear axis (a direction extending along the X axis) of the bottom surface 1121*a* of the bottom wall main body 1121 with respect to the center of gravity plane GP is the second region R2. Meanwhile, a region positioned at the rear side in the front-rear axis (a direction extending along the X axis) of the bottom surface 1121*a* of the bottom wall main body 1121 with respect to the center of gravity plane GP and the extension part side bottom surface 1122*a* is the first region R1.

This first region R1 has a facing region R1*a* that faces the cable (connecting member) 1A in the top-bottom axis (a direction extending along the Z axis) when the connecting parts (first mounting pieces 132 and second mounting pieces 142) are mounted on the cable (connecting member) 1A.

Furthermore, the first region R1 has a non-facing region R1*b* that does not faces the cable (connecting member) 1A in the top-bottom axis (a direction extending along the Z axis) when the connecting parts (first mounting pieces 132 and second mounting pieces 142) are mounted on the cable (connecting member) 1A.

In this embodiment, a region positioned at the front side in the front-rear axis (a direction extending along the X axis) of the first region R1 with respect to the front protrusion part 11231 is the non-facing region R1*b*. Then, a region positioned at the rear side in the front-rear axis (a direction extending along the X axis) of the first region R1 with respect to the front protrusion part 11231 is the facing region R1*a*.

Meanwhile, the entire second region R2 is a non-facing region R2*a* that does not faces the cable (connecting member) 1A in the top-bottom axis (a direction extending along the Z axis) when the connecting parts (first mounting pieces 132 and second mounting pieces 142) are mounted on the cable (connecting member) 1A.

Furthermore, in this embodiment, the second region R2 has a back surface positioned at the upper side in the top-bottom axis (a direction extending along the Z axis) with respect to the horizontal plane HP, and the protrusion part 11211 protruding downward from the back surface in the top-bottom axis (a direction extending along the Z axis). Here, the horizontal plane HP is the imaginary plane that includes the mounting surface (first mounting surface 132*a* and second mounting surface 142*a*) of the connecting parts (first mounting pieces 132 and second mounting pieces 142) and is perpendicular to the top-bottom axis (a direction extending along the Z axis). Further, in this embodiment, the entire portion of the second region R2 where the protrusion part 11211 is not provided is the back surface. In this way, in this embodiment, a part of the bottom surface 1121*a* of the bottom wall main body 1121 is the back surface.

Further, in this embodiment, a pair of protrusion parts 11211, 11211 are formed on both sides in the width direction of the bottom surface 1121*a* of the bottom wall main body 1121 so as to extend along the front-rear axis (a direction extending along the X axis).

Therefore, in this embodiment, the plurality of the protrusion parts 11211 are provided separated from each other. In this event, the pair of (the plurality of) the protrusion part 11211 are provided symmetrically with respect to the center line CL defined by the imaginary line that includes the center of gravity G and extends along the front-rear axis (a direction extending along the X axis) when viewed along the top-bottom axis (a direction extending along the Z axis). In this way, it makes possible to support the plug connector (connector) 1 in a well-balanced manner by the protrusion part 11211.

Furthermore, in this embodiment, the rear ends of the protrusion parts 11211 extend along the front-rear axis (a direction extending along the X axis) are provided continuously from the front protrusion part 11231. That is, the first region R1 is also provided with the protrusion parts 11211. However, it is not necessary to form the protrusion parts 11211 also in the first region R1, and the protrusion parts 11211 may be formed only in the second region R2.

Moreover, the protrusion parts 11211 are provided so as not to overlap with the connecting parts (first mounting pieces 132 and second mounting pieces 142) of the plurality of terminals (lower plug terminals 13 and upper plug terminals 14) when viewed along the front-rear axis (a direction extending along the X axis).

In this way, it is possible to check whether the heights of the legs of the plurality of terminals (lower plug terminals 13 and upper plug terminals 14) are uniform from the front-rear axis (a direction extending along the X axis).

Furthermore, in this embodiment, the amount of protrusion of the protrusion parts 11211 from the back surface (the bottom surface 1121*a* of the bottom wall main body 1121) is set such that the plug connector (connector) 1 is placed horizontally on the existing reflow carrier 30.

To be more specific, the amount of protrusion of the protrusion parts 11211 from the back surface is set to be the amount of standoff+the thickness of the base member 15*a*A+the thickness of the conductor part 15*b*A. Note that, the amount of standoff refers to the amount of protrusion of the mounting surfaces (first mounting surface 132*a* and second mounting surface 142*a*) provided on the terminals (lower plug terminals 13 and upper plug terminals 14) from the bottom surface 1121*a* of the bottom wall main body 1121. In this way, in the case where the mounting surfaces (first mounting surface 132*a* and second mounting surface 142*a*) are made to protrude a predetermined amount from the bottom surface 1121*a* of the bottom wall main body 1121, soldering (mounting) can be performed without being obstructed by the connector housing 10.

Then, in the case where the amount of protrusion of the protrusion parts 11211 from the back surface is set to the above-mentioned amount, a top part 11211*a* of the protrusion part 11211 can be at the same position as the rear surface 1*b*A of the cable (connecting member) 1A in a state where the connecting part (first mounting piece 132 and second mounting piece 142) is mounted on the cable (connecting member) 1A. As a result, the plug connector (connector) 1 can be placed horizontally on the existing reflow carrier 30.

Note that being at the same position (substantially the same position) means that the position may be within a range that does not affect the inclination. For example, this means that the positional difference between the top 11211*a* of the protrusion 11211 and the back surface 1*b* may have a design range. This design range can be, for example, plus or minus 0.1 millimeter (100 μm). More preferably, it can be plus or minus 0.05 millimeter (50 μm). The design range can have different values depending on product dimensions and number of terminals.

Further, in this embodiment, a part of the first region R1 faces the receptacle housing (opponent housing) 20 in the top-bottom axis (a direction extending along the Z axis) when the plug housing (housing) 10 is connected to the receptacle housing (opponent housing) 20. To be more specific, a part of the non-facing region R1*b* that does not face the cable 1A in the top-bottom axis (a direction extending along the Z axis) is inserted into the receptacle housing (opponent housing) 20.

In this way, the center of gravity G of the plug connector (connector) 1 can be positioned into the receptacle housing (opponent housing) 20 when the plug housing (housing) 10 is connected to the receptacle housing (opponent housing) 20. As a result, it makes possible to suppress the wobbling of the plug housing (housing) 10 in a state where the plug housing (housing) 10 is connected to the receptacle housing (opponent housing) 20, while reducing the height of the connector set C1.

Further, in this embodiment, the second protrusion parts 1123 surrounding the cable 1A are provided in the first region R1. To be more specific, the second protrusion parts 1123 are provided only the region positioned at the rear side in the front-rear axis (a direction extending along the X axis) with respect to the center of gravity plane GP.

In this way, the plurality of terminals (lower plug terminals 13 and upper plug terminals 14) can be mounted on the flexible sheet-like cable 1A more reliably. Further, the cable 1A and the reinforcing plate (connecting plate) 14A can be protected by the second protrusion parts 1123 in a state where the plurality of terminals (lower plug terminals 13 and upper plug terminals 14) are mounted on the cable 1A.

Furthermore, in this embodiment, the second protrusion part 1123 protrudes downward than the protrusion part 11211 in the top-bottom axis (a direction extending along the Z axis).

In this way, it makes possible to protect the cable 1A and the reinforcing plate (connecting plate) 14A more reliably. Note that, it is not necessary to provide the second protrusion part 1123, and the plug connector may have a configuration without the second protrusion part 1123.

Moreover, in this embodiment, as described above, when the plug connector 1 is viewed along the front-rear axis (extending direction of the X-axis), the front protrusion part 11231 does not overlap with the first and second mounting pieces 132 and 142 of the plug terminals 13 and 14.

In addition, when the plug connector 1 is viewed along the front-rear axis (extending direction of the X-axis), the pair of rear protrusion parts 11232, 11232 also do not overlap with the first and second mounting pieces 132 and 142 of the plug terminals 13 and 14.

Then, in this embodiment, the second protrusion parts 1123 include only one front protrusion part 11231 and the pair of rear protrusion parts 11232, 11232.

Furthermore, when the plug connector 1 is viewed along the front-rear axis (extending direction of the X-axis), the protrusion parts 11211 also do not overlap with the first and second mounting pieces 132 and 142 of the plug terminals 13 and 14.

Moreover, in this embodiment, the distal ends of the first and second mounting pieces 132 and 142 protrude on the side where the recess part 1124 is provided (downward of the bottom surface 1121*a* of the bottom wall main body 1121) in the state where the plug terminals 13 and 14 are held by the plug housing 10.

Therefore, in this embodiment, when the plug connector 1 is viewed along the front-rear axis (extending direction of X axis), the distal ends of the first and second mounting pieces 132 and 142 of the plug terminals can be seen both from the front side and from the rear side. Note that the distal ends of the first and second mounting pieces 132 and 142 of the plug terminals are apart from one another in the width axis and protrude downward of the bottom surface 1121*a* of the bottom wall main body 1121 when viewed in the front-rear axis.

Meanwhile, in the case where the distal ends (mounting surfaces 132*a* and 142*a*) of the connecting parts 132 and 142 protrude from the plug housing 10 on the side where the recess part 1124 is provided (downward of the bottom surface 1121*a* of the bottom wall main body 1121) in the state where the plurality of terminals 13 and 14 are held by the plug housing 10, the amount of protrusion of each of the connecting parts 132 and 142 from the bottom surface 1121*a* of the bottom wall main body 1121 needs to be uniform to make the mounting of the connecting parts 132 and 142 on the cable 1A more reliable.

Therefore, it is necessary to inspect whether the amount of protrusion of each of the connecting parts 132 and 142 from the bottom surface 1121*a* of the bottom wall main body 1121 are uniform. Then, such an inspection is performed, generally, by capturing the image of the connecting parts 132 and 142 with a camera 42 in a state where light emitted from a light 41 is being projected to the connecting parts 132 and 142 of the terminals 13 and 14 held by the plug housing 10.

Figure 30:
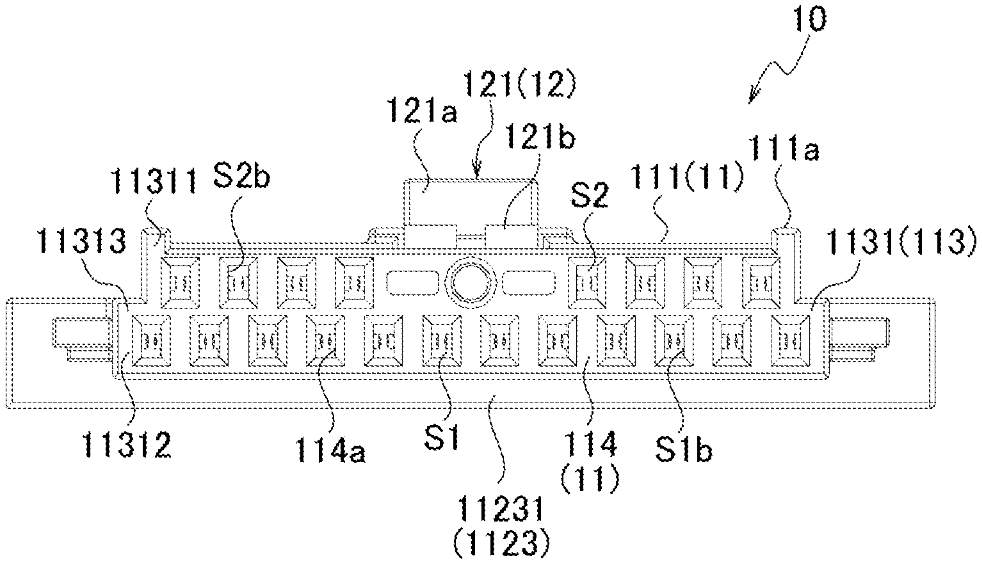
FIG. 30 is a diagram for explaining a plug connector shown as a modification, FIG. 30(*a*) is a front view of the plug connector, and FIG. 30(*b*) is a diagram for explaining a method of checking the amount of protrusion of a connecting parts of the plug connector.
Figure 30:
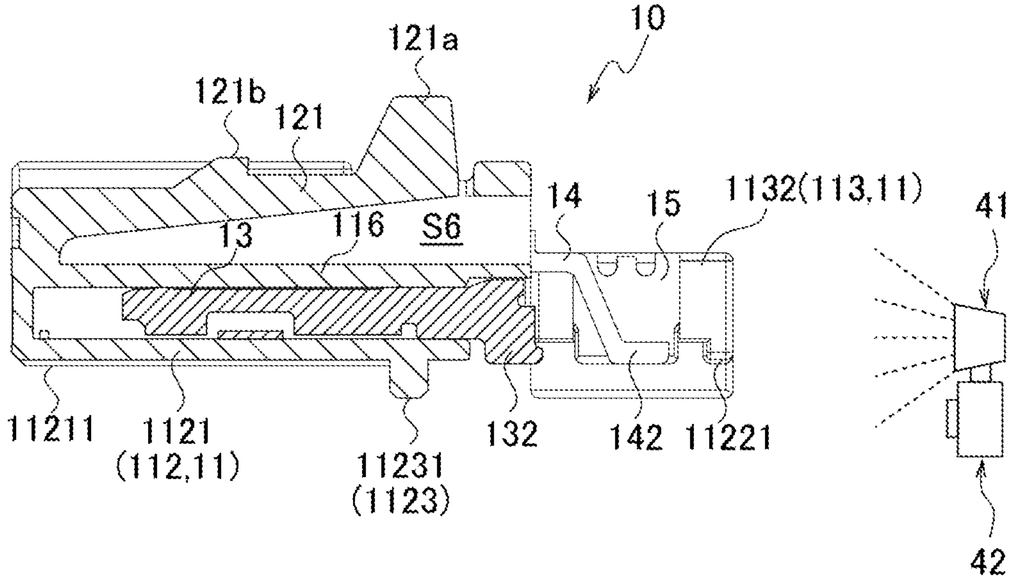

Here, as illustrated in FIG. 30, if the second protrusion parts 1123 are formed at front portions in the front-rear axis so as to overlap with the connecting parts 132 and 142 in front view, the connecting parts 132 and 142 are hidden behind the second protrusion parts 1123 when viewed from the front side in the front-rear axis. Thus, to check the amount of protrusion of each of the connecting parts 132 and 142, an image needs to be captured in the state where light is projected to the connecting parts 132 and 142 from the rear side.

In the case where the plate thickness direction of the connecting parts 132 and 142 agrees with the width axis, it is preferable to form a curve at the lower end of each of the connecting parts 132 and 142 to make it easy for a fillet to be formed when the connecting part is mounted by soldering. For this reason, in this embodiment, the lower ends of the connecting parts 132 and 142 are curved.

However, in the case where the lower ends of the connecting parts 132 and 142 are curved, the light projected to the curved portions are diffusely reflected, making the images of the lower ends unclear. Therefore, in the case where an image is captured in the state where light is projected to the connecting parts 132 and 142 from the rear side, the amount of protrusion of each of the connecting parts 132 and 142 (the position of the lower end of each of the connecting parts 132 and 142) needs to be estimated as follows. That is, the positions of the upper end edges of the connecting parts 132 and 142 are checked, and the amount of protrusion of each of the connecting parts 132 and 142 (the position of the lower end of each of the connecting parts 132 and 142) needs to be estimated using this edge position and the thickness in the top-bottom axis of the connecting parts 132 and 142.

However, in the case where the plate thickness direction of the connecting parts 132 and 142 agrees with the width axis as in this embodiment, the dimensional variation in the top-bottom axis that occurs when the terminals 13 and 14 are formed is large, so that the amount of protrusion of each of the connecting parts 132 and 142 cannot been checked accurately with the above estimation method.

Thus, as above, in the case where the plate thickness direction of the connecting parts 132 and 142 agrees with the width axis and where the lower ends of the connecting parts 132 and 142 are curved for the fillets to be formed easily, the following problems may occur. To be more specific, in the case where the second protrusion parts 1123 are formed at the front in the front-rear axis as illustrated in FIG. 30 and where the terminals 13 and 14 described in this embodiment are used, the amount of protrusion of each of the connecting parts 132 and 142 cannot be checked accurately.

Figure 31:
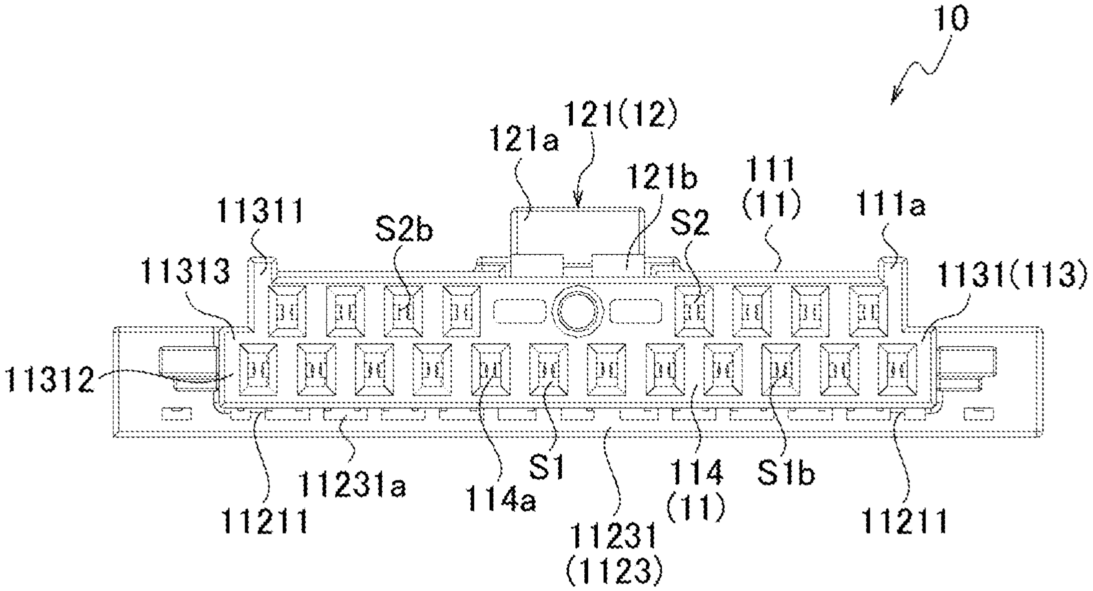
FIG. 31 is a diagram for explaining a plug connector shown as an example, FIG. 31(*a*) is a front view of the plug connector, and FIG. 31(*b*) is a diagram for explaining a method of checking the amount of protrusion of a connecting parts of the plug connector.
Figure 31:
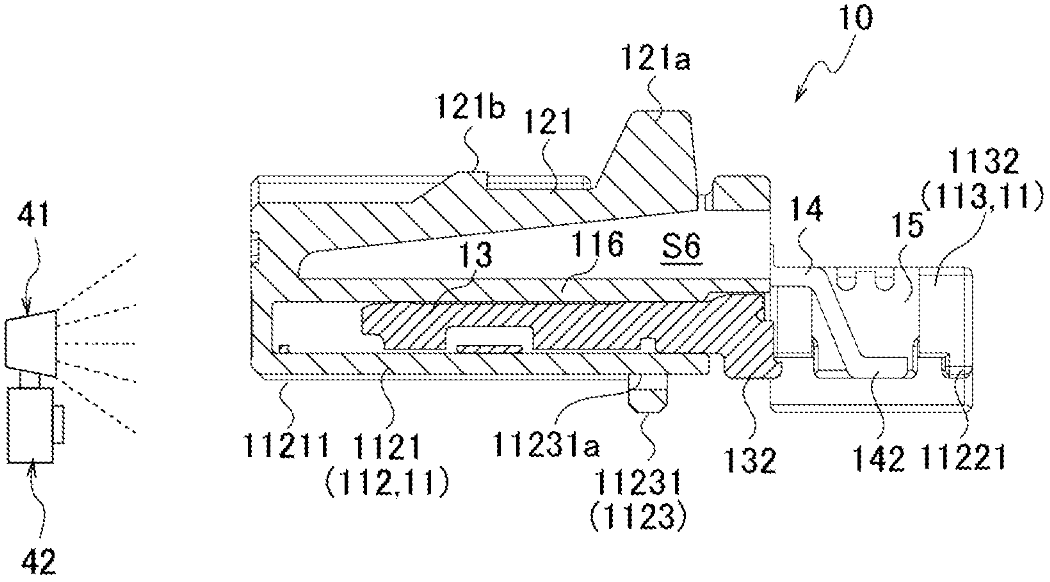

In contrast, in this embodiment, the second protrusion parts 1123 do not overlap with the plurality of connecting parts 132 and 142 when the plug housing 10 holding the plurality of terminals 13 and 14 is viewed along the front-rear axis (see FIG. 31). To be more specific, only the front protrusion part 11231 of the second protrusion parts 1123 exists at a position overlapping with the plurality of connecting parts 132 and 142 when the plug housing 10 holding the plurality of terminals 13 and 14 is viewed along the front-rear axis. Then, the plurality of through holes 11231*a* are formed in the front protrusion part 11231 such that the plurality of connecting parts 132 and 142 are exposed when the plug housing 10 holding the plurality of terminals 13 and 14 is viewed along the front-rear axis. With this configuration, the second protrusion parts 1123 do not overlap with the plurality of connecting parts 132 and 142 when the plug housing 10 holding the plurality of terminals 13 and 14 is viewed along the front-rear axis.

For this reason, an image can be captured in a state where light is projected to the connecting parts 132 and 142 from the front side. Then, by capturing an image of the connecting parts 132 and 142 with light projected to them from the front side, the distal end of each of the connecting parts 132 and 142 can be taken more clearly than in the case where light is projected from the rear side.

Therefore, with a configuration in which the second protrusion parts 1123 do not overlap with the plurality of connecting parts 132 and 142 when the plug housing 10 holding the plurality of terminals 13 and 14 is viewed along the front-rear axis, the following effects can be achieved. That is, the amount of protrusion of each of the connecting parts 132 and 142 from the lower end of the plug housing 10 can be checked more accurately even in the case of using the terminals 13 and 14 described in this embodiment.

Moreover, a shape of the protrusion part 11211 is not limited to the above shape, but may have various other shapes.

Figure 32:
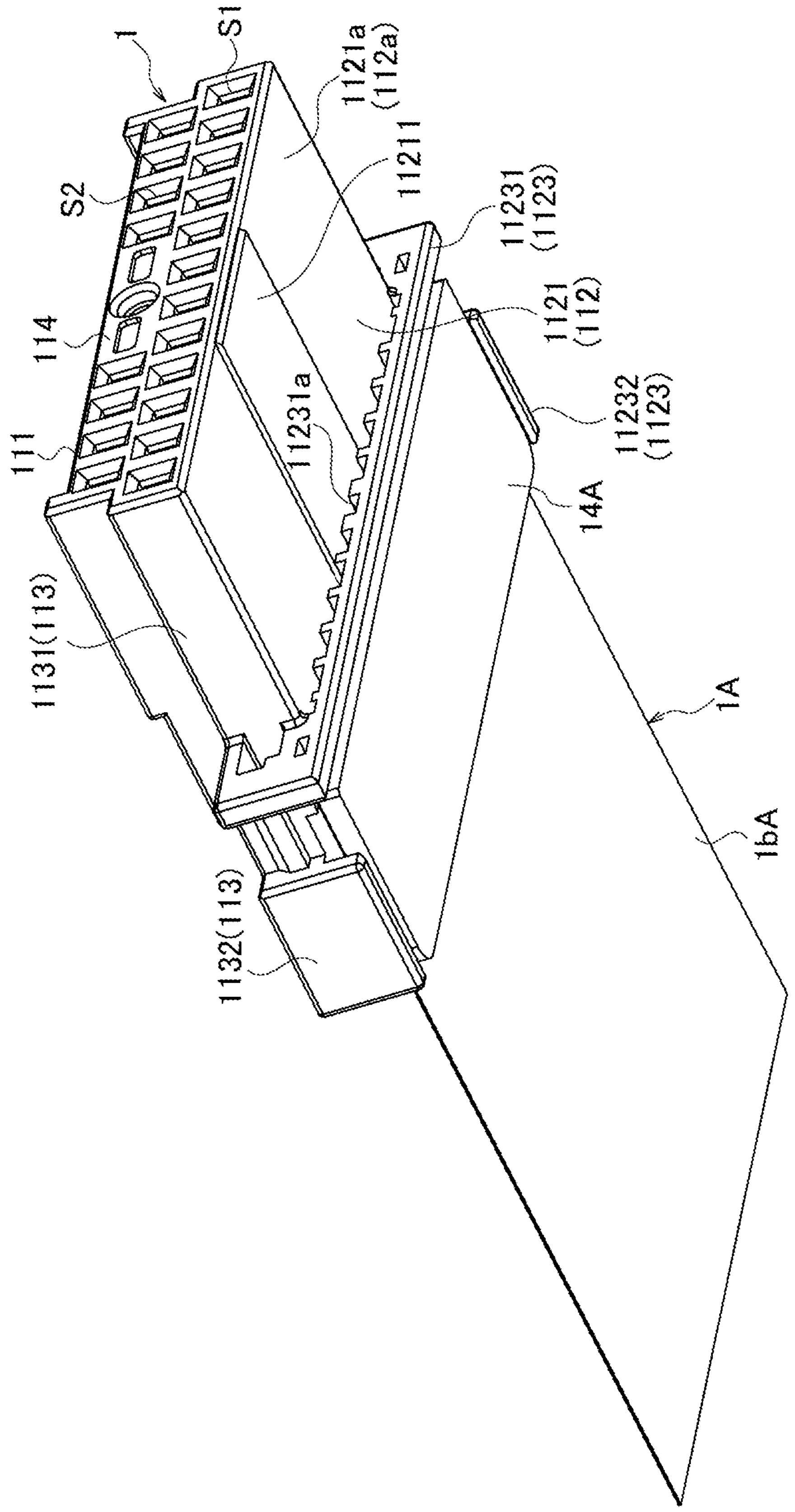
FIG. 32 is a perspective view showing the protrusion part included in the plug connector shown as first modification.

For example, the plug connector may have a configuration shown in FIG. 32. FIG. 32 illustrates an example where one protrusion part 11211 is formed at the center part of the bottom wall 112 in the width axis so as to extend along the front-rear axis.

Providing the protrusion 11211 having such a shape also makes it possible to prevent the plug connector (connector) 1 from tilting.

Figure 33:
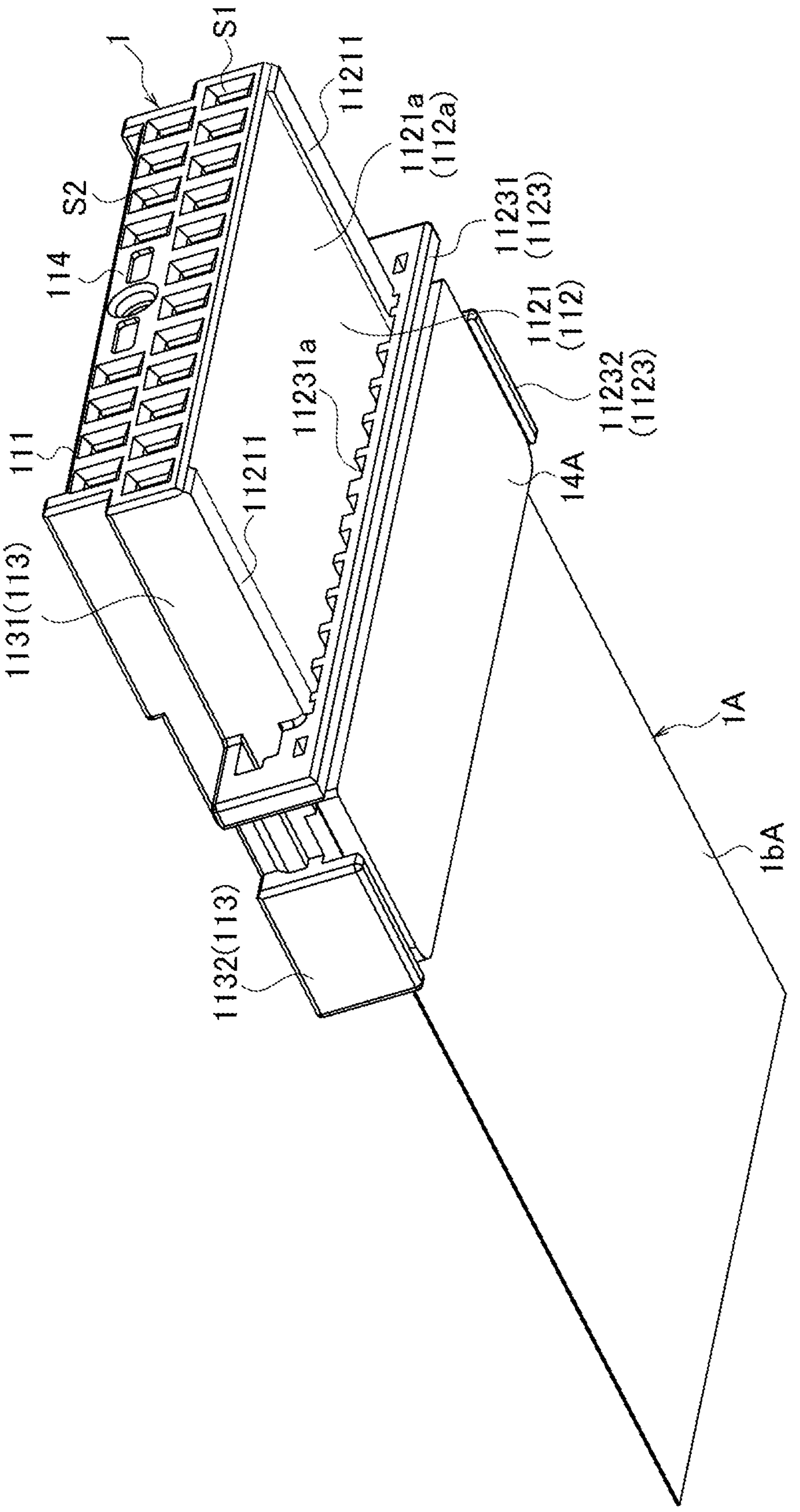
FIG. 33 is a perspective view showing the protrusion part included in the plug connector shown as second modification.

Further, the plug connector may have a configuration shown in FIG. 33. FIG. 33 illustrates an example where a pair of protrusion part 11211 are formed on both edges of the bottom wall 112 in the width axis so as to extend along the front-rear axis.

Providing the protrusion 11211 having such a shape also makes it possible to prevent the plug connector (connector) 1 from tilting.

Figure 34:
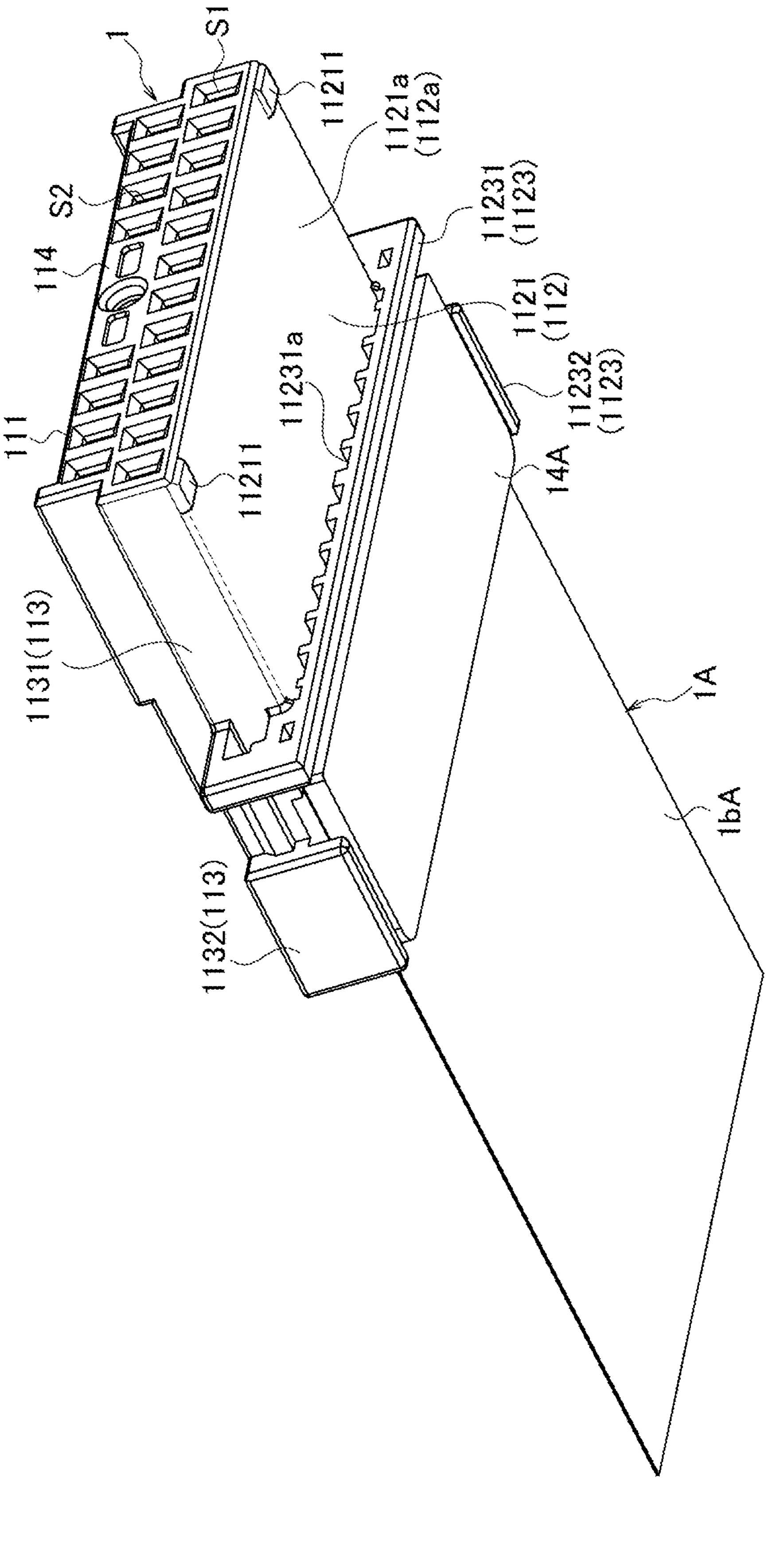
FIG. 34 is a perspective view showing the protrusion part included in the plug connector shown as third modification.

Further, the plug connector may have a configuration shown in FIG. 34. FIG. 34 illustrates an example where a pair of protrusion part 11211 are formed at the front end portions of both edges of the bottom wall 112 in the width axis.

Providing the protrusion 11211 having such a shape also makes it possible to prevent the plug connector (connector) 1 from tilting.

Operations and Effects

As described above, the plug connector (connector) 1 according to the present embodiment and its modifications includes the plug housing (housing) 10 and the plurality of terminals (lower plug terminals 13 and upper plug terminals 14). Here, the top-bottom axis, the front-rear axis, and the width axis of the plug connector 1 are defined in a state where the plug housing 10 is located above the sheet-like cable (connecting member) 1A.

In this event, the plug housing 10 has the top wall 111 disposed on the upper side in the top-bottom axis, the bottom wall 112 disposed on the lower side in the top-bottom axis, the front wall 114 disposed on the front side in the front-rear axis that is the axis intersecting with the top-bottom axis, and the rear wall 115 disposed on the rear side in the front-rear axis.

Further, the plurality of terminals (lower plug terminals 13 and upper plug terminals 14) are held in the plug housing 10 in the state where the plurality of terminals are arranged along the width axis that is the axis intersecting with the top-bottom axis and the front-rear axis. These plurality of terminals (lower plug terminals 13 and upper plug terminals 14) can be mounted on the sheet-like cable (connecting member) 1A.

Moreover, each of the plurality of terminals (lower plug terminals 13 and upper plug terminals 14) has the connecting part (first mounting piece 132 and second mounting piece 142) protruding from the rear wall 111 while being held in the plug housing 10. Then, each of the connecting parts (first mounting pieces 132 and second mounting pieces 142) is provided with the mounting surface (first mounting surface 132*a* and second mounting surface 142*a*) that can be mounted on the cable (connecting member) 1A.

Further, the bottom surface 112*a* of the bottom wall 112 (lower side surface of the top-bottom axis) has the first region R1 and the second region R2 divided into two by the center of gravity plane GP defined by the imaginary plane that includes the center of gravity G and is perpendicular to the front-rear axis.

Further, the first region R1 is positioned at the rear side in the front-rear axis and the second region R2 is positioned at the front side in the front-rear axis.

Then, the first region R1 has the facing region R1*a* that faces the cable (connecting member) 1A in the top-bottom axis when the connecting parts (first mounting pieces 132 and second mounting pieces 142) are mounted on the cable (connecting member) 1A.

Meanwhile, the second region R2 is a non-facing region R2*a* that does not face the cable (connecting member) 1A in the top-bottom axis when the connecting parts (first mounting pieces 132 and second mounting pieces 142) are mounted on the cable (connecting member) 1A.

Then, the second region R2 has the back surface 1121*a* positioned at the upper side in the top-bottom axis with respect to the horizontal plane HP, and the protrusion part 11211 protruding downward from the back surface 1121*a* in the top-bottom axis. Here, the horizontal plane HP is the imaginary plane that includes the mounting surface (first mounting surface 132*a* and second mounting surface 142*a*) of the connecting parts (first mounting pieces 132 and second mounting pieces 142) and is perpendicular to the top-bottom axis.

As described above, in the present embodiment and its modifications, the second region R2 is the non-facing region R2*a* that does not face the cable 1A in the top-bottom axis when the plug connector 1 is mounted on the cable 1A. Thus, the height of the connector set C1 can be reduced by preventing the cable 1A from being inserted into the opponent housing (receptacle housing 20) when the plug connector 1 is being fitted into the opponent connector (receptacle connector 2).

Further, in the present embodiment and its modifications, the second region R2 as the non-facing region R2*a* has the protrusion part 11211. Thus, the protrusion part 11211 can prevent the plug connector (connector) 1 from tilting when the plug connector (connector) 1 is placed on the existing reflow carrier 30 in order to mount the plug connector (connector) 1 on the cable (connecting member) 1A. As a result, it is possible to connect the plurality of terminals (lower plug terminals 13 and upper plug terminals 14) and the cable (connecting member) 1A more reliably.

As described above, according to the present embodiment and its modifications, the plug connector (connector) 1 that make it possible to reduce the height and suppress inclination even when placed on the existing reflow carrier 30 can provide.

In addition, the protrusion part 11211 may be provided symmetrically with respect to the center line CL defined by the imaginary line that includes the center of gravity G and extends along the front-rear axis when viewed along the top-bottom axis.

In this way, it makes possible to support the plug connector (connector) 1 in a well-balanced manner by the protrusion part 11211, and to prevent the plug connector (connector) 1 placed on the existing reflow carrier 30 from wobbling more reliably.

In addition, the protrusion part 11211 may extend along the front-rear axis.

In this way, it also makes possible to support the plug connector (connector) 1 in a well-balanced manner by the protrusion part 11211, and to prevent the plug connector (connector) 1 placed on the existing reflow carrier 30 from wobbling more reliably.

In addition, the plurality of the protrusion parts 11211 may be provided separated from each other.

In this way, it also makes possible to support the plug connector (connector) 1 in a well-balanced manner by the protrusion part 11211, and to prevent the plug connector (connector) 1 placed on the existing reflow carrier 30 from wobbling more reliably.

In addition, the protrusion part 11211 may be provided so as not to overlap the connecting parts (first mounting pieces 132 and second mounting pieces 142) of the plurality of terminals (lower plug terminals 13 and upper plug terminals 14) when viewed along the front-rear axis.

By the way, it is necessary to inspect whether the heights of the legs of the plurality of terminals (lower plug terminals 13 and upper plug terminals 14) are uniform when the plug connector (connector) 1 is mounted on the cable (connecting member) 1A. More specifically, it is necessary to inspect whether the amount of protrusion of each of the connecting parts 132 and 142 from the lower end of the plug housing 10 are uniform. Such an inspection is performed, generally, by capturing the image of the connecting parts 132 and 142 with a camera 42 in a state where light emitted from a light 41 is being projected to the connecting parts 132 and 142 of the terminals 13 and 14 held by the plug housing 10.

In this event, in the case where the protrusion part 11211 do not overlap with the plurality of connecting parts 132 and 142 when viewed along the front-rear axis, the connecting parts 132 and 142 can be checked with a camera 42 in a state where light emitted along the front-rear axis. That is, the amount of protrusion of the connecting parts 132 and 142 arranged along the width axis from the lower end of the plug housing 10 can be checked by seeing the plug connector (connector) 1 along the front-rear axis as the axis intersecting to the width axis. Therefore, the amount of protrusion of the connecting parts 132 and 142 from the lower end of the plug housing 10 can be checked more accurately.

In addition, the top part 11211*a* of the protrusion part 11211 may be at the same position as the back surface 1*b*A of the cable (connecting member) 1A when the connecting part (first mounting piece 132 and second mounting piece 142) is mounted on the cable (connecting member) 1A. Here, the back surface 1*b*A is the lower surface of the cable (connecting member) 1A top-bottom axis.

In this way, it makes possible to prevent the plug connector (connector) 1 from tilting more reliably. Furthermore, it makes possible to place the plug housing (housing) 10 in a horizontal state when the plug connector (connector) 1 is placed on the existing reflow carrier 30.

In addition, the plug housing (housing) 10 may be configured to be connected to the receptacle housing (opponent housing) 20 included in the receptacle connector (opponent connector) 2. Then, a part of the first region R1 may face the receptacle housing (opponent housing) 20 in the top-bottom axis when the plug housing (housing) 10 is connected to the receptacle housing (opponent housing) 20.

In this way, the center of gravity G of the plug connector (connector) 1 can be positioned into the receptacle housing (opponent housing) 20 when the plug housing (housing) 10 is connected to the receptacle housing (opponent housing) 20. As a result, it makes possible to suppress the wobbling of the plug housing (housing) 10 in a state where the plug housing (housing) 10 is connected to the receptacle housing (opponent housing) 20, while reducing the height of the connector set C1.

In addition, the connecting member may be a cable 1A to be flexibly deformable. Further, the reinforcing plate (connecting plate) 14A may be attached to the cable 1A. Then, the second protrusion parts 1123 surrounding the cable 1A may be provided in the first region R1.

In this way, the plurality of terminals (lower plug terminals 13 and upper plug terminals 14) can be mounted on the flexible sheet-like cable 1A more reliably. Further, the cable 1A and the reinforcing plate (connecting plate) 14A can be protected by the second protrusion parts 1123 in a state where the plurality of terminals (lower plug terminals 13 and upper plug terminals 14) are mounted on the cable 1A.

In addition, the second protrusion part 1123 may protrude downward than the protrusion part 11211 in the top-bottom axis.

In this way, it makes possible to protect the cable 1A and the reinforcing plate (connecting plate) 14A more reliably.

Others

Although the preferred embodiment of the present disclosure has been described above, the present disclosure is not limited to the above embodiment and modified examples thereof, but various changes can be made thereto.

For example, although the above-described embodiment and modified example illustrate a connector in which a plurality of terminals are disposed in the upper and lower two stages, it is also possible to make a connector in which a plurality of terminals are disposed only in one stage and a connector in which a plurality of terminals are disposed in three stages or more.

In addition, although the connector in which the terminals disposed in the same stage have the same shape is illustrated, it is also possible to make a connector in which a plurality of types of terminals are disposed in the same stage.

In addition, although in the above-described embodiment and modified example, the terminals in which the plate thickness direction of the mounting parts agrees with the direction in which the terminals are lined side-by-side have been illustrated as an example, it is possible to use terminals in which the plate thickness direction of the mounting parts agrees with the top-bottom axis.

In addition, the present disclosure may be applied to connectors (plug connectors and receptacle connectors) that electrically connect boards or cables with each other. Moreover, the present disclosure may be applied to connectors (plug connectors and receptacle connectors) that electrically connect an electric wire with a board and to connectors (plug connectors and receptacle connectors) that electrically connect an electric wire with a cable.

In addition, specifications (shapes, sizes, layouts, and the like) of the housings, the terminals, and the other details may also be changed as needed.

The present application is based on and claims the benefit of priority from Japanese Patent Application No. 2021-105717, filed on Jun. 25, 2021, the entire contents of which are incorporated herein by reference.

INDUSTRIAL APPLICABILITY

The present disclosure can provide a connector that make it possible to reduce the height and suppress inclination even when placed on an existing reflow carrier.

The invention claimed is:

1. A connector comprising:
a housing; and
a plurality of terminals held in the housing and can be mounted on a sheet-like connecting member, wherein
in a state where the housing is located above the connecting member,
the housing has a top wall disposed on an upper side in a top-bottom axis, a bottom wall disposed on a lower side in the top-bottom axis, a front wall disposed on a front side in a front-rear axis that is an axis intersecting with the top-bottom axis, and a rear wall disposed on a rear side in the front-rear axis, wherein
the plurality of terminals are held in the housing in a state where the plurality of terminals are arranged along a width axis that is an axis intersecting with the top-bottom axis and the front-rear axis, and
each of the plurality of terminals has a connecting part protruding from the rear wall while being held in the housing, the connecting part is provided with a mounting surface that can be mounted on the connecting member, wherein
a lower side surface of the bottom wall in the top-bottom axis has a first region and a second region divided into two by a center of gravity plane defined by an imaginary plane that includes a center of gravity and is perpendicular to the front-rear axis, wherein
the first region is positioned at the rear side in the front-rear axis and the second region is positioned at the front side in the front-rear axis,
the first region has a facing region that faces the connecting member in the top-bottom axis when the connecting part is mounted on the connecting member, and
the second region is a non-facing region that does not face the connecting member in the top-bottom axis when the connecting part is mounted on the connecting member, wherein
the second region has a back surface positioned at the upper side in the top-bottom axis with respect to an imaginary plane that includes the mounting surface of the connecting part and is perpendicular to the top-bottom axis; and a protrusion part protruding downward from the back surface in the top-bottom axis.

2. The connector according to claim 1, wherein
the protrusion part is provided symmetrically with respect to a center line defined by an imaginary line that includes the center of gravity and extends along the front-rear axis when viewed along the top-bottom axis.

3. The connector according to claim 1, wherein
the protrusion part extends along the front-rear axis.

4. The connector according to claim 1, wherein
a plurality of the protrusion parts are provided separated from each other.

5. The connector according to claim 1, wherein
the protrusion part is provided so as not to overlap the connecting parts of the plurality of terminals when viewed along the front-rear axis.

6. The connector according to claim 1, wherein
a top part of the protrusion part is at the same position as a lower surface of the connecting member in the top-bottom axis when the connecting part is mounted on the connecting member.

7. The connector according to claim 1, wherein
the housing is configured to be connected to an opponent housing included in an opponent connector, and a part of the first region faces the opponent housing in the top-bottom axis when the housing is connected to the opponent housing.

8. The connector according to claim 1, wherein the connecting member is a cable to be flexibly deformable, and a connecting plate is attached to the cable, wherein a second protrusion part surrounding the cable is provided in the first region.

9. The connector according to claim 8, wherein the second protrusion part protrudes downward than the protrusion part in the top-bottom axis.

* * * * *